United States Patent
Siebers et al.

(10) Patent No.: US 6,930,289 B2
(45) Date of Patent: Aug. 16, 2005

(54) COOKING STOVE AND METHOD FOR PRODUCTION AND COMPONENTS THEREOF

(75) Inventors: Friedrich Siebers, Nierstein (DE); Peter Nass, Mainz (DE); Erich Rodek, Mainz (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/372,754

(22) Filed: Feb. 21, 2003

(65) Prior Publication Data

US 2003/0218001 A1 Nov. 27, 2003

Related U.S. Application Data

(63) Continuation-in-part of application No. PCT/EP00/08248, filed on Aug. 24, 2000.

(51) Int. Cl.[7] .............................................. H05B 3/68
(52) U.S. Cl. .................................. 219/452.11; 219/548
(58) Field of Search ....................... 219/452.11, 452.12, 219/460.1, 461.1, 548; 501/2, 3, 4, 11, 68, 69

(56) References Cited

U.S. PATENT DOCUMENTS

| | | | | |
|---|---|---|---|---|
| 4,211,820 A | * | 7/1980 | Cantaloupe et al. | ........ 428/410 |
| 4,461,839 A | | 7/1984 | Rittler | |
| 4,526,872 A | * | 7/1985 | Andrieu et al. | ................ 501/4 |
| 4,835,121 A | * | 5/1989 | Shibuya et al. | ................ 501/4 |
| 4,864,104 A | * | 9/1989 | Crossley et al. | ........ 219/462.1 |
| 5,036,831 A | * | 8/1991 | Ray | ........................... 126/211 |
| 5,446,008 A | | 8/1995 | Krolla et al. | |
| 5,922,271 A | | 7/1999 | Semar et al. | |

FOREIGN PATENT DOCUMENTS

| | | |
|---|---|---|
| DE | 4321373 | 1/1995 |
| EP | 0156479 | 10/1985 |
| EP | 0220333 | 5/1987 |
| EP | 3703342 | 8/1987 |
| EP | 0437228 | 7/1991 |
| EP | 0578022 | 1/1994 |
| JP | 9169542 | 6/1997 |

\* cited by examiner

*Primary Examiner*—Sang Paik
(74) *Attorney, Agent, or Firm*—Nils H. Ljungman & Associates

(57) ABSTRACT

A cooking stove having a cook top, or hob, for cooking food, components thereof, and method of production. The stove has a stove body, a smooth-top cook top with a cooking surface to cook food thereon, and a heat source disposed adjacent to the cooking surface. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, the abstract is not intended to limit the claims in any manner and should not be interpreted as limiting the claims in any manner.

22 Claims, 8 Drawing Sheets

COOKING STOVE AND METHOD FOR PRODUCTION AND COMPONENTS THEREOF

CONTINUING APPLICATION DATA

This application is a Continuation-In-Part application of International Patent Application No. PCT/EP00/08248, filed on Aug. 24, 2000, having WIPO publication No. WO 02/16279 A1, published on Feb. 28, 2002. International Patent Application No. PCT/EP00/08248 was pending as of the filing date of this application. The United States was an elected state in International Patent Application No. PCT/EP00/08248.

BACKGROUND OF THE INVENTION

1. Field of the Invention

The invention relates to a cooking stove having a cook top, or hob, for cooking food, and method for production and components thereof. The stove has a stove body, a smooth-top cook top with a coking surface to cook food thereon, and a heat source disposed adjacent to the cooking surface 2. Background Information Smooth-top glass ceramic cook top cooking surfaces of smooth-top kitchen ceramic or glass ceramic cook tops or a stove having a ceramic or glass ceramic cook top cooking surface have gained considerable popularity as kitchen appliances.

Thus, cooking appliances having ceramic or glass ceramic cooking surfaces are known.

They provide a substantially smooth upper surface on which the various utensils that are to be heated can be disposed.

In these appliances, the cooking zones can be heated, as a rule, by means of electrically operated or gas operated heating devices arranged below the ceramic or glass ceramic cooking surface in the region of the cooking zones. These devices can be, for example, electrically operated contact-heating or radiant heating elements or else gas-jet burners.

An example of a cook top comprises an induction heating apparatus having a cook top including a plurality of induction surface heating units. The cook top comprises a horizontally disposed planar metal support surface having a plurality of openings therein. A ceramic smooth-top plate is supported in each of the openings and adapted to support a cooking utensil thereon. An induction heating coil is supported subjacent to the ceramic plate in a position to generate a magnetic field which passes through the plate to link the cooking utensil. Each plate is supported by a metallic trim frame, which abuts a conductive layer on the plate, with the frame and layer combining to provide a low reluctance flux path, the low reluctance path operating to reduce the magnetic flux leaked into the space surrounding the heating apparatus during operation thereof.

Another example of a cook top has a heating unit that includes two tubular tungsten-halogen lamps, each having a tungsten filament. The lamps are supported within a ring of ceramic fibre material and the unit is preferably mounted beneath an infra-red-transmissive cook top to define a hotplate area of a cooking hob. A control circuit provides a range of discrete power outputs of the lamps, each power output corresponding to a power control setting set by a user of the cooking hob. The circuit includes a phase control circuit for switching power to the lamps at a predetermined phase angle to achieve one or more of the lower power outputs.

Yet another example of a cook top comprises a burner for a "sealed top" range which has a generally upwardly diverging conical body with radially disposed fuel ports and a generally flat removable cap disposed on the upper periphery of the body.

Glass ceramics containing high-quartz solid solutions as the predominant crystal phase are known. A key property of these glass ceramics is that they can be used to produce the materials which have extremely low coefficients of thermal expansion in a predetermined temperature range. As a rule, the thermal expansion behavior is established so that the materials have zero thermal expansion in the range of their temperatures of use. Thus, for example when used as substrate material, wafer stages or mirror supports for telescopes, the thermal expansion is minimized in the region of room temperature. When used as a transparent chimney inspection window or darkened hobs, the zero thermal expansion in a temperature range between room temperature and about seven hundred degrees Celsius is adjusted to as low values as possible.

In transparent form, for example when used as fireproof glass, chimney inspection window or cooking utensils, as a rule high transparency, preferably light transmission of more than eighty percent in the visible range and a defined color location are desired. When used as a hob, a dark coloration which conceals the technical installation beneath the hob is desired. Transmission behavior that makes it possible readily to detect the heating elements during operation, even at low power, while they should remain concealed by the hob in the unused state, is desired. On the other hand, the eyes must not be dazzled or endangered by harmful radiation at high heating powers, in particular with the use of bright halogen lamps. In the infrared radiation range, the transmittance should reach as high values as possible so that the heat radiation can act directly on the face of the pot in order thus to improve the regulation and the initial cooking speed. Thus, a combination of defined high absorption in the visible range combined with low infrared radiation absorption is desired. These requirements are met for a four millimeters thick sample having a light transmittance, measured according to DIN 5033, of tau less than five percent in the visible range and an infrared radiation transmittance at sixteen hundred nanometers of more than sixty-five percent. The term DIN 5033 refers to standard sheet No. 5033 of the German Standards Institute, Deutsches Institut für Normung. DIN 5033 is hereby incorporated by reference as if set forth in its entirety herein.

In the industrial production of glass ceramics, arsenic oxide and/or antimony oxide are used as refining agents. These refining agents are compatible with the required glass ceramic properties and lead to good bubble qualities or low bubble counts in the melt. Even if these substances are firmly bound in the glass skeleton, they are still disadvantageous from safety and environmental protection points of view because particular precautions have to be taken during raw material procurement, preparation and during melting, owing to evaporation, and in subsequent processing procedures. In the disposal of spent glass ceramic products and the dusts and sludges from the production, the arsenic or antimony content adversely affects the recyclability and possibility of disposal in landfills. These substances are often undesired in recycling. Owing to their large surface area, and because of the limits with respect to the sluggishness of arsenic or antimony, dusts and sludges as a rule may be disposed of only on landfills for special wastes.

It is known that the production of glass ceramic products takes place in various stages. After the melting and hot shaping, the material is usually cooled below the transformation temperature of the glass. The starting glass is then converted into the glass ceramic article by controlled crystallization. This ceramization takes place in a two-stage temperature process in which first nuclei, usually comprising zirconium titanate-containing solid solutions, are produced by nucleation at a temperature between six hundred degrees Celsius and eight hundred degrees Celsius. When the-temperature is subsequently increased, the high-quartz solid solutions grow on these nuclei at the crystallization temperature.

It must be ensured by means of the glass ceramic composition that no undesired crystallization (devitrification) occurs during the hot shaping of the glass ceramic particles and, on the other hand, good and controllable crystallization behavior with acceptable process times is achieved in the subsequent ceramization. In many shaping processes, for example also in the rolling of sheets to be used as hobs, the shaping takes place in the proximity of the processing temperature $V_A$ of the glass (viscosity eta being equal to ten to the power of four dPa second). For the devitrification behavior, it must be ensured that the upper devitrification temperature of the melt is not above the processing temperature. Otherwise, undesired crystals in the glass can scarcely be avoided. Owing to their size and the growth during the ceramization to even larger crystals, the devitrification adversely affects the strength of the glass ceramic article. In the case of particularly large crystals, these may even be visible, particularly in transparent glass ceramics.

In addition to the stated key requirements with respect to glass ceramics, based on high-quartz solid solutions as the predominant crystal phase, such as, for example, low thermal expansion in the relevant range of use, transparency or possibility of imparting dark coloration, there is a number of further important requirements depending on the respective use. Thus, during prolonged use at high temperatures, such as, for example, chimney inspection windows or hobs, a high temperature/time load capacity is required. The low expansion coefficient responsible for good thermal shock behavior must not change in an impermissible manner under thermal loading during use. Changes in the microstructure which occur with thermal loading during use in practice, in combination with dimensional changes (compaction), must not lead to local tensile stresses and associated impermissible reductions in strength. This phenomenon is particularly critical in the case of hobs where thermally loaded regions (the cooking zones) are adjacent to regions which remain substantially at room temperature. In this boundary region, there must be no impermissibly high compaction stresses. In many applications, the chemical resistance of the glass ceramic articles has to meet high requirements. Chimney inspection windows are often in direct contact with sulfur-containing exhaust gases; in applications as hobs, acid-containing components, for example when food components are overcooked or with the use of acid-containing household cleaners, act on the hob, giving rise to an additional load in the range of high temperatures. In the case of use as a hob, it is furthermore disadvantageous with respect to the temperature/time load capacity if the regions of the cooking zones change with respect to their transmittance with thermal loading during use. With this effect, also referred to as "subsequent darkening", the temperature/time loading leads to a further reduction in the transmittance in the region of the hot cooking zone and hence to troublesome color differences between cooking zones and cold regions of the hob.

For applications where the very low or zero thermal expansion is not important but where the level of the thermal load capacity is paramount, it should be possible to transform the glass ceramic preferably containing high-quartz solid solutions into glass ceramic containing keatite solid solution. This transformation is effected in acceptable process times in a temperature range of about nine hundred degrees Celsius to twelve hundred degrees Celsius. The glass ceramics preferably containing keatite solid solutions have a coefficient of thermal expansion of the order of magnitude of about one millionths per Kelvin between room temperature and seven hundred degrees Celsius. As a rule, glass ceramics comprising keatite solid solution as the main phase have a translucent or white hue. On addition of colored oxides, the white hue is overcolored according to the coloring effect of the colored oxide.

Known glass ceramics which permit coloring with vanadium oxide and have led to industrially produced glass ceramic products are refined with arsenic and/or antimony oxide.

European patent specification No. EP 0437228 A1, corresponding to U.S. Pat. No. 5,070,045 issued to Comte et al. on Dec. 3, 1991, describes a glass ceramic containing high-quartz solid solutions as the predominant crystal phase, which can be transformed into a white opaque glass ceramic containing keatite solid solutions, the composition necessarily containing arsenic oxide and antimony oxide (arsenic trioxide plus antimony trioxide being equal to five tenths percent to one and five tenths percent by weight). European patent specification No. EP 0437228 A1, and its corresponding U.S. Pat. No. 5,070,045 issued to Comte et al. on Dec. 3, 1991, are hereby incorporated, by reference as if set forth in their entirety herein.

European patent specification No. EP 0220333 B1, corresponding to U.S. Pat. No. 5,212,122 issued to Pannhorst et al. on May 18, 1993, likewise describes a glass ceramic which necessarily contains antimony and/or arsenic oxide (antimony trioxide plus arsenic trioxide being, equal to five tenths to two and one-half percent by weight). European patent specification No. EP 0220333 B1, and its corresponding U.S. Pat. No. 5,212,122 issued to Pannhorst et al. on May 18, 1993 are hereby incorporated by reference as if set forth in their entirety herein.

European patent specification No. EP 0156479 B1 issued to The English Electric Company Limited on Apr. 12, 1989, describes a method for refining a molten lithium aluminosilicate glass using the refining agent cerium dioxide or cerate compounds. The glasses described are free of arsenic and antimony but the colorability with vanadium oxide is not sufficient. Even at comparatively high vanadium pentoxide contents of equal or greater than five tenths percent by weight, a very high transmittance of equal or greater than twenty-three percent is measured at six hundred thirty nanometers. The described high coefficients of thermal expansion of four and nine tenths to nine and five tenths ten millionths per Kelvin between twenty and seven hundred degrees Celsius are also disadvantageous for use as a darkened hob. European patent specification No. EP 0156479 B1 issued to The English Electric Company Limited on Apr. 12, 1989 is hereby incorporated by reference as if set forth in its entirety herein.

It is known that tin dioxide can be used as a nucleating agent in glass ceramics. This is used to reduce the content of the nucleating agent titanium dioxide.

It is thus possible to obtain transparent glass ceramics which have very little natural color owing to a low content of troublesome iron/titanium complex. Thus, Japanese published patent application No. JP 09169542 A, of Nippon Sheet Glass Co Ltd, published on Jun. 30, 1997, describes a transparent glass ceramic containing high-quartz solid solutions as the predominant crystal phase and having a composition which contains zero to one percent by weight of titanium dioxide and one to four percent by weight of tin dioxide. In order to achieve high transparency, arsenic oxide is used as a refining agent. The high tin dioxide contents of equal or greater than one percent by weight adversely affect the devitrification behavior. Japanese published patent application No. JP 09169542 A, of Nippon Sheet Glass Co Ltd, published on Jun. 30, 1997, is hereby incorporated by reference as if set forth in its entirety herein.

OBJECT OF THE INVENTION

It is an object of the invention to provide an electric stove to cook food.

It is also an object of the invention to provide a glass ceramic object, such as, in a smooth-top cook top.

It is further an object of the invention to provide a method of making a glass ceramic object, such as, in a smooth-top cook top.

SUMMARY OF THE INVENTION

The invention teaches that at least one object can be accomplished by an electric stove to cook food, said electric stove comprising: an electric stove body; said electric stove body comprising a bottom base portion; said electric stove body comprising an upper housing portion; an electric cook top; said electric cook top being mounted in or on said upper housing portion; said electric cook top comprising an electric smooth-top cook top to cook food thereon; said electric smooth-top cook top comprising an electric hob; an arrangement to attach said electric hob to said electric stove body; said electric hob comprising a layer which becomes an upper layer upon installation in a kitchen; said electric hob comprising an electric cooking surface configured to cook food; said electric cooking surface being disposed at or adjacent to said upper layer of said electric hob; said electric cooking surface, at or adjacent to said upper layer of said electric hob, being configured to receive a bottom of a cooking vessel to cook food therein; said electric cook top comprising at least one electrical heat source; said at least one electrical heat source being configured to electrically heat said electric cooking surface to thereby cook food in a cooking vessel; said at least one electrical heat source being disposed adjacent to said electric cooking surface; said electric hob comprising a body; said electric cooking surface being disposed adjacent to or comprising a part of said hob body; said electric hob comprising an electric glass ceramic hob including a reduced vanadium coloring agent in the glass, which glass is substantially free of toxic agents, which electric glass ceramic hob is thus configured with said agent to maximize heat passing through said electric hob body from said at least one electrical heat source to a vessel supported on said electric cooking surface and also is configured to sufficiently darken said electric hob to a darkness sufficient to visually conceal said at least one electrical heat source from view of a user of said electric stove when said electric stove is not in use; and electric control apparatus being configured and disposed to control said electric hob; said electric control apparatus being connected to control said at least one electrical heat source and thus is configured to control heat of said electrically heated cooking surface to cook food in a vessel.

The invention also teaches that at least one object can be accomplished by a glass ceramic object, such as, in a darkened smooth-top cook top, a stove with a darkened smooth-top cook top, a darkened substrate material for wafer stages, a darkened telescopic mirror support, a darkened hob, a darkened heatable plate for cooking and grilling, said glass ceramic object comprising a darkened glass ceramic object, said darkened glass ceramic object includes a reduced vanadium coloring agent which darkened glass ceramic object is thus configured with said agent to maximize heat passing through said darkened glass ceramic object, and said darkened glass ceramic object is also configured to sufficiently darken said glass ceramic object to a darkness sufficient to obscure viewing through said glass ceramic object, which glass ceramic object comprises a crystallized and ceramicized glass ceramic, which crystallized and ceramicized glass ceramic comprises high-quartz solid solutions as the predominant crystal phase, a glass substantially free of arsenic and antimony, having a light transmittance in the visible range, tau, of less than five percent for a four millimeters thick glass ceramic of which said glass ceramic object is made, and having an infrared transmittance at an infrared wavelength of one thousand six hundred nanometers of more than sixty-five percent for a four millimeters thick glass ceramic of which said glass ceramic object is made.

The invention further teaches that at least one object can be accomplished by a method of making a glass ceramic object, such as, in a darkened smooth-top cook top, a stove with a darkened smooth-top cook top, a darkened substrate material for wafer stages, a darkened telescopic mirror support, a darkened hob, and a darkened heatable plate for cooking and grilling, said glass ceramic object comprising a darkened glass ceramic object, said darkened glass ceramic object includes a reduced vanadium coloring agent which darkened glass ceramic object is thus configured with said agent to maximize heat passing through said darkened glass ceramic object, and said darkened glass ceramic object is also configured to sufficiently darken said glass ceramic object to a darkness sufficient to obscure viewing through said glass ceramic object, which glass ceramic object comprises a crystallized and ceramicized glass ceramic, which crystallized and ceramicized glass ceramic comprises high-quartz solid solutions as the predominant crystal phase, a glass substantially free of arsenic and antimony, having a light transmittance in the visible range, tau, of less than five percent for a four millimeters thick glass ceramic of which said glass ceramic object is made, and having an infrared transmittance at an infrared wavelength of one thousand six hundred nanometers of more than sixty-five percent for a four millimeters thick glass ceramic of which said glass ceramic object is made; said method comprising the steps of: providing a melt of molten glass; fining said melt of molten glass in the absence of added arsenic and antimony; adding vanadium oxide and at least one reducing agent to said melt of molten glass sufficient to reduce said added vanadium oxide present in said melt of molten glass and permitting production of a darkened crystallized and ceramicized glass ceramic, which darkened crystallized and ceramicized glass ceramic comprises high-quartz solid solutions as the predominant crystal phase, a glass substantially free of arsenic and antimony, having a light transmittance in the visible range, tau, of less than five percent for a four millimeters thick glass ceramic of which said glass ceramic object is made, and having an infrared transmittance at an infrared wavelength of one thousand six hundred nanometers of more than sixty-five percent for a four millimeters thick glass ceramic of which said glass ceramic object is made; reducing said added vanadium oxide in said melt of molten glass at a temperature of about one thousand seven hundred fifty degrees Celsius with said at least one reducing agent to a state in which the reduced vanadium is configured to darken; and ceramicizing said glass and producing said glass ceramic object.

The invention also teaches that at least one object can be accomplished by a glass ceramic object, such as, in a darkened smooth-top cook top, a stove with a darkened smooth-top cook top, a darkened substrate material for wafer stages, a darkened telescopic mirror support, a darkened hob, a darkened heatable plate for cooking and grilling, alternatively, a fire protection of a door or of a window for a building, a chimney inspection window, culinary ware, ovenware, direct oven-to-table cookware, and cookware; upon said glass ceramic object comprising a darkened glass ceramic object, said darkened glass ceramic object includes a reduced vanadium coloring agent which darkened glass ceramic object is thus configured with said agent to maximize heat passing through said darkened glass ceramic object, and said darkened glass ceramic object is also configured to sufficiently darken said glass ceramic object to a darkness sufficient to obscure viewing through said glass ceramic object, which glass ceramic object comprises a crystallized and ceramicized glass ceramic, which crystallized and ceramicized glass ceramic comprises high-quartz solid solutions as the predominant crystal phase, a glass substantially free of arsenic and antimony, having a light transmittance in the visible range, tau, of less than five percent for a four millimeters thick glass ceramic of which said glass ceramic object is made, and having an infrared transmittance at an infrared wavelength of one thousand six hundred nanometers of more than sixty-five percent for a four millimeters thick glass ceramic of which said glass ceramic object is made; upon said glass ceramic object comprising a fire protection of a door or of a window for a building, a chimney inspection window, culinary ware, ovenware, direct oven-to-table cookware, and cookware, said glass ceramic object comprises a crystallized and ceramicized glass ceramic, which crystallized and ceramicized glass ceramic comprises high-quartz solid solutions as the predominant crystal phase, a glass substantially free of arsenic and antimony and containing less than three percent by weight of titanium dioxide, and having a light transmittance in the visible range, tau, of more than eighty percent for a four millimeters thick glass ceramic of which said glass ceramic object is made.

The invention teaches in one embodiment that the object can be accomplished by a transparent glass ceramic that has been darkened by adding vanadium oxide and contains high-quartz solid solutions as the predominant crystal phase, the glass ceramic, except for unavoidable traces, containing none of the chemical refining agents arsenic oxide and/or antimony oxide, characterized in that the darkened glass ceramic has a light transmittance in the visible range of tau less than five percent and an infrared radiation transmittance at sixteen hundred nanometers of more than sixty-five percent for the four millimeters thick glass ceramic, which transmittance is established by a combination of the colored oxide vanadium oxide with at least one solid, liquid and/or gaseous reducing agent added to the glass melt and treatment of the glass melt at above one thousand seven hundred fifty degrees Celsius.

The invention also teaches in one embodiment that the object can be accomplished by the method for producing a transparent glass ceramic that has been darkened by adding vanadium oxide and contains high-quartz solid solutions as the predominant crystal phase, it being possible, except for unavoidable traces, to dispense with the chemical refining agents arsenic oxide and/or antimony oxide, characterized in that the darkened glass ceramic is adjusted to a light transmittance in the visible range of tau less than five percent and an infrared radiation transmittance at sixteen hundred nanometers of more than sixty-five percent for the four millimeters thick glass ceramic by a combination of the colored oxide vanadium oxide with at least one solid, liquid and/or gaseous reducing agent added to the glass melt and treatment of the glass melt at above one thousand seven hundred fifty degrees Celsius.

In the case of the transparent glass ceramic according to one embodiment of the invention that can be darkened by adding vanadium oxide and contains high-quartz solid solutions as the predominant crystal phase, it is intended that the glass ceramic, except for unavoidable traces, contain none of the chemical refining agents arsenic oxide and/or antimony oxide and the darkened glass ceramics have a light transmittance in the visible range of tau less than five percent and an infrared radiation transmittance at sixteen hundred nanometers of more than sixty-five percent for the four millimeters thick glass ceramic, which transmittance is established by a combination of the colored oxide vanadium oxide with at least one solid, liquid and/or gaseous reducing agent added to the glass melt.

The glass ceramics are thus distinguished by a composition without the use of arsenic oxide and/or antimony oxide as refining agent, which serve in known glass ceramics as redox partners during the ceramization for the vanadium incorporated in the glass skeleton and thus play a causal role in the coloring by vanadium. However, as our investigations have shown, the refining agents arsenic oxide and antimony oxide play a key role as redox partners in the conversion of the vanadium into the color-imparting state. This coloring takes place if the starting glasses are converted into the glass ceramic. The elimination of said refining agents is made more difficult if controlled colorability with vanadium oxide is to be retained. The investigations will be described in detail later on.

The method, according to one embodiment of the invention, for the production of a transparent glass ceramic that can be darkened by adding vanadium oxide and containing high-quartz solid solutions as the predominant crystal phase is distinguished by the fact that, except for unavoidable traces, the chemical refining agents arsenic oxide and/or antimony oxide are dispensed with and the darkened glass ceramic is adjusted to a light transmittance in the visible range of tau less than five percent and an infrared radiation transmittance at sixteen hundred nanometers of more than sixty-five percent for the four millimeters thick glass ceramic by a combination of the colored oxide vanadium oxide with at least one solid, liquid and/or gaseous reducing agent added to the glass melt.

It is economically advantageous if a dark coloration can be achieved from a transparent glass ceramic of the same starting composition by adding vanadium oxide. Regarding the logistics of production, raw material procurement, stocking of raw material and preparation of mixtures are simpler to implement. Fragments of the transparent glass ceramic can be used in the melt of the colored glass ceramic. Owing to the slight differences in composition, viscosity and ceramization behavior are similar so that the melting points, shaping parameters and the ceramization conditions in the production plants can be retained or have to be only slightly modified.

Although the refining agents arsenic oxide and/or antimony oxide, which in any case are problematic environmentally, were dispensed with, it was possible to retain the advantages of a standard starting composition both for transparent and for darkened glass ceramics. The glass ceramics can be darkened by additions of vanadium oxide. The coloring is effected during the ceramization, i.e. during the transformation from the glassy to the glass ceramic state. In the glassy starting state, a slight green coloration having a light transmittance of about fifty to seventy percent is observed as a result of vanadium oxide addition. In glass ceramics which are free of arsenic oxide and/or antimony oxide, the coloration did not occur to a sufficient extent during the ceramization, and the coloring effect of the vanadium is surprisingly lost.

As our investigations have shown, the refining agents arsenic oxide and antimony oxide also influence the devitrification behavior and lead to a reduction in the upper devitrification temperature. On elimination of said refining agents, it must be ensured that the devitrification behavior is not adversely affected. The problem of poorer devitrification resistance on elimination of the refining agents arsenic oxide and antimony oxide was solved by adapting the composition. For this purpose, the crystal phases critical for the devitrification were identified and the critical components of the composition were defined.

The glass ceramics according to the invention are widely used in transparent or darkened form and the compositions found, without the use of arsenic and/or antimony, are distinguished by outstanding performance characteristics with respect to their devitrification resistance, time/temperature load capacity and chemical resistance, which surpass the level of known arsenic/antimony-containing glass ceramics.

The mechanisms taking place in the case of the colorability of arsenic-/antimony-free glass ceramics by vanadium oxide was investigated in detail (table 1). Examples 1 and 2 denote glass ceramics conventionally refined with antimony oxide and melted with the same starting composition with and without vanadium oxide. Under the stated ceramization conditions, the vanadium oxide-free composition remains transparent and the vanadium-containing one shows the desired dark coloration. The corresponding antimony-free and vanadium-containing composition of example 3 suddenly loses its colorability. Characteristic of vanadium is that it can form a plurality of oxides of different valencies, it being possible for transitions from one oxidation state to the other to take place through a shift in the redox equilibrium. The valency states of vanadium are difficult to characterize. Antimony or tin which are more easily accessible via Mössbauer measurement was therefore characterized in its valency state (table 1). It is found that antimony in the glassy starting state is present in trivalent form and a partial valency change to the pentavalent state takes place on ceramization, the vanadium oxide-free and vanadium oxide-containing melts 1 and 2 differing substantially. When vanadium is present (example 2), substantially more antimony is converted into the pentavalent state. Under identical production conditions and with the same starting compositions, the two melts differ only in their vanadium oxide content. It is therefore possible to conclude that the antimony acts as a redox partner for the reduction of the vanadium to a lower color-imparting oxidation state. This redox process is essential for the conversion of the vanadium oxide into the color-imparting state, as shown in example 3. Without antimony, the coloring effect of the vanadium is for the most part lost, and the light transmittance is tau equal to twenty-nine and five tenths percent. When arsenic oxide is used as a refining agent, a corresponding redox process can take place owing to the chemical similarity of arsenic and antimony. The described redox process of vanadium is a necessary process in the chain which leads from non-color-imparting vanadium to the color-imparting vanadium. Our investigations have furthermore shown that not all vanadium is converted into the color-imparting state. Thus, with different vanadium oxide contents between six tenths and four tenths percent by weight, comparable coloring results can be achieved depending on composition and redox state in the melt. The compositions with higher vanadium oxide contents undesirably have a lower infrared transmittance. It is therefore assumed that, after ceramization, the vanadium is present in different proportions in the color-imparting and non-color-imparting state, the vanadium which does not impart color in the visible range reducing the transmittance in the infrared range. In known glass ceramic compositions, in addition to the dominant component arsenic/antimony as redox partners, high contents of titanium dioxide also exhibit slight but insufficient promotion of coloring by vanadium.

The coloring via the colored oxide vanadium oxide is preferred over other colored oxides because this has the combination of high absorption in the visible range and low absorption in the infrared range. It is thus possible to achieve a light transmittance of tau less than five percent in the visible range combined with an infrared transmittance at sixteen hundred nanometers of more than sixty-five percent. When effective reducing agents for vanadium pentoxide are used, it is even possible to achieve the required low light transmittance combined with an infrared radiation transmittance at sixteen hundred nanometers of greater than seventy percent and greater than eighty percent.

The transparent, uncolored glass ceramic preferably has a light transmittance in the visible range of tau greater than eighty percent, and the glass ceramic darkened by combination of the colored oxide vanadium oxide with at least one solid, liquid or gaseous reducing agent added to the glass melt has a light transmittance in the visible range of tau less than two and one-half percent and an infrared radiation transmittance at sixteen hundred nanometers of more than seventy percent for the four millimeters thick glass ceramic. In the method according to one embodiment of the invention, these values are preferably established. Particularly if heating elements of high power, e.g. halogen lamps, are used under the hob, the light transmittance should be less than two and one-half percent and the infrared radiation transmittance at sixteen hundred nanometers should be more than seventy percent.

The problem of the colorability of arsenic-/antimony-free glass ceramics containing vanadium oxide was solved by combining the colorant vanadium oxide with a solid, liquid or gaseous reducing agent added to the glass melt.

Arsenic oxide and/or antimony oxide are effective refining agents at high melt temperatures of about fifteen hundred to sixteen hundred degrees Celsius, as are necessary for glass ceramic compositions. They achieve very good bubble quality or low bubble counts, as required for many glass ceramic products. In order to achieve the required bubble qualities without their use, one or more alternative chemical refining agents, such as, for example, tin dioxide, cerium dioxide, sulfate compounds or chloride compounds, are therefore used. Physical refining methods, such as, for example, reduced-pressure refining or high-temperature refining at temperatures above about seventeen hundred degrees Celsius can also ensure the required bubble qualities. In the case of particularly high requirements with respect to the bubble quality, it may be necessary to combine the use of alternative chemical refining agents with a physical refining method, such as, for example, the use of tin dioxide and high-temperature refining or the use of barium chloride and reduced-pressure refining.

The composition and the ceramization conditions determine the microstructure and hence the properties of the glass ceramic. The microstructure substantially comprises the high-quartz solid solution as the predominant crystal phase and a residual glass comprising components which are not incorporated into the high quartz. This microstructure is responsible for the thermal expansion behavior over the temperature, which represents a key property for the glass ceramics.

Lithium oxide, aluminum oxide and silicon dioxide within the preferred, stated limits are necessary components in the high-quartz solid solution phase. Magnesium oxide, zinc oxide and phosphorus can be incorporated as further components into the high-quartz solid solutions. The addition of the alkalis sodium monoxide and potassium monoxide and of the alkaline earths calcium oxide, strontium oxide and barium oxide improve the fusability and the devitrification behavior of the glass. The contents are limited because these components substantially remain in the residual glass phase of the glass ceramic and increase the thermal expansion in an undesirable manner when the contents are too high. Furthermore, higher contents can adversely affect the crystallization behavior. Titanium dioxide and optionally zirconium dioxide and tin dioxide are required as nucleating agents. During the nucleation, they form nuclei in high density which serve as a substrate for the high-quartz solid solutions to grow on during the crystallization. Higher contents than a total of six percent by weight adversely affect the devitrification behavior. This applies in particular to the component tin dioxide. At contents above one percent by weight, spontaneous formation of surface crystals was even observed on the surface on cooling and standing of laboratory melts. Zirconium dioxide contents higher than three percent by weight adversely affect the melting behavior of the mixture during glass production, since the zirconium dioxide-containing raw materials are distinguished by a low dissolution rate in the melt. The titanium dioxide content is between one and two tenths and five and five tenths percent by weight. Titanium dioxide is indispensable as a nucleating agent; the content should be at least one and two tenths percent by weight so that high transparency of the glass ceramics owing to high nucleus density and hence small crystallite sizes can be achieved. The content should not exceed five and five tenths percent by weight, because otherwise the devitrification behavior is adversely affected. A glass ceramic according to one embodiment of the invention therefore preferably has the following composition (in percent by weight, based on oxide): lithium oxide comprising the range from two and five tenths percent to five and five tenths percent and within the range percentages in tenth of percent steps such that any tenth of a percent may be a limit of a diminished range; sodium monoxide comprising the range from zero percent to three percent and within the range percentages in tenth of percent steps such that any tenth of a percent may be a limit of a diminished range; potassium monoxide comprising the range from zero percent to three percent and within the range percentages in tenth of percent steps such that any tenth of a percent may be a limit of a diminished range; with the sum of sodium monoxide plus potassium monoxide comprising the range from zero to four percent and within the range percentages in tenth of percent steps such that any tenth of a percent may be a limit of a diminished range; magnesium oxide comprising the range from zero percent to three percent and within the range percentages in tenth of percent steps such that any tenth of a percent may be a limit of a diminished range; calcium oxide comprising the range from zero percent to two and five tenths percent and within the range percentages in tenth of percent steps such that any tenth of a percent may be a limit of a diminished range; strontium oxide comprising the range from zero percent to two percent and within the range percentages in tenth of percent steps such that any tenth of a percent may be a limit of a diminished range; barium oxide comprising the range from zero percent to three and five tenths percent and within the range percentages in tenth of percent steps such that any tenth of a percent may be a limit of a diminished range; zinc oxide comprising the range from zero percent to three and five tenths percent and within the range percentages in tenth of percent steps such that any tenth of a percent may be a limit of a diminished range; aluminum oxide comprising the range from eighteen percent to twenty-seven percent and within the range percentages in tenth of percent steps such that any tenth of a percent may be a limit of a diminished range; silicon dioxide comprising the range from fifty-two percent to seventy-five percent and within the range percentages in tenth of percent steps such that any tenth of a percent may be a limit of a diminished range; titanium dioxide comprising the range from one and two tenths percent to five and five tenths percent and within the range percentages in tenth of percent steps such that any tenth of a percent may be a limit of a diminished range; zirconium dioxide comprising the range from zero percent to three percent and within the range percentages in tenth of percent steps such that any tenth of a percent may be a limit of a diminished range; tin dioxide comprising less than one percent; with the sum of titanium dioxide plus zirconium dioxide plus tin dioxide comprising the range from two percent to 6 percent and within the range percentages in tenth of percent steps such that any tenth of a percent may be a limit of a diminished range; and phosphoric oxide comprising the range from zero percent to eight percent and within the range percentages in tenth of percent steps such that any tenth of a percent may be a limit of a diminished range; the dark coloration being capable of being established by adding two hundredths to six tenths percent by weight of vanadium pentoxide, while the transparent glass ceramic is free of vanadium pentoxide.

Comparable with this, German patent No. DE 3703342 C2, corresponding to U.S. Pat. No. 4,835,121 issued to Shibuya et al. on May 30, 1989, describes a glass ceramic and a method for its production, the glass ceramic containing high-quartz solid solutions which are dispersed in the glass matrix and have a dark or black appearance, having a bending strength of at least one hundred forty Newtons per square millimeter in combination with an infrared radiation transmittance of at least eighty percent at one thousand five hundred nanometers, the composition containing zero to two percent by weight of arsenic trioxide as a refining agent and the coloring being effected with three hundredths to five tenths percent by weight of vanadium pentoxide. This glass ceramic is preferably suitable for use as a hob, owing to its dark coloration. German patent No. DE 3703342 C2, and its corresponding U.S. Pat. No. 4,835,121 issued to Shibuya et al. on May 30, 1989, are hereby incorporated by reference as if set forth in their entirety herein.

According to our investigations, however, the in the described DE 3703342 C2 glass ceramic can be produced with the claimed properties with the method described there only when the composition contains arsenic trioxide. The addition of arsenic trioxide is absolutely essential in order to achieve dark or black appearance and to establish low values of the light transmittance. Stating the transmittance values at the light wavelength of five hundred nanometers is furthermore not suitable for correctly assessing the coloration since glass ceramics colored with vanadium oxide are mainly transparent above this wavelength. For assessing the coloration, it is therefore necessary to use the total spectral range visible to the eye, i.e. the light transmittance in the visible range.

If a slight natural color of the glass ceramics according to one embodiment of the invention in transparent form (i.e. without vanadium oxide) is desired, the titanium dioxide content should be less than three percent by weight, preferably less than two and one-half percent by weight, because otherwise the iron/titanium complex which adversely affects the natural color occurs to a greater extent.

Substitution of the silicon dioxide by germanium dioxide is possible but, owing to the costs of germanium dioxide, has not become important for economic reasons. Depending on the choice of the raw materials of the mixture and on the process conditions during their production, glass ceramics have a water content which is usually between one hundredth and seven hundredths mol per liter.

In addition to the colored oxide vanadium oxide in contents between two hundredths and six tenths percent by weight, further known color-imparting components, such as, for example, chromium, manganese, iron, cobalt, nickel, copper, selenium and chlorine compounds, may also be used in order to promote the coloring and to establish certain color locations. In the case of darkened glass ceramics, this, will be less desirable if high infrared radiation transmittances is required since these components absorb as a rule in the infrared radiation range. The use of these alternative color-imparting components may be desired when they are in transparent form, in order to establish a certain color location.

The composition component tin dioxide has proven particularly useful as an added solid reducing agent. Tin dioxide advantageously also has a refining effect and thus combines the function of reducing agent and refining agent. As a further advantage, tin dioxide, similarly to arsenic trioxide or antimony trioxide, stabilizes the oxygen pressure of the glass melt to the action of oxygen from the surrounding air. During the technically customary standing and stirring of the melt prior to shaping, and the changes in throughput which are often desired in practice, this buffer effect is advantageous for ensuring stable transmission. Our investigations, based on Mössbauer measurements, have shown that the tin as well as antimony acts as a redox partner for the vanadium. The divalent tin formed by liberation of oxygen during the refining acts as a reducing agent for the vanadium incorporated during the ceramization and is for the most part oxidized again up to the tetravalent state (table 1, examples 4 and 5). As shown in examples 4 and 5, the tin proves to be a very effective redox partner for the incorporated vanadium. In the vanadium-containing example 5, virtually all the divalent tin of the starting glass is oxidized up to the tetravalent state during the ceramization. Compared with arsenic-/antimony-containing glass ceramics, less tin dioxide is required than arsenic trioxide or antimony trioxide. It is possible to achieve the desired light transmittance in the visible range with lower vanadium pentoxide contents. During the ceramization, the tin evidently leads to a higher proportion of vanadium in the color-imparting state. Thus, high infrared radiation transmittance values can also be achieved since the proportion of vanadium in the non-color-imparting state is small. It is even possible for a four millimeters thick glass ceramic to reach a light transmittance in the visible range of less than one percent and an infrared radiation transmittance at sixteen hundred nanometers of greater than eighty percent (examples 23 to 27). This combination is particularly advantageous for hob applications. The low vanadium pentoxide contents are furthermore advantageous because vanadium is a relatively expensive raw material. In the tin dioxide-containing vanadium-free glass ceramic in transparent form (example 4), the change of valency of tin during the ceramization is observed to a slight extent. This supports the hypothesis, already arrived at in the Mössbauer analysis, for the coloration with vanadium via a redox process. The example shows that it is possible to transform a transparent arsenic-/antimony-free glass ceramic into a darkened glass ceramic by adding vanadium. In the transparent glass ceramic, the tin dioxide acts as refining agent and as a nucleating agent.

Further suitable reducing agents are metals, carbon and/or oxidizable carbon or metal compounds which are usually added in pulverulent and/or liquid form to the starting mixture for the melt.

In a corresponding manner, gaseous reducing agents can also be used for influencing the redox state of the melt. Forming gas or another hydrogen-containing gas, which is introduced into the melt, is suitable as such a gaseous reducing agent. Examples of reducing agents are aluminum powder or silicon powder. Owing to their high affinity for oxygen in the melt, these elements are oxidized and reduced to pressure of oxygen of the melt. This effect is also achieved by oxidizable carbon compounds, such as, for example, silicon carbide, titanium carbide, sugar, charcoal, forming gas and/or carbon monoxide. Since said species are not themselves available as redox partners because, in the case of Al and of Si, for example, they are firmly incorporated into the glass skeleton after oxidation, the mechanism is substantially such that they lower the oxygen pressure ($pO_2$) of the melt to such an extent that more readily reducible components of the melt are instead reduced and can thus serve as redox partners. They are oxidized again during the reduction of the vanadium.

The advantageous devitrification behavior required for the hot shaping in the region of the processing temperature of the glass, even without the use of arsenic oxide or antimony oxide, necessitates adaptations in the composition of the glass ceramic. Regarding devitrification, critical crystal phases are mullite (aluminum silicate), baddeleyite (zirconium dioxide) and high-quartz solid solutions, keatite solid solutions and tin dioxide-containing crystal phases. When the glass melt is cooled to processing temperature and below, the upper devitrification temperature (UDT) at which the first crystal phase occurs is a measure of the devitrification behavior. For the hot shaping of the glass in the vicinity of the processing temperature, the UDT should be as far as possible below the processing temperature. For such improved devitrification behavior, it is necessary to limit the components of these critical crystal phases and the content of nucleating agents, in particular of tin dioxide.

A preferred glass ceramic which has high resistance to devitrification and an upper devitrification limit below the processing temperature V subscript A has the following composition (in percent by weight, based on oxide): lithium oxide comprising the range from three percent to four and five tenths percent and within the range percentages in tenth of percent steps such that any tenth of a percent may be a limit of a diminished range; sodium monoxide comprising the range from zero percent to one and five tenths percent and within the range percentages in tenth of percent steps such that any tenth of a percent may be a limit of a diminished range; potassium monoxide comprising the range from zero percent to one and five tenths percent and within the range percentages in tenth of percent steps such that any tenth of a percent may be a limit of a diminished range; with the sum of sodium monoxide plus potassium monoxide comprising the range from two tenths percent to two percent and within the range percentages in tenth of percent steps such that any tenth of a percent may be a limit of a diminished range; magnesium oxide comprising the range from zero percent to two percent and within the range percentages in tenth of percent steps such that any tenth of a percent may be a limit of a diminished range; calcium oxide comprising the range from zero percent to two percent and within the range percentages in tenth of percent steps such that any tenth of a percent may be a limit of a diminished range; strontium oxide comprising the range from zero percent to two percent and within the range percentages in tenth of percent steps such that any tenth of a percent may be a limit of a diminished range; barium oxide comprising the range from zero percent to three percent and within the range percentages in tenth of percent steps such that any tenth of a percent may be a limit of a diminished range; zinc oxide comprising the range from zero percent to two and five tenths percent and within the range percentages in tenth of percent steps such that any tenth of a percent may be a limit of a diminished range; aluminum oxide comprising the range from nineteen percent to twenty-three percent and within the range percentages in tenth of percent steps such that any tenth of a percent may be a limit of a diminished range; silicon dioxide comprising the range from fifty-two percent to seventy percent and within the range percentages in tenth of percent steps such that any tenth of a percent may be a limit of a diminished range; titanium dioxide comprising the range from one and five tenths percent to five and three tenths percent and within the range percentages in tenth of percent steps such that any tenth of a percent may be a limit of a diminished range; zirconium dioxide comprising the range from zero percent to two and four tenths percent and within the range percentages in tenth of percent steps such that any tenth of a percent may be a limit of a diminished range; tin dioxide comprising less than five tenths percent; with the sum of titanium dioxide plus zirconium dioxide plus tin dioxide comprising the range from two and five tenths percent to five and five tenths percent and within the range percentages in tenth of percent steps such that any tenth of a percent may be a limit of a diminished range; and phosphoric oxide comprising the range from zero percent to eight percent and within the range percentages in tenth of percent steps such that any tenth of a percent may be a limit of a diminished range; it being possible to establish the darkening by adding two hundredths to six tenths percent by weight of vanadium pentoxide.

For achieving a high temperature/time load capacity, with respect to change of thermal expansion and of compaction and compaction stress, it has proven necessary to reduce the content of alkalis and alkaline earths, whereas the contents of aluminum oxide and silicon dioxide must be chosen to be higher. In the case of the darkening with vanadium oxide, the vanadium pentoxide content should be not more than five tenths percent by weight since the vanadium oxide, too, leads to a deterioration in the temperature/time load capacity. Preferably, a glass ceramic according to one embodiment of the invention therefore has the following composition (in percent by weight, based on oxide): lithium oxide comprising the range from three and two tenths percent to four and five tenths percent and within the range percentages in tenth of percent steps such that any tenth of a percent may be a limit of a diminished range; sodium monoxide comprising the range from zero percent to one percent and within the range percentages in tenth of percent steps such that any tenth of a percent may be a limit of a diminished range; potassium monoxide comprising the range from zero percent to one percent and within the range percentages in tenth of percent steps such that any tenth of a percent may be a limit of a diminished range; with the sum of sodium monoxide plus potassium monoxide comprising the range from two tenths percent to one and five tenths percent and within the range percentages in tenth of percent steps such that any tenth of a percent may be a limit of a diminished range; magnesium oxide comprising the range from zero percent to one and five tenths percent and within the range percentages in tenth of percent steps such that any tenth of a percent may be a limit of a diminished range; calcium oxide comprising the range from zero percent to one percent and within the range percentages in tenth of percent steps such that any tenth of a percent may be a limit of a diminished range; strontium oxide comprising the range from zero percent to one and five tenths percent and within the range percentages in tenth of percent steps such that any tenth of a percent may be a limit of a diminished range; barium oxide comprising the range from zero percent to two and five tenths percent and within the range percentages in tenth of percent steps such that any tenth of a percent may be a limit of a diminished range; zinc oxide comprising the range from zero percent to two and five tenths percent and within the range percentages in tenth of percent steps such that any tenth of a percent may be a limit of a diminished range; aluminum oxide comprising the range from twenty percent to twenty-five percent and within the range percentages in tenth of percent steps such that any tenth of a percent may be a limit of a diminished range; silicon dioxide comprising the range from sixty percent to seventy-two percent and within the range percentages in tenth of percent steps such that any tenth of a percent may be a limit of a diminished range; titanium dioxide comprising the range from one and five tenths percent to five and three tenths percent and within the range percentages in tenth of percent steps such that any tenth of a percent may be a limit of a diminished range; zirconium dioxide comprising the range from zero percent to two and four tenths percent and within the range percentages in tenth of percent steps such that any tenth of a percent may be a limit of a diminished range; tin dioxide comprising less than six tenths percent; with the sum of titanium dioxide plus zirconium dioxide plus tin dioxide comprising the range from two and five tenths percent to five and five tenths percent and within the range percentages in tenth of percent steps such that any tenth of a percent may be a limit of a diminished range; and phosphoric oxide comprising the range from zero percent to three percent and within the range percentages in tenth of percent steps such that any tenth of a percent may be a limit of a diminished range; it being possible to establish the darkening by adding two hundredths to five tenths percent by weight of vanadium pentoxide.

In the case of the chemical resistance, the acid resistance has to meet particularly high requirements. The hydrolytic resistance and alkali resistance which are required in practical use are achieved with the compositions according to the invention without problems. Regarding the acid resistance, in particular phosphorus pentoxide and the alkaline earths calcium oxide and barium oxide and the alkalis, vanadium pentoxide and, to a lesser extent, also higher contents of aluminum oxide are disadvantageous. In this context, a glass ceramic according to one embodiment of the invention preferably has the following composition (in percent by weight, based on oxide): lithium oxide comprising the range from three and two tenths percent to four and five tenths percent and within the range percentages in tenth of percent steps such that any tenth of a percent may be a limit of a diminished range; sodium monoxide comprising the range from zero percent to one percent and within the range percentages in tenth of percent steps such that any tenth of a percent may be a limit of a diminished range; potassium monoxide comprising the range from zero percent to one percent and within the range percentages in tenth of percent steps such that any tenth of a percent may be a limit of a diminished range; with the sum of sodium monoxide plus potassium monoxide comprising the range from two tenths percent to one and five tenths percent and within the range percentages in tenth of percent steps such that any tenth of a percent may be a limit of a diminished range; magnesium oxide comprising the range from zero percent to two percent and within the range percentages in tenth of percent steps such that any tenth of a percent may be a limit of a diminished range; calcium oxide comprising the range from zero percent to one percent and within the range percentages in tenth of percent steps such that any tenth of a percent may be a limit of a diminished range; strontium oxide comprising the range from zero percent to one and five tenths percent and within the range percentages in tenth of percent steps such that any tenth of a percent may be a limit of a diminished range; barium oxide comprising the range from zero percent to two percent and within the range percentages in tenth of percent steps such that any tenth of a percent may be a limit of a diminished range; zinc oxide comprising the range from zero percent to two and five tenths percent and within the range percentages in tenth of percent steps such that any tenth of a percent may be a limit of a diminished range; aluminum oxide comprising the range from nineteen percent to twenty-three percent and within the range percentages in tenth of percent steps such that any tenth of a percent may be a limit of a diminished range; silicon dioxide comprising the range from sixty-two percent to seventy-two percent and within the range percentages in tenth of percent steps such that any tenth of a percent may be a limit of a diminished range; titanium dioxide comprising the range from one and five tenths percent to five and three tenths percent and within the range percentages in tenth of percent steps such that any tenth of a percent may be a limit of a diminished range; zirconium dioxide comprising the range from zero percent to two and five tenths percent and within the range percentages in tenth of percent steps such that any tenth of a percent may be a limit of a diminished range; tin dioxide comprising less than six tenths percent; with the sum of titanium dioxide plus zirconium dioxide plus tin dioxide comprising the range from two and five tenths percent to five and five tenths percent and within the range percentages in tenth of percent steps such that any tenth of a percent may be a limit of a diminished range; and phosphoric oxide comprising the range from zero percent to two percent and within the range percentages in tenth of percent steps such that any tenth of a percent may be a limit of a diminished range; it being possible to establish the darkening by adding two hundredths to five tenths percent by weight of vanadium pentoxide.

The substantial improvement in the stability of the transmission relative to temperature/time loading (subsequent darkening) is observed owing to the absence of antimony or arsenic. It is interpreted to mean that, even when the glass ceramic is used in practice at high temperatures, for example in the cooking zones of hobs, the excess trivalent antimony or arsenic is still capable of reducing the vanadium and of converting it from the non-color-imparting state to the color-imparting state. Particularly good stability of the transmission relative to subsequent time/temperature loading in practice is achieved with the stated composition range (in percent by weight, based on oxide): lithium oxide comprising the range from three and two tenths percent to four and five tenths percent and within the range percentages in tenth of percent steps such that any tenth of a percent may be a limit of a diminished range; sodium monoxide comprising the range from zero percent to one percent and within the range percentages in tenth of percent steps such that any tenth of a percent may be a limit of a diminished range; potassium monoxide comprising the range from zero percent to one percent and within the range percentages in tenth of percent steps such that any tenth of a percent may be a limit of a diminished range; with the sum of sodium monoxide plus potassium monoxide comprising the range from two tenths percent to one and five tenths percent and within the range percentages in tenth of percent steps such that any tenth of a percent may be a limit of a diminished range; magnesium oxide comprising the range from zero percent to one and five tenths percent and within the range percentages in tenth of percent steps such that any tenth of a percent may be a limit of a diminished range; calcium oxide comprising the range from zero percent to one percent and within the range percentages in tenth of percent steps such that any tenth of a percent may be a limit of a diminished range; strontium oxide comprising the range from zero percent to one and five tenths percent and within the range percentages in tenth of percent steps such that any tenth of a percent may be a limit of a diminished range; barium oxide comprising the range from zero percent to two percent and within the range percentages in tenth of percent steps such that any tenth of a percent may be a limit of a diminished range; zinc oxide comprising the range from zero percent to two percent and within the range percentages in tenth of percent steps such that any tenth of a percent may be a limit of a diminished range; aluminum oxide comprising the range from twenty percent to twenty-three percent and within the range percentages in tenth of percent steps such that any tenth of a percent may be a limit of a diminished range; silicon dioxide comprising the range from sixty-two percent to seventy percent and within the range percentages in tenth of percent steps such that any tenth of a percent may be a limit of a diminished range; titanium dioxide comprising the range from one and five tenths percent to five percent and within the range percentages in tenth of percent steps such that any tenth of a percent may be a limit of a diminished range; zirconium dioxide comprising the range from zero percent to two and four tenths percent and within the range percentages in tenth of percent steps such that any tenth of a percent may be a limit of a diminished range; tin dioxide comprising less than four tenths percent; with the sum of titanium dioxide plus zirconium dioxide plus tin dioxide comprising the range from two and five tenths percent to five and five tenths percent and within the range percentages in tenth of percent steps such that any tenth of a percent may be a limit of a diminished range; and phosphoric oxide comprising the range from zero percent to three percent and within the range percentages in tenth of percent steps such that any tenth of a percent may be a limit of a diminished range; it being possible to establish the darkening by adding two hundredths to three tenths percent by weight of vanadium pentoxide.

The environmental problems applicable to the chemical refining agents arsenic oxide and antimony oxide are also applicable to a lesser extent to barium oxide. Barium-containing raw materials, particularly when they are water-soluble, such as, for example, barium chloride and barium nitrate, are toxic and require particular precautions during use. In the glass ceramic compositions according to the invention, it is possible to dispense with the use of barium oxide, in particular with the exception of unavoidable traces.

The glass ceramic compositions according to the invention, like known glass ceramics, can be transformed by an additional thermal treatment at temperatures between about nine hundred degrees Celsius and twelve hundred degrees Celsius into a glass ceramic containing keatite solid solution. Glass ceramics of this type have a higher thermal load capacity, but at the expense of an increase in the coefficient of thermal expansion, which is of the order of magnitude of about one millionths per Kelvin between room temperature and seven hundred degrees Celsius. This transformation is as a rule associated with crystal growth, so that the transparency achievable with glass ceramics containing high-quartz solid solution is usually lost. The glass ceramics containing keatite solid solution are generally translucent to opaque white. When colored oxides are used, the white hue is correspondingly overcolored.

A glass ceramic according to one embodiment the invention or a glass ceramic produced by the method according to the invention is preferably used in transparent form as fireproof glass, a chimney inspection window, cooking utensils and, in darkened form, as a heatable plate for cooking and grilling, and as substrate material for wafer stages or mirror supports for telescopes.

The above-discussed embodiments of the present invention will be described further hereinbelow. When the word "invention" is used in this specification, the word "invention" includes "inventions", that is the plural of "invention". By stating "invention", the Applicants do not in any way admit that the present application does not include more than one patentably and non-obviously distinct invention, and maintains that this application may include more than one, patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the accompanying drawings, wherein.

DESCRIPTION OF THE PREFERRED EMBODIMENT

Figure 1:
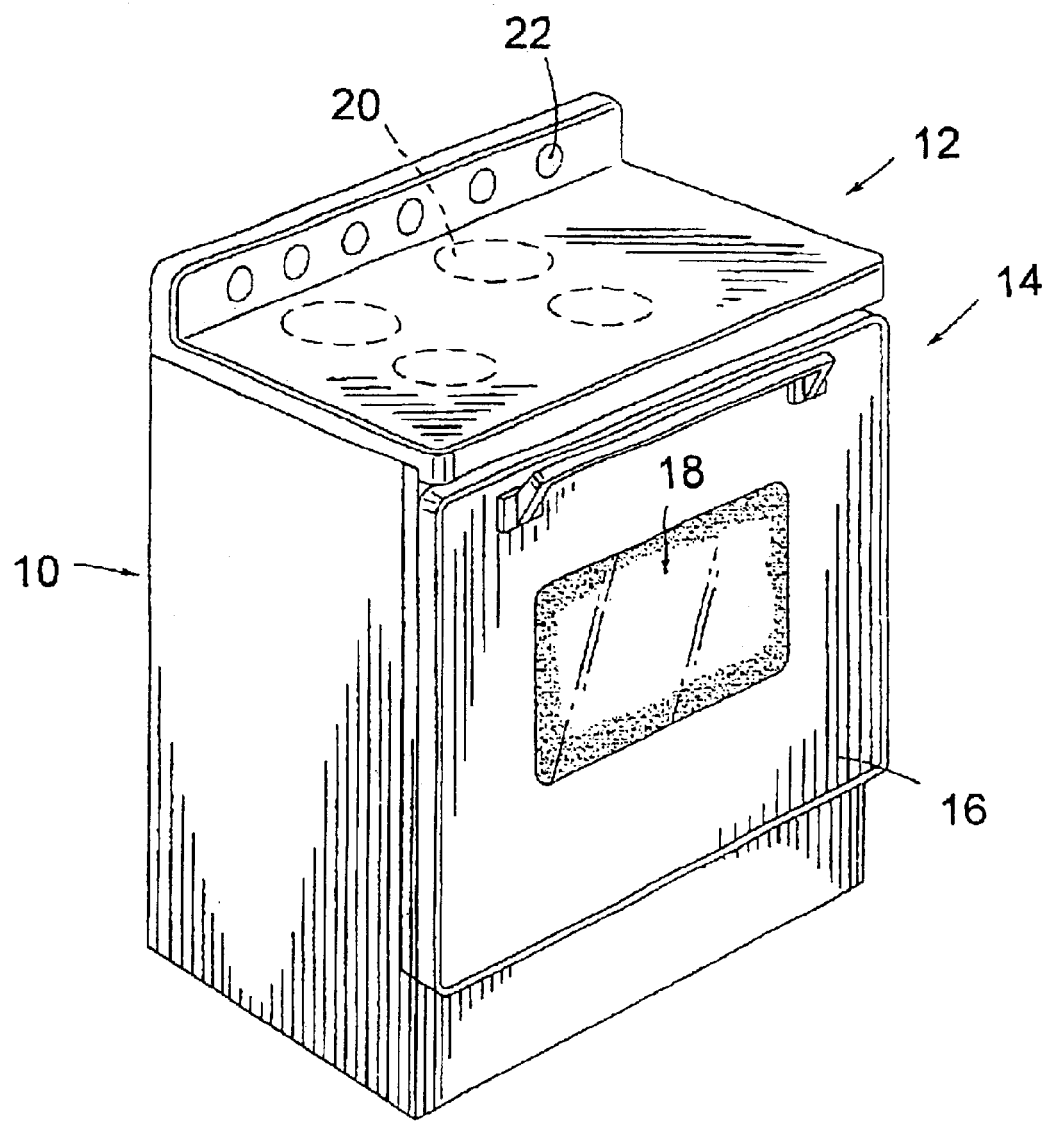
FIG. 1 is a perspective view of a stove with a cook top and oven.

FIG. 1 of the embodiment examples shows a stove 10 for cooking food with a cook top 12 and an oven 14. The oven door 16 has a window 18. Both the cook top 12 and the window 18 of the oven door 16 can comprise the glass ceramic in accordance with one embodiment of the present invention. The stove 10l has cooking zones or heat sources such as 20 that can be controlled by control apparatus 22.

Figure 2:
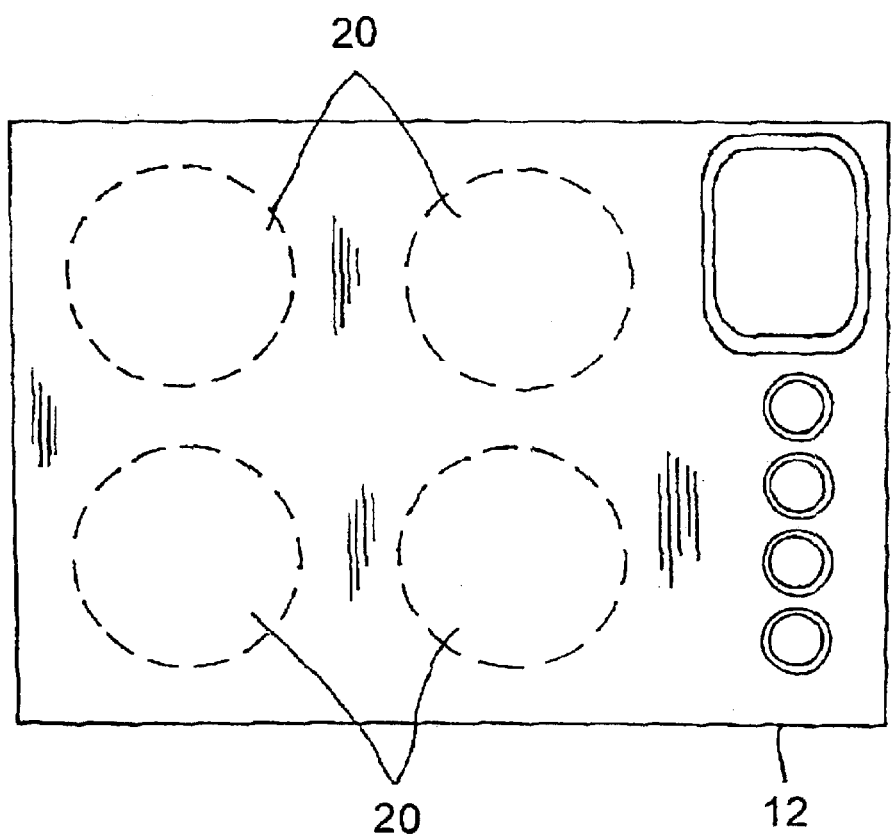
FIG. 2 is a top view of a cook top or hob with multiple cooking zones.

FIG. 2 illustrates a cook top or hob for cooking food 12 with cooking zones 20. The cook top 12 can comprise a glass ceramic in accordance with at least one embodiment of the present invention.

Figure 3:
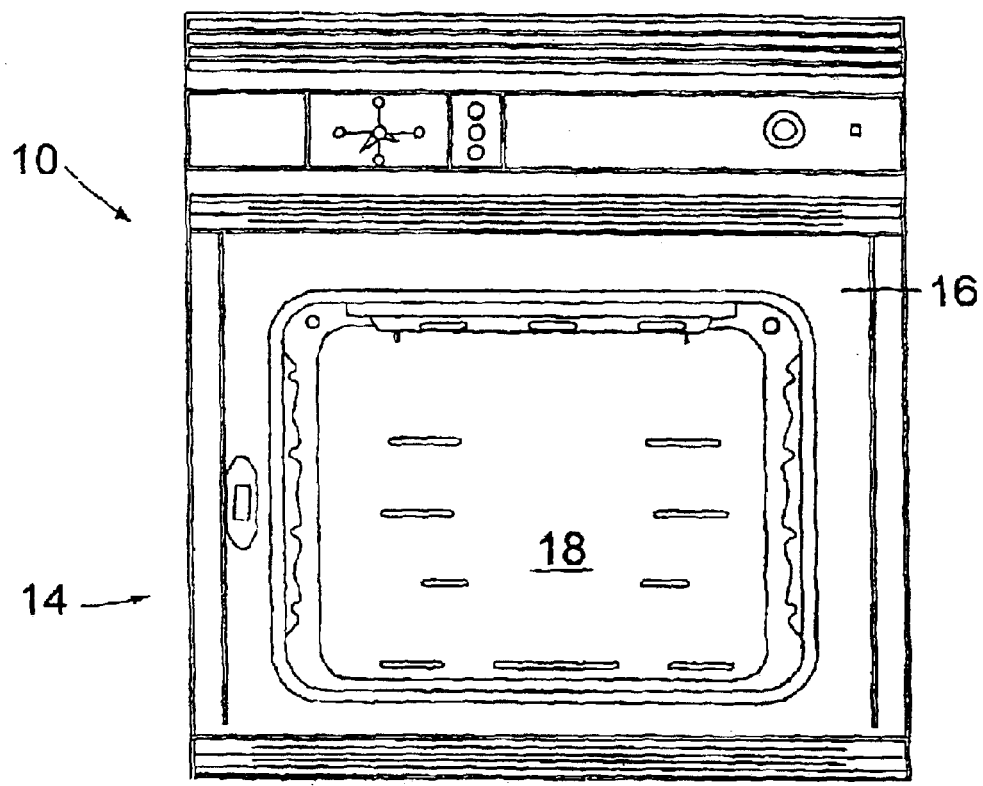
FIG. 3 is a front elevational view of a free-standing oven with an oven door window.

FIG. 3 shows a free-standing stove 10 with an oven 14 for cooking food. The stove 10 has an oven door 16. The oven door 16 has a window 18 with a glass ceramic in accordance with at least one embodiment of the present invention.

Figure 4:
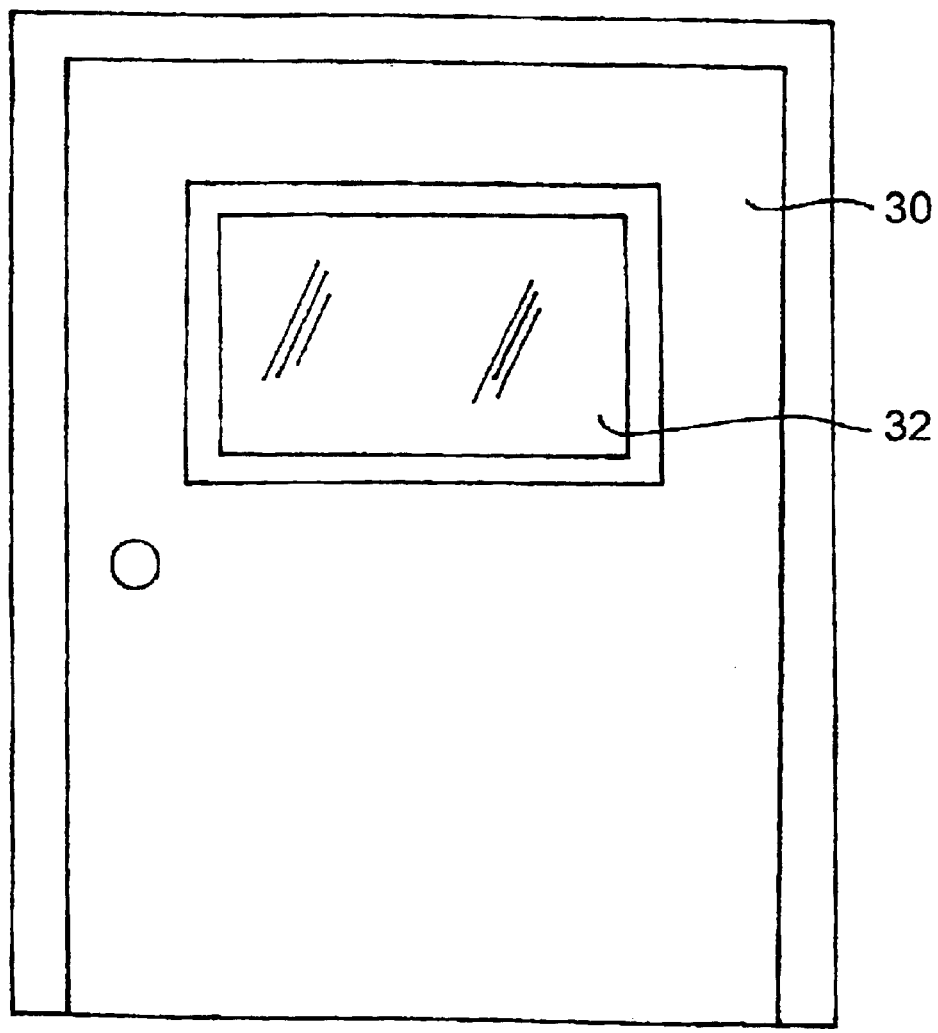
FIG. 4 shows an example of a fire protective door with a fire protective window comprised of glass ceramic.

FIG. 4 illustrates a glass ceramic in accordance with a least one embodiment of the present invention in a fireproof door 30 as fireproof glass 32.

Figure 5:
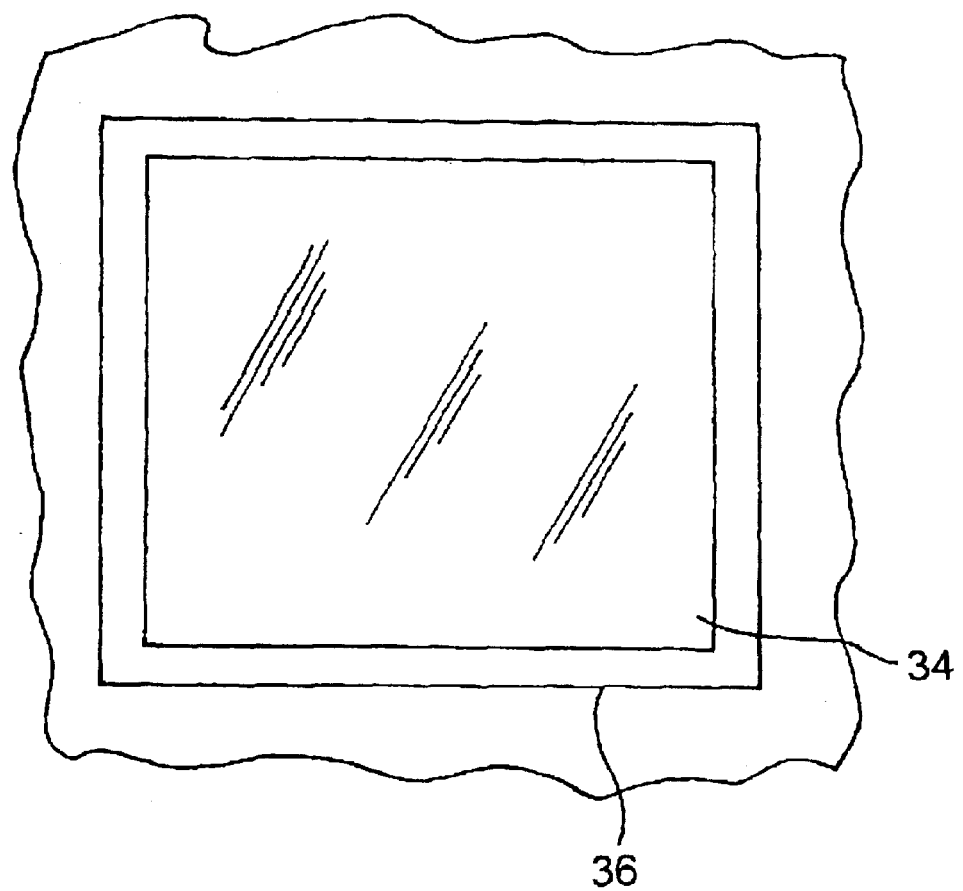
FIG. 5 shows a fire protective window.

FIG. 5 illustrates a glass ceramic in accordance with at least one embodiment of the present invention as a chimney inspection window 34 that is supported in a frame 36.

Figure 6:
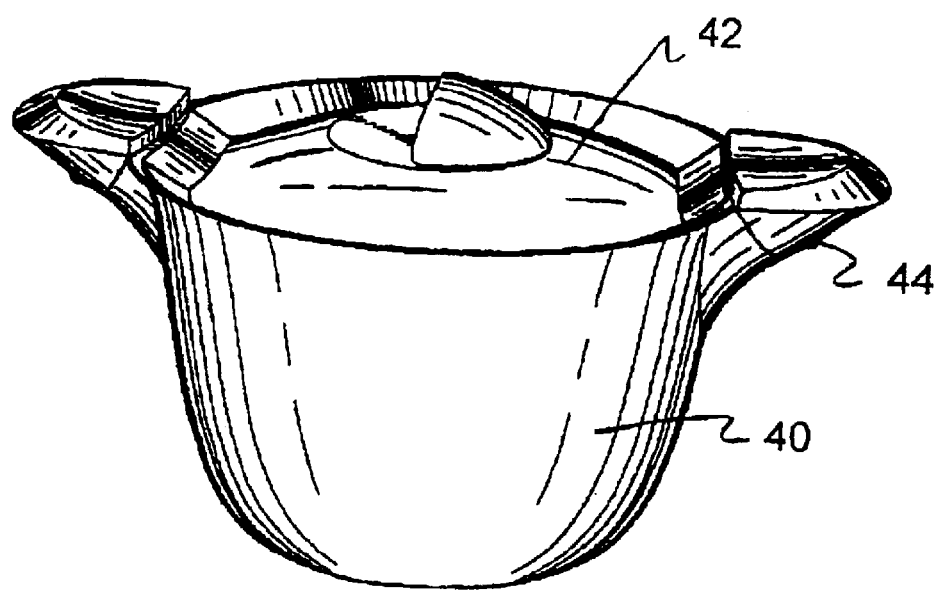
FIG. 6 illustrates an item of cookware comprising glass ceramic.

FIG. 6 illustrates as a cooking utensil an embodiment of an item of culinary ware, ovenware, direct oven-to-table cookware, and cookware, generally depicted by a vessel of cookware 40 comprising a lid 42 and handle portions 44. The item of cookware 40 comprises a glass ceramic in accordance with still other aspects of the invention.

Figure 7:
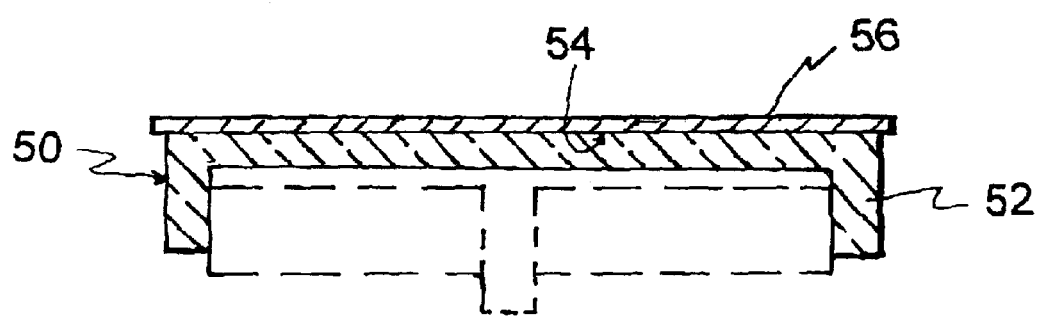
FIG. 7 glass ceramic as substrate for wafer stages.

FIG. 7 illustrates a glass ceramic substrate 50 having a ring-shaped flange portion 52 and a wafer attracting surface 54 to support a wafer 56.

Figure 8:
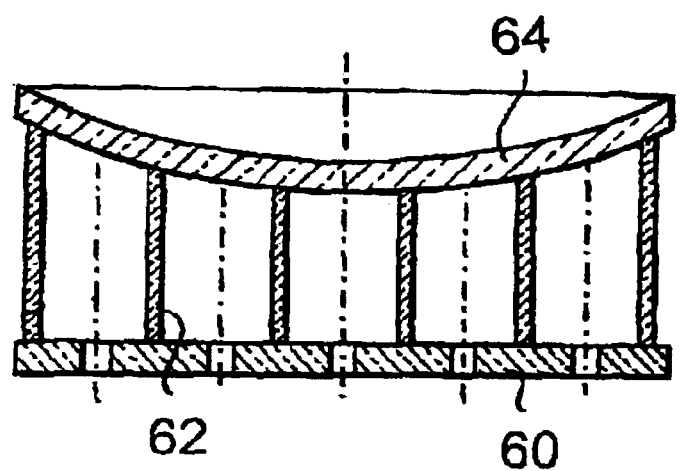
FIG. 8 illustrates a telescopic mirror support.

FIG. 8 illustrates a telescopic mirror support 60 made in accordance with one aspect of the present invention. Mirror 64 is supported on the mirror support by way of a connecting structure 62.

The present invention is further illustrated with the aid of the following examples.

For some embodiments, compositions of the glass ceramic starting glasses are shown in tables 1 and 2. Tables 1 and 3 list the properties of the associated glass ceramics.

The embodiments of table 1 illustrate the redox process which is required for coloring by vanadium oxide during the ceramization and have already been discussed in the text in particular in connection with the results of the Mössbauer measurements. The starting glasses of table 1 were melted and refined at temperatures of about one thousand six hundred twenty degrees Celsius, using raw materials customary in the glass industry. After the melting in crucibles of sintered silica glass, the melts were transferred to platinum crucibles-and homogenized at temperatures of about one thousand five hundred eighty degrees Celsius over thirty minutes. After standing at about one thousand six hundred forty degrees Celsius for one hour, castings measuring about one hundred forty by one hundred by thirty millimeters were poured and were cooled to room temperature in a cooling oven, starting from about six hundred sixty degrees Celsius. The test samples, for example rods for measuring the coefficient of thermal expansion and small plates for measuring the transmittance, were prepared from these castings. The still glassy samples were then transformed into the glass ceramic under the nucleation and crystallization conditions mentioned. After rapid heating up to six hundred degrees Celsius, heating up to the nucleation temperature and the further increase from nucleation temperature to crystallization temperature are carried out at a uniform heating rate of two and five tenths degree Celsius per minute. The cooling from maximum temperature was effected at a cooling rate of about four degrees Celsius per minute to about six hundred degrees Celsius, and thereafter by switching off the oven heating. Examples 1 and 2 are glass ceramics refined conventionally with antimony and are mentioned for comparison purposes. Through the action of the incorporated antimony as a redox partner for the vanadium oxide, it is possible to realize both transparent and darkened glass ceramics containing high-quartz solid solution as a predominant crystal phase. Comparative example 3 shows that, in the absence of antimony, it is not possible to achieve darkening with vanadium oxide alone without a redox partner. Examples 4 and 5 according to the invention show that, with the use of tin dioxide as a reducing agent, it is possible to realize both a transparent glass ceramic (example 4) and, with the addition of vanadium oxide, a darkened glass ceramic (example 5). The use of forming gas as a reducing agent is described in example 6. The forming gas having a hydrogen to nitrogen composition of five to ninety-five percent by volume was passed for three hours at two and three tenths liters per minute into the glass melt at one thousand and six hundred forty degrees Celsius. Examples 1 to 6 have the same starting composition and differ only in the additions of colored oxide, refining agent and reducing agent. Example 7 is a starting composition which is rich in the nucleating oxide titanium dioxide, because the nucleating agent zirconium dioxide is dispensed with. One tenth percent by weight of charcoal is added as reducing agent to the starting mixture for the glass melt.

The measurement of the light transmittance tau in the range of visible light is effected according to DIN 5033. The examples according to the invention show how effectively darkening by vanadium oxide is achieved with the reducing agents used. In examples 6 and 7, the opacity which is virtually complete for the human eye is achieved at four millimeters thickness. The transmittance in the visible limiting range at seven hundred nanometers is very low. By reducing the vanadium pentoxide content or the content of reducing agent, higher light transmittances and, associated therewith, higher values for the infrared radiation transmittance can also be established without problems. Likewise, the desired low values of the light transmittance can be achieved with the reducing agents used even for thicknesses smaller than four millimeters.

The castings of examples 4 and 5 are distinguished by a bubble quality as good as that of the castings of examples 1 and 2 refined conventionally with antimony, since the tin dioxide acts as a refining agent at high temperatures, as are customary for the glass ceramic melt. Comparative example 3 free of refining agent, on the other hand, has a very high bubble content but can be unambiguously characterized with regard to transmission behavior.

Owing to their content of high-quartz solid solutions as the predominant crystal phase, the embodiments of table 1 have the desired very low values of thermal expansion measured in the temperature range between room temperature and seven hundred degrees Celsius.

Further examples are evident from tables 2 and 3. Table 2 shows the composition and properties of the starting glasses. The crystal phases shown in table 2 are crystal phases critical with respect to the upper devitrification temperature. Table 3 shows the ceramization conditions and the properties of the glass ceramics obtained.

In the examples, high-temperature refining was used for achieving good bubble qualities. The composition component tin dioxide is used as a reducing agent and as a refining agent effective at high temperatures. Using raw materials customary in the glass industry, the starting glasses were melted at temperatures of about one thousand seven hundred fifty degrees Celsius in a four liters sintered silica glass crucible heated by means of high frequency. After the mixture had completely melted, refining was effected at one thousand nine hundred seventy-five degrees Celsius for one hour. Owing to the low viscosity of the glass melt, a high bubble rise rate and hence good bubble quality are achieved at the high temperatures. Before the refined glass melt was poured out, the temperature was reduced to about one thousand seven hundred fifty degrees Celsius and castings measuring about one hundred seventy by two hundred fifty by fifty millimeters were poured. To avoid stresses, the casting were cooled to room temperature in a cooling oven, beginning at a temperature of about fifteen degrees Celsius below the transformation temperature of the glasses. The test samples for the measurements were prepared from the castings.

Comparative examples 8, 9 and 10 from tables 2 and 3 correspond to commercial glass ceramics refined with aluminum oxide, and/or with or without arsenic trioxide, and/or antimony trioxide and already optimized with respect to their properties.

The upper devitrification temperatures (UDT) are, as desired, below the processing temperatures V sub A of the glasses (table 2). The critical crystal phases occurring at the UDT are shown in the table. For measuring the UDT, the glasses are melted in platinum crucibles. The platinum crucibles are then kept at various temperatures in the region of the processing temperature for five hours. The maximum temperature at which the first crystals occur determines the UDT.

The ceramization was carried out as in the preceding examples. The nucleation and crystallization conditions are shown in table 3. The heating rates correspond to those of the examples from table 1. Owing to their content of high-quartz solid solutions as the predominant crystal phase, the examples have the desired very low values for the thermal expansion, measured in the temperature range between room temperature and seven hundred degrees Celsius.

The required low light transmittance is achieved with the examples according to the invention, even without the use of arsenic trioxide or antimony trioxide. The temperature/time load capacity is substantially improved compared with comparative examples. During subsequent annealings, thermal expansion and transmittance (subsequent darkening) change to a relatively small extent. Compaction and the associated compaction stress of the glass ceramics according to the invention are improved. The annealing conditions used are stated in table 3. The compaction is measured as the change in length of a hundred millimeters long rod on annealing. The acid resistance of the glass ceramics according to the invention is measured in a material test on plates having polished surfaces according to DIN 12116. The term DIN 12116 refers to standard sheet No. 12116 of the German Standards Institute, Deutsches Institut für Normung. DIN 12116 is hereby incorporated by reference as if set forth in its entirety herein. Table 3 shows both the weight loss of the test plates on treatment with acid and the classification in the DIN class.

Example 28 describes a transparent glass ceramic which is colorable with vanadium pentoxide. Table 3 shows the properties of the glass ceramic containing high-quartz solid solution as the predominant crystal phase. By an additional thermal treatment at eleven hundred degrees Celsius for two hours, the transparent glass ceramic was transformed into a white glass ceramic containing keatite solid solution as the predominant crystal phase.

Table 1—Composition and properties of transparent glass ceramics and glass ceramics colored with vanadium pentoxide ($V_2O_5$).

EXAMPLE NO. 1

Starting composition (percent by weight): lithium oxide comprising three and eight tenths percent; sodium monoxide comprising five tenths percent; potassium monoxide comprising two tenths percent; magnesium oxide comprising nine tenths percent; barium oxide comprising one percent; zinc oxide comprising one and five tenths percent; aluminum oxide comprising twenty-one and five tenths percent; silicon dioxide comprising sixty-six and five tenths percent; titanium dioxide comprising two and four tenths percent; zirconium dioxide comprising one and seven tenths percent; Colored oxide (percent by weight): vanadium pentoxide comprising none. Reducing agent (percent by weight): antimony trioxide comprising one and five tenths percent; tin dioxide comprising none; other comprising none. Ceramization conditions: Nucleation seven hundred forty degrees Celsius; one-half hour. Crystallization eight hundred ninety degrees Celsius; one-half hour. Mössbauer measurements: Glassy antimony(III) ($Sb^{3+}$) only. Ceramized antimony (III)/antimony (V) ($Sb^{3+}/Sb^{5+}$) equal to ninety-nine to one. Properties, ceramized: Thermal expansion in millionths per Kelvin comprising four hundredths. Coloring: transparent. Light transmittance tau (percent), four millimeters thickness, comprising eighty-two and seven tenths percent. Transmittance seven hundred nanometers (percent), four millimeters thickness, comprising eighty-eight and one tenths percent; Infrared radiation transmittance one thousand six hundred nanometers (percent), four millimeters thickness comprising eighty-seven and three tenths percent.

EXAMPLE NO. 2

Starting composition (percent by weight): lithium oxide comprising three and eight tenths percent; sodium monoxide comprising five tenths percent; potassium monoxide comprising two tenths percent; magnesium oxide comprising nine tenths percent; barium oxide comprising one percent; zinc oxide comprising one and five tenths percent; aluminum oxide comprising twenty-one and five tenths percent; silicon dioxide comprising sixty-six and five tenths percent; titanium dioxide comprising two and four tenths percent; zirconium dioxide comprising one and seven tenths percent; Colored oxide (percent by weight): vanadium pentoxide comprising three tenths percent. Reducing agent (percent by weight): antimony trioxide comprising one and five tenths percent; tin dioxide comprising none; other comprising none. Ceramization conditions: Nucleation seven hundred forty degrees Celsius; one-half hour. Crystallization eight hundred ninety degrees Celsius; one-half hour. Mössbauer measurements: Glassy antimony(III) ($Sb^{3+}$) only. Ceramized antimony (III)/antimony(V) ($Sb^{3+}/Sb^{5+}$) equal to ninety-two to eight. Properties, ceramized: Thermal expansion in millionths per Kelvin comprising five hundredths. Coloring: darkened. Light transmittance tau (percent), four millimeters thickness, comprising six tenths percent. Transmittance seven hundred nanometers (percent), four millimeters thickness, comprising twelve and eight tenths percent. Infrared radiation transmittance one thousand six hundred nanometers (percent), four millimeters thickness comprising seventy-seven and one tenth percent.

EXAMPLE NO. 3

Starting composition (percent by weight): lithium oxide comprising three and eight tenths percent; sodium monoxide comprising five tenths percent; potassium monoxide comprising two tenths percent; magnesium oxide comprising nine tenths percent; barium oxide comprising one percent; zinc oxide comprising one and five tenths percent; aluminum oxide comprising twenty-one and five tenths percent; silicon dioxide comprising sixty-six and five tenths percent; titanium dioxide comprising two and four tenths percent; zirconium dioxide comprising one and seven tenths percent; Colored oxide (percent by weight): vanadium pentoxide comprising three tenths percent. Reducing agent (percent by weight): antimony trioxide comprising none; tin dioxide comprising none; other comprising none. Ceramization conditions: Nucleation seven hundred forty degrees Celsius; one-half hour; Crystallization eight hundred ninety degrees Celsius; one-half hour. Mössbauer measurements: Glassy, none. Ceramized, none. Properties, ceramized: Thermal expansion in millionths per Kelvin comprising two hundredths. Coloring: pale green colored. Light transmittance tau (percent), four millimeters thickness, comprising twenty-nine and five tenths percent. Transmittance seven hundred nanometers (percent), four millimeters thickness, comprising sixty-seven percent; Infrared radiation transmittance one thousand and six hundred nanometers (percent), four millimeters thickness comprising eighty-four percent.

EXAMPLE NO. 4

Starting composition (percent by weight): lithium oxide comprising three and eight tenths percent; sodium monoxide comprising five tenths percent; potassium monoxide comprising two tenths percent; magnesium oxide comprising nine tenths percent; barium oxide comprising one percent; zinc oxide comprising one and five tenths percent; aluminum oxide comprising twenty-one and five tenths percent; silicon dioxide comprising sixty-six and five tenths percent; titanium dioxide comprising two and four tenths percent; zirconium dioxide comprising one and seven tenths percent; Colored oxide (percent by weight): vanadium pentoxide comprising none. Reducing agent (percent by weight): antimony trioxide comprising none; tin dioxide comprising three tenths percent; other comprising none. Ceramization conditions: Nucleation seven hundred forty degrees Celsius; one-half hour. Crystallization eight hundred ninety degrees Celsius; one-half hour. Mössbauer measurements: Glassy, tin(II)/tin(IV) (tin in the two plus valent state/tin in the four plus valent state) equal to thirty-four to sixty-six. Ceramized tin (II)/tin (IV) (tin in the two plus valent state/tin in the four plus valent state) equal to thirty to seventy. Properties, ceramized: Thermal expansion in millionths per Kelvin comprising one hundredth. Coloring: transparent. Light transmittance tau (percent), four millimeters thickness, comprising eighty-four and two tenths percent. Transmittance seven hundred nanometers (percent), four millimeters thickness, comprising eighty-eight and eight tenths percent; Infrared radiation transmittance one thousand six hundred nanometers (percent), four millimeters thickness comprising eighty-seven and six tenths percent.

EXAMPLE NO. 5

Starting composition (percent by weight): lithium oxide comprising three and eight tenths percent; sodium monoxide comprising five tenths percent; potassium monoxide comprising two tenths percent; magnesium oxide comprising nine tenths percent; barium oxide comprising one percent; zinc oxide comprising one and five tenths percent; aluminum oxide comprising twenty-one and five tenths percent; silicon dioxide comprising sixty-six and five tenths percent;

titanium dioxide comprising two and four tenths percent; zirconium dioxide comprising one and seven tenths percent; Colored oxide (percent by weight): vanadium pentoxide comprising two tenths percent. Reducing agent (percent by weight): antimony trioxide comprising none; tin dioxide comprising three tenths percent; other comprising none. Ceramization conditions: Nucleation seven hundred forty degrees Celsius; one-half hour. Crystallization eight hundred ninety degrees Celsius; one-half hour. Mössbauer measurements: Glassy antimony(II)/antimony(IV) (antimony in the two plus valent state/antimony in the four plus valent state) equal to thirty to seventy. Ceramized antimony (II)/antimony (IV) (antimony in the two plus valent state/antimony in the four plus valent state) equal to one to ninety-nine. Properties, ceramized: Thermal expansion in millionths per Kelvin comprising three hundredths. Coloring: darkened. Light transmittance tau (percent), four millimeters thickness, comprising one and one tenth percent. Transmittance seven hundred nanometers (percent), four millimeters thickness, comprising eighteen and seven tenths percent; Infrared radiation transmittance one thousand six hundred nanometers (percent), four millimeters thickness comprising seventy-nine and two tenths percent.

EXAMPLE NO. 6

Starting composition (percent by weight): lithium oxide comprising three and eight tenths percent; sodium monoxide comprising five tenths percent; potassium monoxide comprising two tenths percent; magnesium oxide comprising nine tenths percent; barium oxide comprising one percent; zinc oxide comprising one and five tenths percent; aluminum oxide comprising twenty-one and five tenths percent; silicon dioxide comprising sixty-six and five tenths percent; titanium dioxide comprising two and four tenths percent; zirconium dioxide comprising one and seven tenths percent; Colored oxide (percent by weight): vanadium pentoxide comprising three tenths percent. Reducing agent (percent by weight): antimony trioxide comprising none; tin dioxide comprising none; other comprising forming gas. Ceramization conditions: Nucleation seven hundred forty degrees Celsius; one-half hour. Crystallization eight hundred ninety degrees Celsius; one-half hour. Mössbauer measurements: Glassy comprising none. Ceramized comprising none. Properties, ceramized: Thermal expansion in millionths per Kelvin comprising thirteen hundredths. Coloring: darkened. Light transmittance tau (percent), four millimeters thickness, comprising zero and zero tenths percent. Transmittance seven hundred nanometers (percent), four millimeters thickness, comprising one percent; Infrared radiation transmittance one thousand six hundred nanometers (percent), four millimeters thickness comprising sixty-seven and eight tenths percent.

EXAMPLE NO. 7

Starting composition (percent by weight): lithium oxide comprising five and three tenths percent; sodium monoxide comprising one tenth percent; potassium monoxide comprising none; magnesium oxide comprising one tenth percent; barium oxide comprising none; zinc oxide comprising eight tenths percent; aluminum oxide comprising twenty-six percent; silicon dioxide comprising sixty-three percent; titanium dioxide comprising four and nine tenths percent; zirconium dioxide comprising none; Colored oxide (percent by weight): vanadium pentoxide comprising three tenths percent. Reducing agent (percent by weight): antimony trioxide comprising none; tin dioxide comprising none; other comprising one tenth charcoal. Ceramization conditions: Nucleation six hundred eighty degrees Celsius; two hours. Crystallization eight hundred degrees Celsius; two hours. Mössbauer measurements: Glassy comprising none. Ceramized comprising none. Properties, ceramized: Thermal expansion in millionths per Kelvin comprising minus twenty-four hundredths. Coloring: darkened. Light transmittance tau (percent), four millimeters thickness, comprising zero and zero tenths percent. Transmittance seven hundred nanometers (percent), four millimeters thickness, comprising two tenths percent; Infrared radiation transmittance one thousand and six hundred nanometers (percent), four millimeters thickness comprising sixty-seven and one tenth percent.

Table 2—Composition and properties of the starting glasses of glass ceramics according to the invention and comparative glass ceramics (examples 8, 9 and 10).

EXAMPLE NO. 8

Starting composition (percent by weight): lithium oxide comprising four percent; sodium oxide comprising three tenths percent; potassium oxide comprising three tenths percent; magnesium oxide comprising eight tenths percent; calcium oxide comprising none; strontium oxide comprising none; barium oxide comprising none; zinc oxide comprising four tenths; aluminum oxide comprising nineteen and nine tenths percent; silicon dioxide comprising sixty-eight and one tenth percent; titanium dioxide comprising four and eight tenths percent; zirconium dioxide comprising none; tin dioxide comprising none; phosphorus pentoxide comprising none; vanadium pentoxide comprising one tenth percent; other: arsenic oxide comprising one and three tenths percent. Properties, starting glass: $T_g$ (in degrees Celsius) comprising six hundred ninety degrees Celsius; $V_A$ (in degrees Celsius) comprising one thousand three hundred thirty-three degrees Celsius. Devitrification behavior: Upper devitrification temperature (in degrees Celsius) comprising one thousand two hundred forty degrees Celsius. Crystal phase: comprising mullite.

EXAMPLE NO. 9

Starting composition (percent by weight): lithium oxide comprising three and five tenths percent; sodium oxide comprising three tenths percent; potassium oxide comprising two tenths percent; magnesium oxide comprising one and two tenths percent; calcium oxide comprising none; strontium oxide comprising none; barium oxide comprising eight tenths percent; zinc oxide comprising one and six tenths percent; aluminum oxide comprising nineteen and one tenth percent; silicon dioxide comprising sixty-eight and one tenth percent; titanium dioxide comprising two and six tenths percent; zirconium dioxide comprising one and eight tenths percent; tin dioxide comprising none; phosphorus pentoxide comprising none; vanadium pentoxide comprising sixteen hundredths percent; other: arsenic oxide comprising sixty-four hundredths percent. Properties, starting glass: $T_g$ (in degrees Celsius) comprising six hundred eighty-one degrees Celsius; $V_A$ (in degrees Celsius) comprising one thousand three hundred thirty-nine degrees Celsius. Devitrification behavior: Upper devitrification temperature (in degrees Celsius) comprising one thousand two hundred sixty degrees Celsius. Crystal phase comprising mullite, baddeleyite.

EXAMPLE NO. 10

Starting composition (percent by weight): lithium oxide comprising three and seven tenths percent; sodium oxide comprising five tenths percent; potassium oxide comprising none; magnesium oxide comprising forty-five hundredths percent; calcium oxide comprising none; strontium oxide comprising none; barium oxide comprising two percent; zinc oxide comprising one and sixty-six hundredths percent; aluminum oxide comprising twenty-one and seven tenths percent; silicon dioxide comprising sixty-four and twenty-four hundredths percent; titanium dioxide comprising two and thirty-five hundredths percent; zirconium dioxide comprising one and sixty-seven hundredths percent; tin dioxide comprising none; phosphorus pentoxide comprising none; vanadium pentoxide comprising twenty-eight hundredths percent; other: antimony trioxide comprising one and twenty-one hundredths percent and arsenic oxide comprising twenty-four hundredths percent. Properties, starting glass: $T_g$ (in degrees Celsius) comprising six hundred seventy-four degrees Celsius; $V_A$ (in degrees Celsius) comprising one thousand three hundred fourteen degrees Celsius. Devitrification behavior: Upper devitrification temperature (in degrees Celsius) comprising one thousand two hundred eighty degrees Celsius. Crystal phase: comprising mullite and baddeleyite.

EXAMPLE NO. 11

Starting composition (percent by weight): lithium oxide comprising three and nine tenths percent; sodium oxide comprising four tenths percent; potassium oxide comprising three tenths percent; magnesium oxide comprising one and fifteen hundredths percent; calcium oxide comprising none; strontium oxide comprising none; barium oxide comprising none; zinc oxide comprising eighty-five hundredths percent; aluminum oxide comprising nineteen and nine tenths percent; silicon dioxide comprising sixty-nine percent; titanium dioxide comprising two and four tenths percent; zirconium dioxide comprising one and seven tenths percent; tin dioxide comprising one tenth percent; phosphorus pentoxide comprising none; vanadium pentoxide comprising three tenths percent; other comprising none. Properties, starting glass: $T_g$ (in degrees Celsius) comprising six hundred eighty-one degrees Celsius; $V_A$ (in degrees Celsius) comprising one thousand three hundred forty-three degrees Celsius. Devitrification behavior: Upper devitrification temperature (in degrees Celsius) comprising one thousand two hundred forty degrees Celsius. Crystal phase: comprising baddeleyite.

EXAMPLE NO. 12

Starting composition (percent by weight): lithium oxide comprising three and seven tenths percent; sodium oxide comprising five tenths percent; potassium oxide comprising none; magnesium oxide comprising five tenths percent; calcium oxide comprising none; strontium oxide comprising none; barium oxide comprising two percent; zinc oxide comprising one and seven tenths percent; aluminum oxide comprising twenty-two and two tenths percent; silicon dioxide comprising sixty-four and eight tenths percent; titanium dioxide comprising two and four tenths percent; zirconium dioxide comprising one and seven tenths percent; tin dioxide comprising two tenths percent; phosphorus pentoxide comprising none; vanadium pentoxide comprising three tenths percent; other comprising none. Properties, starting glass: $T_g$ (in degrees Celsius) comprising six hundred eighty-three degrees Celsius; $V_A$ (in degrees Celsius) comprising one thousand three hundred thirteen degrees Celsius. Devitrification behavior: Upper devitrification temperature (in degrees Celsius) comprising one thousand three hundred eight degrees Celsius. Crystal phase: comprising mullite.

EXAMPLE NO. 13

Starting composition (percent by weight): lithium oxide comprising three and forty-five hundredths percent; sodium oxide comprising six tenths percent; potassium oxide comprising four tenths percent; magnesium oxide comprising two tenths percent; calcium oxide comprising none; strontium oxide comprising none; barium oxide comprising one and two tenths percent; zinc oxide comprising one and eight tenths percent; aluminum oxide comprising nineteen and one tenth percent; silicon dioxide comprising sixty-eight and two tenths percent; titanium dioxide comprising three and seventy-seven hundredths percent; zirconium dioxide comprising one percent; tin dioxide comprising six hundredths percent; phosphorus pentoxide comprising none; vanadium pentoxide comprising twenty-two hundredths percent; other comprising none. Properties, starting glass: $T_g$ (in degrees Celsius) comprising six hundred eighty-six degrees Celsius; $V_A$ (in degrees Celsius) comprising one thousand three hundred sixty degrees Celsius. Devitrification behavior: Upper devitrification temperature (in degrees Celsius) comprising one thousand two hundred forty degrees Celsius. Crystal phase: comprising mullite.

EXAMPLE NO. 14

Starting composition (percent by weight): lithium oxide comprising three and four tenths percent; sodium oxide comprising six tenths percent; potassium oxide comprising two tenths percent; magnesium oxide comprising one percent; calcium oxide comprising none; strontium oxide comprising none; barium oxide comprising none; zinc oxide comprising sixty-seven hundredths percent; aluminum oxide comprising twenty-one and two tenths percent; silicon dioxide comprising sixty-eight and six tenths percent; titanium dioxide comprising two percent; zirconium dioxide comprising one and eighty-eight hundredths percent; tin dioxide comprising twelve hundredths percent; phosphorus pentoxide comprising none; vanadium pentoxide comprising thirty-three hundredths percent; other comprising none. Properties, starting glass: $T_g$ (in degrees Celsius) comprising six hundred ninety-nine degrees Celsius; $V_A$ (in degrees Celsius) comprising one thousand three hundred fifty-four degrees Celsius. Devitrification behavior: Upper devitrification temperature (in degrees Celsius) comprising one thousand three hundred fifty degrees Celsius. Crystal phase: comprising mullite and baddeleyite.

EXAMPLE NO. 15

Starting composition (percent by weight): lithium oxide comprising three and ninety-five hundredths percent; sodium oxide comprising three tenths percent; potassium oxide comprising two tenths percent; magnesium oxide comprising nine tenths percent; calcium oxide comprising none; strontium oxide comprising none; barium oxide comprising seven tenths percent; zinc oxide comprising none; aluminum oxide comprising twenty-one and two tenths percent; silicon dioxide comprising sixty-seven and nine tenths percent; titanium dioxide comprising two and twenty-five hundredths percent; zirconium dioxide comprising two and thirteen hundredths percent; tin dioxide comprising twenty-one hundredths percent; phosphorus pentoxide comprising none; vanadium pentoxide comprising twenty-six hundredths percent; other comprising none. Properties, starting glass: $T_g$ (in degrees Celsius) comprising seven hundred eight degrees Celsius; $V_A$ (in degrees Celsius) comprising one thousand three hundred forty-five degrees Celsius. Devitrification behavior: Upper devitrification temperature (in degrees Celsius) comprising one thousand three hundred thirty degrees Celsius. Crystal phase: comprising baddeleyite.

EXAMPLE NO. 16

Starting composition (percent by weight): lithium oxide comprising three and fifty-six hundredths percent; sodium oxide comprising five tenths percent; potassium oxide comprising two tenths percent; magnesium oxide comprising none; calcium oxide comprising twenty-five hundredths percent; strontium oxide comprising none; barium oxide comprising one and three tenths percent; zinc oxide comprising one and five tenths percent; aluminum oxide comprising twenty and five tenths percent; silicon dioxide comprising sixty-seven and five tenths percent; titanium dioxide comprising two and twelve hundredths percent; zirconium dioxide comprising two percent; tin dioxide comprising three tenths percent; phosphorus pentoxide comprising none; vanadium pentoxide comprising twenty-seven hundredths percent; other comprising none. Properties, starting glass: $T_g$ (in degrees Celsius) comprising six hundred ninety-three degrees Celsius; $V_A$ (in degrees Celsius) comprising one thousand three hundred fifty-eight degrees Celsius. Devitrification behavior: Upper devitrification temperature (in degrees Celsius) comprising one thousand three hundred fifty-five degrees Celsius. Crystal phase: comprising baddeleyite.

EXAMPLE NO. 17

Starting composition (percent by weight): lithium oxide comprising three and six tenths percent; sodium oxide comprising twenty-five hundredths percent; potassium oxide comprising two tenths percent; magnesium oxide comprising one and one tenth percent; calcium oxide comprising none; strontium oxide comprising none; barium oxide comprising eighty-eight hundredths percent; zinc oxide comprising one and fifty-five hundredths percent; aluminum oxide comprising nineteen and three tenths percent; silicon dioxide comprising sixty-eight and three tenths percent; titanium dioxide comprising two and six tenths percent; zirconium dioxide comprising one and eighty-five hundredths percent; tin dioxide comprising fourteen hundredths percent; phosphorus pentoxide comprising none; vanadium pentoxide comprising twenty-three hundredths percent; other comprising none. Properties, starting glass: $T_g$ (in degrees Celsius) comprising six hundred eighty-five degrees Celsius; $V_A$ (in degrees Celsius) comprising one thousand three hundred thirty-five degrees Celsius. Devitrification behavior: Upper devitrification temperature (in degrees Celsius) comprising one thousand two hundred ninety-three degrees Celsius. Crystal phase: comprising baddeleyite.

EXAMPLE NO. 18

Starting composition (percent by weight): lithium oxide comprising three and seventy-five hundredths percent; sodium oxide comprising sixty-five hundredths percent; potassium oxide comprising none; magnesium oxide comprising nine tenths percent; calcium oxide comprising thirty-five hundredths percent; strontium oxide comprising none; barium oxide comprising nine tenths percent; zinc oxide comprising one and five tenths percent; aluminum oxide, comprising twenty and five tenths percent; silicon dioxide comprising sixty-seven and eight hundredths percent; titanium dioxide comprising two and forty-two hundredths percent; zirconium dioxide comprising one and fifty-five hundredths percent; tin dioxide comprising none; phosphorus pentoxide comprising fifteen hundredths percent; vanadium pentoxide comprising twenty-five hundredths percent; other comprising none. Properties, starting glass: $T_g$ (in degrees Celsius) comprising six hundred seventy-six degrees Celsius; $V_A$ (in degrees Celsius) comprising one thousand three hundred twenty six degrees Celsius. Devitrification behavior: Upper devitrification temperature (in degrees Celsius) comprising one thousand two hundred sixty-five degrees Celsius. Crystal phase: comprising baddeleyite.

EXAMPLE NO. 19

Starting composition (percent by weight): lithium oxide comprising three and sixty-seven hundredths percent; sodium oxide comprising five tenths percent; potassium oxide comprising none; magnesium oxide comprising forty-seven hundredths percent; calcium oxide comprising none; strontium oxide comprising none; barium oxide comprising two percent; zinc oxide comprising one and sixty-nine hundredths percent; aluminum oxide comprising twenty-one and nine tenths percent; silicon dioxide comprising sixty-four percent; titanium dioxide comprising two and thirty-five hundredths percent; zirconium dioxide comprising one and sixty-five hundredths percent; tin dioxide comprising two tenths percent; phosphorus pentoxide comprising one and twenty-eight hundredths percent; vanadium pentoxide comprising twenty-nine hundredths percent; other comprising none. Properties, starting glass: $T_g$ (in degrees Celsius) comprising six hundred eighty degrees Celsius; $V_A$ (in degrees Celsius) comprising one thousand three hundred ten degrees Celsius. Devitrification behavior: Upper devitrification temperature (in degrees Celsius) comprising one thousand two hundred seventy-five degrees Celsius. Crystal phase: comprising mullite.

EXAMPLE NO. 20

Starting composition (percent by weight): lithium oxide comprising three and seventy-three hundredths percent; sodium oxide comprising five tenths percent; potassium oxide comprising none; magnesium oxide comprising forty-eight hundredths percent; calcium oxide comprising none; strontium oxide comprising one and thirty-six hundredths percent; barium oxide comprising none; zinc oxide comprising one and seventy-two hundredths percent; aluminum oxide comprising twenty-two and five hundredths percent; silicon dioxide comprising sixty-five and seventy-four hundredths percent; titanium dioxide comprising two and thirty-nine hundredths percent; zirconium dioxide comprising one and sixty-seven hundredths percent; tin dioxide comprising one tenth percent; phosphorus pentoxide comprising none; vanadium pentoxide comprising twenty-six hundredths percent; other comprising none. Properties, starting glass: $T_g$ (in degrees Celsius) comprising six hundred eighty-three degrees Celsius; $V_A$ (in degrees Celsius) comprising one thousand three hundred fourteen degrees Celsius. Devitrification behavior: Upper devitrification temperature (in degrees Celsius) comprising one thousand three hundred five degrees Celsius. Crystal phase: comprising mullite.

EXAMPLE NO. 21

Starting composition (percent by weight): lithium oxide comprising four percent; sodium oxide comprising three tenths percent; potassium oxide comprising three tenths percent; magnesium oxide comprising eight tenths percent; calcium oxide comprising none; strontium oxide comprising none; barium oxide comprising none; zinc oxide comprising four tenths percent; aluminum oxide comprising twenty-one and four tenths percent; silicon dioxide comprising sixty-eight and five tenths percent; titanium dioxide comprising two and three tenths percent; zirconium dioxide comprising one and seven tenths percent; tin dioxide comprising one tenth percent; phosphorus pentoxide comprising none; vanadium pentoxide comprising two tenths percent; other comprising none. Properties, starting glass: $T_g$ (in degrees Celsius) comprising six hundred ninety-three degrees Celsius; $V_A$ (in degrees Celsius) comprising one thousand three hundred forty-nine degrees Celsius. Devitrification behavior: Upper devitrification temperature (in degrees Celsius) comprising one thousand three hundred five degrees Celsius. Crystal phase: comprising mullite.

EXAMPLE NO. 22

Starting composition (percent by weight): lithium oxide comprising three and nine tenths percent; sodium oxide comprising seven tenths percent; potassium oxide comprising none; magnesium oxide comprising nine tenths percent; calcium oxide comprising none; strontium oxide comprising none; barium oxide comprising none; zinc oxide comprising one and seven tenths percent; aluminum oxide comprising twenty and thirty-seven hundredths percent; silicon dioxide comprising sixty-eight percent; titanium dioxide comprising two and forty-four hundredths percent; zirconium dioxide comprising one and fifty-nine hundredths percent; tin dioxide comprising two tenths percent; phosphorus pentoxide comprising none; vanadium pentoxide comprising two tenths percent; other comprising none. Properties, starting glass: $T_g$ (in degrees Celsius) comprising six hundred seventy-five degrees Celsius; $V_A$ (in degrees Celsius) comprising one thousand three hundred thirty-six degrees Celsius. Devitrification behavior: Upper devitrification temperature (in degrees Celsius) comprising one thousand two hundred seventy degrees Celsius. Crystal phase: comprising baddeleyite.

EXAMPLE NO. 23

Starting composition (percent by weight): lithium oxide comprising three and ninety-one hundredths percent; sodium oxide comprising sixty-eight hundredths percent; potassium oxide comprising twenty-six hundredths percent; magnesium oxide comprising one percent; calcium oxide comprising none; strontium oxide, comprising none; barium oxide comprising none; zinc oxide comprising one and seven tenths percent; aluminum oxide comprising twenty and fifty-three hundredths percent; silicon dioxide comprising sixty-seven and seven tenths, percent; titanium dioxide comprising two and forty-five hundredths percent; zirconium dioxide comprising one and five tenths percent; tin dioxide comprising two tenths percent; phosphorus pentoxide comprising none; vanadium pentoxide comprising six hundredths percent; other comprising none. Properties, starting glass: $T_g$ (in degrees Celsius) comprising six hundred seventy-eight degrees Celsius; $V_A$ (in degrees Celsius) comprising one thousand three hundred twenty-five degrees Celsius. Devitrification behavior: Upper devitrification temperature (in degrees Celsius) comprising one thousand two hundred eighty degrees Celsius. Crystal phase: comprising baddeleyite.

EXAMPLE NO. 24

Starting composition (percent by weight): lithium oxide comprising three and nine tenths percent; sodium oxide comprising six tenths percent; potassium oxide comprising three tenths percent; magnesium oxide comprising seventy-three hundredths percent; calcium oxide comprising twenty-eight hundredths percent; strontium oxide comprising none; barium oxide comprising none; zinc oxide comprising one and five tenths percent; aluminum oxide comprising twenty-one and four tenths percent; silicon dioxide comprising sixty-seven percent; titanium dioxide comprising two and forty-seven hundredths percent; zirconium dioxide comprising one and fifty-six hundredths percent; tin dioxide comprising eighteen hundredths percent; phosphorus pentoxide comprising none; vanadium pentoxide comprising eight hundredths percent; other comprising none. Properties, starting glass: $T_g$ (in degrees Celsius) comprising six hundred eighty-six degrees Celsius; VA (in degrees Celsius) comprising one thousand three hundred twenty-nine degrees Celsius. Devitrification behavior: Upper devitrification temperature (in degrees Celsius) comprising one thousand two hundred eighty-five degrees Celsius. Crystal phase: comprising baddeleyite.

EXAMPLE NO. 25

Starting composition (percent by weight): lithium oxide comprising three and eighty-six hundredths percent; sodium oxide comprising four tenths percent; potassium oxide comprising eighteen hundredths percent; magnesium oxide comprising seventy-three hundredths percent; calcium oxide comprising none; strontium oxide comprising none; barium oxide comprising none; zinc oxide comprising one and seven tenths percent; aluminum oxide comprising twenty-one and four tenths percent; silicon dioxide comprising sixty-seven and five hundredths percent; titanium dioxide comprising three and twenty-five hundredths percent; zirconium dioxide comprising one and twenty-five hundredths percent; tin dioxide comprising twelve hundredths percent; phosphorus pentoxide comprising none; vanadium pentoxide comprising six hundredths percent; other comprising none. Properties, starting glass: $T_g$ (in degrees Celsius) comprising six hundred eighty degrees Celsius; $V_A$ (in degrees Celsius) comprising one thousand three hundred twenty degrees Celsius. Devitrification behavior: Upper devitrification temperature (in degrees Celsius) comprising one thousand two hundred ninety-five degrees Celsius. Crystal phase: comprising mullite.

EXAMPLE NO. 26

Starting composition (percent by weight): lithium oxide comprising three and eighty-seven hundredths percent; sodium oxide comprising forty-one hundredths percent; potassium oxide comprising twelve hundredths percent; magnesium oxide comprising ninety-six hundredths percent; calcium oxide comprising none; strontium oxide comprising none; barium oxide comprising none; zinc oxide comprising one and seventy-five hundredths percent; aluminum oxide comprising twenty-one and four tenths percent; silicon dioxide comprising sixty-seven and three hundredths percent; titanium dioxide comprising two and forty-eight hundredths percent; zirconium dioxide comprising one and seven tenths percent; tin dioxide comprising two tenths percent; phosphorus pentoxide comprising none; vanadium pentoxide comprising eight hundredths percent; other comprising none. Properties, starting glass: $T_g$ (in degrees Celsius) comprising six hundred eighty-eight degrees Celsius; $V_A$ (in degrees Celsius) comprising one thousand three hundred twenty-three degrees Celsius. Devitrification behavior: Upper devitrification temperature (in degrees Celsius) comprising one thousand two hundred sixty-five degrees Celsius. Crystal phase: comprising mullite and baddeleyite.

EXAMPLE NO. 27

Starting composition (percent by weight): lithium oxide comprising three and eighty-four hundredths percent; sodium oxide comprising forty-two hundredths percent; potassium oxide comprising twelve hundredths percent; magnesium oxide comprising one and four hundredths percent; calcium oxide comprising none; strontium oxide comprising none; barium oxide comprising none; zinc oxide comprising one and seventy-four hundredths percent; aluminum oxide comprising twenty-one and fifteen hundredths percent; silicon dioxide comprising sixty-six and fifty-six hundredths percent; titanium dioxide comprising four and eighty-seven hundredths percent; zirconium dioxide comprising none; tin dioxide comprising two tenths percent; phosphorus pentoxide comprising none; vanadium pentoxide comprising six hundredths percent; other comprising none. Properties, starting glass: $T_g$ (in degrees Celsius) comprising six hundred sixty four degrees Celsius; $V_A$ (in degrees Celsius) comprising one thousand three hundred six degrees Celsius.
Devitrification behavior: Upper devitrification temperature (in degrees Celsius) comprising one thousand two hundred eighty-five degrees Celsius. Crystal phase: comprising mullite.

EXAMPLE NO. 28

Starting composition (percent by weight): lithium oxide comprising four and twenty-five hundredths percent; sodium oxide comprising four tenths percent; potassium oxide comprising twenty-one hundredths percent; magnesium oxide comprising one and two tenths percent; calcium oxide comprising none; strontium oxide comprising none; barium oxide comprising none; zinc oxide comprising none; aluminum oxide comprising twenty-two and seven tenths percent; silicon dioxide comprising sixty-five and fifty-four hundredths percent; titanium dioxide comprising two and eighteen hundredths percent; zirconium dioxide comprising one and ninety-five hundredths percent; tin dioxide comprising twenty-four hundredths percent; phosphorus pentoxide comprising one and thirty-three hundredths; vanadium pentoxide comprising none; other comprising none. Properties, starting glass: $T_g$ (in degrees Celsius) comprising six hundred eighty-four degrees Celsius; $V_A$ (in degrees Celsius) comprising one thousand three hundred twenty degrees Celsius. Devitrification behavior: Upper devitrification temperature (in degrees Celsius) comprising one thousand two hundred ninety-five degrees Celsius. Crystal phase: comprising baddeleyite.

Table 3—Ceramization conditions and properties of the glass ceramics according to the invention and comparative glass ceramics (examples 8, 9 and 10).

EXAMPLE NO. 8

Ceramization conditions: Nucleation: six hundred and seventy-five degrees Celsius; fifteen minutes. Crystallization: nine hundred degrees Celsius; fifteen minutes. Properties, ceramized: Thermal expansion (in millionths per Kelvin) comprising minus four hundredths. Acid resistance: weight loss (milligram per square decimeter) comprising five tenths; DIN class 1. Coloring—Darkened. Light transmittance tau (in percent), four millimeters thickness, comprising one and four tenths percent. Transmittance seven hundred nanometers (in percent), four millimeters thickness, comprising seventeen and three tenths percent. Infrared radiation transmittance one thousand and six hundred nanometers (in percent), four millimeters thickness, comprising seventy-seven percent. Changes in the properties after temperature/time loading: Thermal expansion (in millionths per Kelvin) after eight hundred and fifty degrees Celsius, thirty-two and three tenths hours, comprising eighty-four hundredths. Compaction (in micrometers per hundred millimeters) after seven hundred degrees Celcius, fifteen hours, comprising seventeen. Transmittance seven hundred nanometers (in percent), four millimeters thickness, after eight hundred degrees Celsius, one hundred hours, comprising twenty-two and two tenths. Infrared radiation transmittance one thousand six hundred nanometers (in percent), four millimeters thickness, after eight hundred degrees Celsius, one hundred hours, comprising seventy-three and seven tenths.

EXAMPLE NO. 9

Ceramization conditions: Nucleation: seven hundred and fifty degrees Celsius; fifteen minutes. Crystallization: nine hundred and three degrees Celsius; fifteen minutes. Properties, ceramized: Thermal expansion (in millionths per Kelvin) comprising minus three hundredths. Acid resistance: weight loss (milligram per square decimeter) comprising one and two tenths; DIN class 2. Coloring—Darkened. Light transmittance tau (in percent), four millimeters thickness, comprising one percent. Transmittance seven hundred nanometers (in percent), four millimeters thickness, comprising seventeen and seven tenths percent. Infrared radiation transmittance one thousand and six hundred nanometers (in percent), four millimeters thickness, comprising seventy-eight and nine tenths percent. Changes in the properties after temperature/time loading: Thermal expansion (in millionths per Kelvin) after eight hundred and fifty degrees Celsius, thirty-two and three tenths hours, comprising sixteen hundredths. Compaction (in micrometers per hundred millimeters) after seven hundred degrees Celcius, fifteen hours, comprising fourteen. Transmittance seven hundred nanometers (in percent), four millimeters thickness, after eight hundred degrees Celsius, one hundred hours, comprising ten and nine tenths. Infrared radiation transmittance one thousand six hundred nanometers (in percent), four millimeters thickness, after eight hundred degrees Celsius, one hundred hours, comprising seventy-seven and three tenths.

EXAMPLE NO. 10

Ceramization conditions: Nucleation: seven hundred and fifty degrees Celsius; fifteen minutes. Crystallization: eight hundred eighty-seven degrees Celsius; fifteen minutes. Properties, ceramized: Thermal expansion (in millionths per Kelvin) comprising minus thirteen hundredths. Acid resistance: weight loss (milligram per square decimeter) comprising three and three tenths; DIN class 3. Coloring—Darkened. Light transmittance tau (in percent), four millimeters thickness, comprising one and six tenths percent. Transmittance seven hundred nanometers (in percent), four millimeters thickness, comprising twenty-three and two tenths percent. Infrared radiation transmittance one thousand six hundred nanometers (in percent), four millimeters thickness, comprising seventy-nine and eight tenths percent. Changes in the properties after temperature/time loading: Thermal expansion (in millionths per Kelvin) after eight hundred fifty degrees Celsius, thirty-two and three tenths hours, comprising thirty-three hundredths. Compaction (in micrometers per hundred millimeters) after seven hundred degrees Celcius, fifteen hours, comprising twenty-three. Transmittance seven hundred nanometers (in percent), four millimeters thickness, after eight hundred degrees Celsius, one hundred hours, comprising eleven and one tenth percent. Infrared radiation transmittance one thousand six hundred nanometers (in percent), four millimeters thickness, after eight hundred degrees Celsius, one hundred hours, comprising seventy-seven and one tenth percent.

EXAMPLE NO. 11

Ceramization conditions: Nucleation: seven hundred and sixty degrees Celsius; fifteen minutes. Crystallization: eight hundred ninety-two degrees Celsius; fifteen minutes. Properties, ceramized: Thermal expansion (in millionths per Kelvin) comprising two hundredths. Acid resistance: weight loss (milligram per square decimeter) comprising six tenths; DIN class—1. Coloring—darkened. Light transmittance tau (in percent), four millimeters thickness, comprising five tenths percent. Transmittance seven hundred nanometers (in percent), four millimeters thickness, comprising eleven and seven tenths percent. Infrared radiation transmittance one thousand six hundred nanometers (in percent), four millimeters thickness, comprising seventy-three percent. Changes in the properties after temperature/time loading: Thermal expansion (in millionths per Kelvin) after eight hundred fifty degrees Celsius, thirty-two and three tenths hours, comprising minus one hundredth. Compaction (in micrometers per hundred millimeters) after seven hundred degrees Celcius, fifteen hours, comprising seven. Transmittance seven hundred nanometers (in percent), four millimeters thickness, after eight hundred degrees Celsius, one hundred hours, comprising ten and six tenths percent. Infrared radiation transmittance one thousand six hundred nanometers (in percent), four millimeters thickness, after eight hundred degrees Celsius, one hundred hours, comprising seventy-two and seven tenths percent.

EXAMPLE NO. 12

Ceramization conditions: Nucleation: seven hundred and sixty five degrees Celsius; fifteen minutes. Crystallization: eight hundred eighty-nine degrees Celsius; fifteen minutes. Properties, ceramized: Thermal expansion (in millionths per Kelvin) comprising minus eight hundredths. Acid resistance: weight loss (milligram per square decimeter) comprising two and one tenth; DIN class 3. Coloring—Darkened. Light transmittance tau (in percent), four millimeters thickness, comprising one tenth percent. Transmittance seven hundred nanometers (in percent), four millimeters thickness, comprising five and seven tenths percent. Infrared radiation transmittance one thousand six hundred nanometers (in percent), four millimeters thickness, comprising seventy-four and five tenths percent. Changes in the properties after temperature/time loading: Thermal expansion (in millionths per Kelvin) after eight hundred fifty degrees Celsius, thirty-two and three tenths hours, comprising zero and zero tenths. Compaction (in micrometers per hundred millimeters) after seven hundred degrees Celcius, fifteen hours, comprising ten. Transmittance seven hundred nanometers (in percent), four millimeters thickness, after eight hundred degrees Celsius, one hundred hours, comprising five and nine tenths percent. Infrared radiation transmittance one thousand six hundred nanometers (in percent), four millimeters thickness, after eight hundred degrees Celsius, one hundred hours, comprising seventy-three and nine tenths percent.

EXAMPLE NO. 13

Ceramization conditions: Nucleation: seven hundred sixty degrees Celsius; fifteen minutes. Crystallization: nine hundred nineteen degrees Celsius; fifteen minutes. Properties, ceramized: Thermal expansion (in millionths per Kelvin) comprising minus one hundredth. Acid resistance: weight loss (milligram per square decimeter) comprising seven tenths; DIN class—1–2. Coloring—Darkened. Light transmittance tau (in percent), four millimeters thickness, comprising zero and zero tenths percent. Transmittance seven hundred nanometers (in percent), four millimeters thickness, comprising three and four tenths percent. Infrared radiation transmittance one thousand six hundred nanometers (in percent), four millimeters thickness, comprising seventy-nine and four tenths percent. Changes in the properties after temperature/time loading: Thermal expansion (in millionths per Kelvin) after eight hundred fifty degrees Celsius, thirty-two and three tenths hours, comprising minus six hundredths. Compaction (in micrometers per hundred millimeters) after seven hundred degrees Celcius, fifteen hours, comprising five. Transmittance seven hundred nanometers (in percent), four millimeters thickness, after eight hundred degrees Celsius, one hundred hours, comprising four and eight tenths percent. Infrared radiation transmittance one thousand six hundred nanometers (in percent), four millimeters thickness, after eight hundred degrees Celsius, one hundred hours, comprising seventy-eight and six tenths percent.

EXAMPLE NO. 14

Ceramization conditions: Nucleation: seven hundred seventy five degrees Celsius; fifteen minutes. Crystallization: nine hundred sixteen degrees Celsius; fifteen minutes. Properties, ceramized: Thermal expansion (in millionths per Kelvin) comprising two tenths. Acid resistance: weight loss (milligram per square decimeter) comprising six tenths; DIN class—1. Coloring—Darkened. Light transmittance tau (in percent), four millimeters thickness, comprising one and five tenths percent. Transmittance seven hundred nanometers (in percent), four millimeters thickness, comprising eighteen and nine tenths percent. Infrared radiation transmittance one thousand six hundred nanometers (in percent), four millimeters thickness, comprising seventy-four and three tenths percent. Changes in the properties after temperature/time loading: Thermal expansion (in millionths per Kelvin) after eight hundred fifty degrees Celsius, thirty-two and three tenths hours, comprising thirty-four hundredths. Compaction (in micrometers per hundred millimeters) after seven hundred degrees Celcius, fifteen hours, comprising five. Transmittance seven hundred nanometers (in percent), four millimeters thickness, after eight hundred degrees Celsius, one hundred hours, comprising eighteen and two tenths percent. Infrared radiation transmittance one thousand six hundred nanometers (in percent), four millimeters thickness, after eight hundred degrees Celsius, one hundred hours, comprising seventy-three and seven tenths percent.

EXAMPLE NO. 15

Ceramization conditions: Nucleation: seven hundred eighty five degrees Celsius; fifteen minutes. Crystallization: nine hundred sixteen degrees Celsius; fifteen minutes. Properties, ceramized: Thermal expansion (in millionths per Kelvin) comprising minus one hundredth. Acid resistance: weight loss (milligram per square decimeter) comprising one and two tenths; DIN class—2. Coloring—Darkened. Light transmittance tau (in percent), four millimeters thickness, comprising five tenths percent. Transmittance seven hundred nanometers (in percent), four millimeters thickness, comprising twelve and two tenths percent. Infrared radiation transmittance one thousand six hundred nanometers (in percent), four millimeters thickness, comprising seventy and six tenths percent. Changes in the properties after temperature/time loading: Thermal expansion (in millionths per Kelvin) after eight hundred and fifty degrees Celsius, thirty-two and three tenths hours, comprising eight hundredths. Compaction (in micrometers per hundred millimeters) after seven hundred degrees Celcius, fifteen hours, comprising four. Transmittance seven hundred nanometers (in percent), four millimeters thickness, after eight hundred degrees Celsius, one hundred hours, comprising eleven and two tenths percent. Infrared radiation transmittance one thousand six hundred nanometers (in percent), four millimeters thickness, after eight hundred degrees Celsius, one hundred hours, comprising seventy and two tenths percent.

EXAMPLE NO. 16

Ceramization conditions: Nucleation: seven hundred sixty five degrees Celsius; fifteen minutes. Crystallization: nine hundred fifteen degrees Celsius; fifteen minutes. Properties, ceramized: Thermal expansion (in millionths per Kelvin) comprising minus fifty-one hundredths. Acid resistance: weight loss (milligram per square decimeter) comprising one and six tenths; DIN class—3. Coloring—Darkened. Light transmittance tau (in percent), four millimeters thickness, comprising two tenths percent. Transmittance seven hundred nanometers (in percent), four millimeters thickness, comprising seven and five tenths percent. Infrared radiation transmittance one thousand six hundred nanometers (in percent), four millimeters thickness, comprising seventy and five tenths percent. Changes in the properties after temperature/time loading: Thermal expansion (in millionths per Kelvin) after eight hundred fifty degrees Celsius, thirty-two and three tenths hours, comprising minus thirty-nine hundredths. Compaction (in micrometers per hundred millimeters) after seven hundred degrees Celcius, fifteen hours, comprising eight. Transmittance seven hundred nanometers (in percent), four millimeters thickness, after eight hundred degrees Celsius, one hundred hours, comprising five and seven tenths percent. Infrared radiation transmittance one thousand six hundred nanometers (in percent), four millimeters thickness, after eight hundred degrees Celsius, one hundred hours, comprising seventy-one and nine tenths percent.

EXAMPLE NO. 17

Ceramization conditions: Nucleation: seven hundred fifty degrees Celsius; fifteen minutes. Crystallization: nine hundred four degrees Celsius; fifteen minutes. Properties, ceramized: Thermal expansion (in millionths per Kelvin) comprising five hundredths. Acid resistance: weight loss (milligram per square decimeter) comprising seven tenths; DIN class—2. Coloring—Darkened. Light transmittance tau (in percent), four millimeters thickness, comprising three tenths percent. Transmittance seven hundred nanometers (in percent), four millimeters thickness; comprising nine and one tenth percent. Infrared radiation transmittance one thousand six hundred nanometers (in percent), four millimeters thickness, comprising seventy and five tenths percent. Changes in the properties after temperature/time loading: Thermal expansion (in millionths per Kelvin) after eight hundred fifty degrees Celsius, thirty-two and three tenths hours, comprising one hundredth. Compaction (in micrometers per hundred millimeters) after seven hundred degrees Celcius, fifteen hours, comprising seven. Transmittance seven hundred nanometers (in percent), four millimeters thickness, after eight hundred degrees Celsius, one hundred hours, comprising seven and five tenths percent. Infrared radiation transmittance one thousand six hundred nanometers (in percent), four millimeters thickness, after eight hundred degrees Celsius, one hundred hours, comprising sixty-nine and three tenths percent.

EXAMPLE NO. 18

Ceramization conditions: Nucleation: seven hundred fifty five degrees Celsius; fifteen minutes. Crystallization: eight hundred ninety-one degrees Celsius; fifteen minutes. Properties, ceramized: Thermal expansion (in millionths per Kelvin) comprising thirteen hundredths. Acid resistance: weight loss (milligram per square decimeter) comprising one and four tenths; DIN class—2. Coloring—Darkened. Light transmittance tau (in percent), four millimeters thickness, comprising one tenth percent. Transmittance seven hundred nanometers (in percent), four millimeters thickness, comprising five and four tenths percent. Infrared radiation transmittance one thousand six hundred nanometers (in percent), four millimeters thickness, comprising seventy-four percent. Changes in the properties after temperature/time loading: Thermal expansion (in millionths per Kelvin) after eight hundred fifty degrees Celsius, thirty-two and three tenths hours, comprising forty-nine hundredths. Compaction (in micrometers per hundred millimeters) after seven hundred degrees Celcius, fifteen hours, comprising nine. Transmittance seven hundred nanometers (in percent), four millimeters thickness, after eight hundred degrees Celsius, one hundred hours, comprising four and five tenths percent. Infrared radiation transmittance one thousand six hundred nanometers (in percent), four millimeters thickness, after eight hundred degrees Celsius, one hundred hours, comprising seventy-three and two tenths percent.

EXAMPLE NO. 19

Ceramization conditions: Nucleation: seven hundred sixty degrees Celsius; fifteen minutes. Crystallization: eight hundred ninety degrees Celsius; fifteen minutes. Properties, ceramized: Thermal expansion (in millionths per Kelvin) comprising minus eighteen hundredths. Acid resistance: weight loss (milligram per square decimeter) comprising three and nine tenths; DIN class—3. Coloring—Darkened. Light transmittance tau (in percent), four millimeters thickness, comprising one tenth percent. Transmittance seven hundred nanometers (in percent), four millimeters thickness, comprising four and one tenths percent. Infrared radiation transmittance one thousand six hundred nanometers (in percent), four millimeters thickness, comprising seventy-one and three tenths percent. Changes in the properties after temperature/time loading: Thermal expansion (in millionths per Kelvin) after eight hundred fifty degrees Celsius, thirty-two and three tenths hours, comprising minus one tenth. Compaction (in micrometers per hundred millimeters) after seven hundred degrees Celcius, fifteen hours, comprising nine. Transmittance seven hundred nanometers (in percent), four millimeters thickness, after eight hundred degrees Celsius, one hundred hours, comprising four and one tenth percent. Infrared radiation transmittance one thousand six hundred nanometers (in percent), four millimeters thickness, after eight hundred degrees Celsius, one hundred hours, comprising seventy-two and five tenths percent.

EXAMPLE NO. 20

Ceramization conditions: Nucleation: seven hundred sixty degrees Celsius; fifteen minutes. Crystallization: eight hundred ninety degrees Celsius; fifteen minutes. Properties, ceramized: Thermal expansion (in millionths per Kelvin) comprising minus fifteen hundredths. Acid resistance: weight loss (milligram per square decimeter) comprising two and three tenths; DIN class—3. Coloring—Darkened. Light transmittance tau (in percent), four millimeters thickness, comprising one and seven tenths percent. Transmittance seven hundred nanometers (in percent), four millimeters thickness, comprising twenty-two percent. Infrared radiation transmittance one thousand six hundred nanometers (in percent), four millimeters thickness, comprising seventy-three and nine tenths percent. Changes in the properties after temperature/time loading: Thermal expansion (in millionths per Kelvin) after eight hundred fifty degrees Celsius, thirty-two and three tenths hours, comprising minus thirteen hundredths. Compaction (in micrometers per hundred millimeters) after seven hundred degrees Celcius, fifteen hours, comprising eleven. Transmittance seven hundred nanometers (in percent), four millimeters thickness, after eight hundred degrees Celsius, one hundred hours, comprising twenty-three and seven tenths percent. Infrared radiation transmittance one thousand six hundred nanometers (in percent), four millimeters thickness, after eight hundred degrees Celsius, one hundred hours, comprising seventy-four and six tenths percent.

EXAMPLE NO. 21

Ceramization conditions: Nucleation: seven hundred seventy five degrees Celsius; fifteen minutes. Crystallization: nine hundred eight degrees Celsius; fifteen minutes. Properties, ceramized: Thermal expansion (in millionths per Kelvin) comprising minus twenty-two hundredths. Acid resistance: weight loss (milligram per square decimeter) comprising six tenths; DIN class—1. Coloring—Darkened. Light transmittance tau (in percent), four millimeters thickness, comprising one and nine tenths percent. Transmittance seven hundred nanometers (in percent), four millimeters thickness, comprising twenty-four percent. Infrared radiation transmittance one thousand six hundred nanometers (in percent), four millimeters thickness, comprising seventy-eight and eight tenths percent. Changes in the properties after temperature/time loading: Thermal expansion (in millionths per Kelvin) after eight hundred fifty degrees Celsius, thirty-two and three tenths hours, comprising minus eleven hundredths. Compaction (in micrometers per hundred millimeters) after seven hundred degrees Celcius, fifteen hours, comprising three. Transmittance seven hundred nanometers (in percent), four millimeters thickness, after eight hundred degrees Celsius, one hundred hours, comprising twenty-two and five tenths percent. Infrared radiation transmittance one thousand six hundred nanometers (in percent), four millimeters thickness, after eight hundred degrees Celsius, one hundred hours, comprising seventy-eight and nine tenths percent.

EXAMPLE NO. 22

Ceramization conditions: Nucleation: seven hundred seventy five degrees Celsius; fifteen minutes. Crystallization: eight hundred ninety one degrees Celsius; fifteen minutes. Properties, ceramized: Thermal expansion (in millionths per Kelvin) comprising minus sixteen hundredths. Acid resistance: weight loss (milligram per square decimeter) comprising six tenths; DIN class—1. Coloring—Darkened. Light transmittance tau (in percent), four millimeters thickness, comprising one tenth percent. Transmittance seven hundred nanometers (in percent), four millimeters thickness, comprising four and nine tenths percent. Infrared radiation transmittance one thousand six hundred nanometers (in percent), four millimeters thickness, comprising seventy-four and eight tenths percent. Changes in the properties after temperature/time loading: Thermal expansion (in millionths per Kelvin) after eight hundred fifty degrees Celsius, thirty-two and three tenths hours, comprising minus two tenths. Compaction (in micrometers per hundred millimeters) after seven hundred degrees Celcius, fifteen hours, comprising eight. Transmittance seven hundred nanometers (in percent), four millimeters thickness, after eight hundred degrees Celsius, one hundred hours, comprising two and nine tenths percent. Infrared radiation transmittance one thousand six hundred nanometers (in percent), four millimeters thickness, after eight hundred degrees Celsius, one hundred hours, comprising seventy-one and five tenths percent.

EXAMPLE NO. 23

Ceramization conditions: Nucleation: seven hundred fifty degrees Celsius; fifteen minutes. Crystallization: eight hundred eighty nine degrees Celsius; fifteen minutes. Properties, ceramized: Thermal expansion (in millionths per Kelvin) comprising five hundredths. Acid resistance: weight loss (milligram per square decimeter) comprising nine tenths; DIN class—2. Coloring—Darkened. Light transmittance tau (in percent), four millimeters thickness, comprising five tenths percent. Transmittance seven hundred nanometers (in percent), four millimeters thickness, comprising fourteen percent. Infrared radiation transmittance one thousand six hundred nanometers (in percent), four millimeters thickness, comprising eighty-four percent. Changes in the properties after temperature/time loading: Thermal expansion (in millionths per Kelvin) after eight hundred fifty degrees Celsius, thirty-two and three tenths hours, comprising zero and zero tenths. Compaction (in micrometers per hundred millimeters) after seven hundred degrees Celcius, fifteen hours, comprising eight. Transmittance seven hundred nanometers (in percent), four millimeters thickness, after eight hundred degrees Celsius, one hundred hours, comprising nine and eight tenths percent. Infrared radiation transmittance one thousand six hundred nanometers (in percent), four millimeters thickness, after eight hundred degrees Celsius, one hundred hours, comprising eighty four and four tenths percent.

EXAMPLE NO. 24

Ceramization conditions: Nucleation: seven hundred sixty degrees Celsius; fifteen minutes. Crystallization: eight hundred ninety four degrees Celsius; fifteen minutes. Properties, ceramized: Thermal expansion (in millionths per Kelvin) comprising minus six hundredths. Acid resistance: weight loss (milligram per square decimeter) comprising eight tenths; DIN class—2. Coloring—Darkened. Light transmittance tau (in percent), four millimeters thickness, comprising four tenths percent. Transmittance seven hundred nanometers (in percent), four millimeters thickness, comprising thirteen and seven tenths percent. Infrared radiation transmittance one thousand six hundred nanometers (in percent), four millimeters thickness, comprising eighty-three and six tenths percent.
Changes in the properties after temperature/time loading: Thermal expansion (in millionths per Kelvin) after eight hundred fifty degrees Celsius, thirty-two and three tenths hours, comprising minus sixteen hundredths. Compaction (in micrometers per hundred millimeters) after seven hundred degrees Celcius, fifteen hours, comprising seven. Transmittance seven hundred nanometers (in percent), four millimeters thickness, after eight hundred degrees Celsius, one hundred hours, comprising ten and one tenth percent. Infrared radiation transmittance one thousand six hundred nanometers (in percent), four millimeters thickness, after eight hundred degrees Celsius, one hundred hours, comprising eight and four tenths percent.

EXAMPLE NO. 25

Ceramization conditions: Nucleation: seven hundred sixty degrees Celsius; fifteen minutes. Crystallization: eight hundred ninety two degrees Celsius; fifteen minutes. Properties, ceramized: Thermal expansion (in millionths per Kelvin) comprising minus fifteen hundredths. Acid resistance: weight loss (milligram per square decimeter) comprising six tenths; DIN class—1. Coloring—Darkened. Light transmittance tau (in percent), four millimeters thickness, comprising three tenths percent. Transmittance seven hundred nanometers (in percent), four millimeters thickness, comprising nine and two tenths percent. Infrared radiation transmittance one thousand six hundred nanometers (in percent), four millimeters thickness, comprising eighty-four and seven tenths percent. Changes in the properties after temperature/time loading: Thermal expansion (in millionths per Kelvin) after eight hundred fifty degrees Celsius, thirty-two and three tenths hours, comprising minus sixteen hundredths. Compaction (in micrometers per hundred millimeters) after seven hundred degrees Celcius, fifteen hours, comprising six. Transmittance seven hundred nanometers (in percent), four millimeters thickness, after eight hundred degrees Celsius, one hundred hours, comprising seven and two tenths percent. Infrared radiation transmittance one thousand six hundred nanometers (in percent), four millimeters thickness, after eight hundred degrees Celsius, one hundred hours, comprising eighty-four and seven tenths percent.

EXAMPLE NO. 26

Ceramization conditions: Nucleation: seven hundred sixty five degrees Celsius; fifteen minutes. Crystallization: eight hundred ninety five degrees Celsius; fifteen minutes. Properties, ceramized: Thermal expansion (in millionths per Kelvin) comprising minus fifteen hundredths. Acid resistance: weight loss (milligram per square decimeter) comprising five tenths; DIN class—1. Coloring—Darkened. Light transmittance tau (in percent), four millimeters thickness, comprising seven tenths percent. Transmittance seven hundred nanometers (in percent), four millimeters thickness, comprising eighteen and four tenths percent. Infrared radiation transmittance one thousand six hundred nanometers (in percent), four millimeters thickness, comprising eighty-two and one tenth percent. Changes in the properties after temperature/time loading: Thermal expansion (in millionths per Kelvin) after eight hundred fifty degrees Celsius, thirty-two and three tenths hours, comprising minus fourteen hundredths. Compaction (in micrometers per hundred millimeters) after seven hundred degrees Celcius, fifteen hours, comprising four. Transmittance seven hundred nanometers (in percent), four millimeters thickness, after eight hundred degrees Celsius, one hundred hours, comprising fifteen percent. Infrared radiation transmittance one thousand six hundred nanometers (in percent), four millimeters thickness, after eight hundred degrees Celsius, one hundred hours, comprising eighty-three and three tenths percent.

EXAMPLE NO. 27

Ceramization conditions: Nucleation: six hundred ninety five degrees Celsius; fifteen minutes. Crystallization: eight hundred ninety six degrees Celsius; fifteen minutes. Properties, ceramized: Thermal expansion (in millionths per Kelvin) comprising sixteen hundredths. Acid resistance: weight loss (milligram per square decimeter) comprising three tenths; DIN class—1. Coloring—Darkened. Light transmittance tau (in percent), four millimeters thickness, comprising one tenth percent. Transmittance seven hundred nanometers (in percent), four millimeters thickness, comprising four and four tenths percent. Infrared radiation transmittance one thousand six hundred nanometers (in percent), four millimeters thickness, comprising eighty-three percent. Changes in the properties after temperature/time loading: Thermal expansion (in millionths per Kelvin) after eight hundred fifty degrees Celsius, thirty-two and three tenths hours, comprising fifteen hundredths. Compaction (in micrometers per hundred millimeters) after seven hundred degrees Celcius, fifteen hours, comprising five. Transmittance seven hundred nanometers (in percent), four millimeters thickness, after eight hundred degrees Celsius, one hundred hours, comprising two and four tenths percent. Infrared radiation transmittance one thousand six hundred nanometers (in percent), four millimeters thickness, after eight hundred degrees Celsius, one hundred hours, comprising eighty-two and eight tenths percent.

EXAMPLE NO. 28

Ceramization conditions: Nucleation: seven hundred forty degrees Celsius; sixty minutes. Crystallization: eight hundred ninety eight degrees Celsius; fifteen minutes. Properties, ceramized: Thermal expansion (in millionths per Kelvin) comprising three hundredths. Acid resistance: weight loss (milligram per square decimeter) comprising two and three tenths; DIN class—3. Coloring—Transparent. Light transmittance tau (in percent), four millimeters thickness, comprising eighty-four and two tenths percent. Transmittance seven hundred nanometers (in percent), four millimeters thickness, comprising eighty-nine and one tenth percent. Infrared radiation transmittance one thousand six hundred nanometers (in percent), four millimeters thickness, comprising eighty-seven and eight tenths percent. Changes in the properties after temperature/time loading: Thermal expansion (in millionths per Kelvin) after eight hundred fifty degrees Celsius, thirty-two and three tenths hours, comprising seven hundredths. Compaction (in micrometers per hundred millimeters) after seven hundred degrees Celcius, fifteen hours, comprising six. Transmittance seven hundred nanometers (in percent), four millimeters thickness, after eight hundred degrees Celsius, one hundred hours, not measured. Infrared radiation transmittance one thousand six hundred nanometers (in percent), four millimeters thickness, after eight hundred degrees Celsius, one hundred hours, not measured.

One feature of the invention resides broadly in a transparent glass ceramic that has been darkened by adding vanadium oxide and contains high-quartz solid solutions as the predominant crystal phase, the glass ceramic, except for unavoidable traces, containing none of the chemical refining agents arsenic oxide and/or antimony oxide, characterized in that the darkened glass ceramic has a light transmittance in the visible range of tau less than five percent and an infrared radiation transmittance at sixteen hundred nanometers of more than sixty-five percent for the four millimeters thick glass ceramic, which transmittance is established by a combination of the colored oxide vanadium oxide with at least one solid, liquid and/or gaseous reducing agent added to the glass melt and treatment of the glass melt at above one thousand seven hundred fifty degrees Celsius.

Another feature of the invention resides broadly in the glass ceramic characterized in that the transparent, uncolored glass ceramic has a light transmittance in the visible range of tau greater than eighty percent.

Yet another feature of the invention resides broadly in the glass ceramic characterized in that the glass ceramic darkened by combination of the colored oxide vanadium oxide with at least one solid, liquid or gaseous reducing agent added to the glass melt has a light transmittance in the visible range of tau less than two and one-half percent and an infrared radiation transmittance at sixteen hundred nanometers of more than seventy percent for the four millimeters thick glass ceramic.

Still another feature of the invention resides broadly in the glass ceramic characterized in that, in order to achieve a low bubble count, at least one alternative chemical refining agent, such as, for example, tin dioxide, cerium dioxide, sulfate compounds, or chloride compounds, is added to the glass melt and/or the glass melt is refined physically, for example by means of reduced pressure and/or by means of high temperature.

A further feature of the invention resides broadly in the glass ceramic characterized by a composition (in percent by weight, based on oxide) of: lithium oxide comprising the range from two and five tenths percent to five and five tenths percent and within the range percentages in tenth of percent steps such that any tenth of a percent may be a limit of a diminished range; sodium monoxide comprising the range from zero percent to three percent and within the range percentages in tenth of percent steps such that any tenth of a percent may be a limit of a diminished range; potassium monoxide comprising the range from zero percent to three percent and within the range percentages in tenth of percent steps such that any tenth of a percent may be a limit of a diminished range; with the sum of sodium monoxide plus potassium monoxide comprising the range from zero to four percent and within the range percentages in tenth of percent steps such that any tenth of a percent may be a limit of a diminished range; magnesium oxide comprising the range from zero percent to three percent and within the range percentages in tenth of percent steps such that any tenth of a percent may be a limit of a diminished range; calcium oxide comprising the range from zero percent to two and five tenths percent and within the range percentages in tenth of percent steps such that any tenth of a percent may be a limit of a diminished range; strontium oxide comprising the range from zero percent to two percent and within the range percentages in tenth of percent steps such that any tenth of a percent may be a limit of a diminished range; barium oxide comprising the range from zero percent to three and five tenths percent and within the range percentages in tenth of percent steps such that any tenth of a percent may be a limit of a diminished range; zinc oxide comprising the range from zero percent to three and five tenths percent and within the range percentages in tenth of percent steps such that any tenth of a percent may be a limit of a diminished range; aluminum oxide comprising the range from eighteen percent to twenty-seven percent and within the range percentages in tenth of percent steps such that any tenth of a percent may be a limit of a diminished range; silicon dioxide comprising the range from fifty-two percent to seventy-five percent and within the range percentages in tenth of percent steps such that any tenth of a percent may be a limit of a diminished range; titanium dioxide comprising the range from one and two tenths percent to five and five tenths percent and within the range percentages in tenth of percent steps such that any tenth of a percent may be a limit of a diminished range; zirconium dioxide comprising the range from zero percent to three percent and within the range percentages in tenth of percent steps such that any tenth of a percent may be a limit of a diminished range; tin dioxide comprising less than one percent; with the sum of titanium dioxide plus zirconium dioxide plus tin dioxide comprising the range from two percent to 6 percent and within the range percentages in tenth of percent steps such that any tenth of a percent may be a limit of a diminished range; and phosphoric oxide comprising the range from zero percent to eight percent and within the range percentages in tenth of percent steps such that any tenth of a percent may be a limit of a diminished range; it being possible to establish the darkening by adding two hundredths to six tenth percent by weight of vanadium pentoxide and optionally by adding further color-imparting components, such as chromium, manganese, iron, cobalt, copper, nickel, selenium or chlorine compounds, for promoting the coloring and establishing of certain color locations.

Another feature of the invention resides broadly in the glass ceramic characterized by a titanium dioxide content of less than three percent by weight, preferably less than two and one-half percent by weight.

Yet another feature of the invention resides broadly in the glass ceramic characterized in that the reducing agents are the composition component tin dioxide, metals, carbon and/or oxidizable carbon compounds and/or metal compounds, the reducing agent preferably being added to the starting mixture of the glass melt.

Still another feature of the invention resides broadly in the glass ceramic characterized by high devitrification resistance with an upper devitrification limit below the processing temperature V subscript A and a composition (in percent by weight, based on oxide) of: lithium oxide comprising the range from three percent to four and five tenths percent and within the range percentages in tenth of percent steps such that any tenth of a percent may be a limit of a diminished range; sodium monoxide comprising the range from zero percent to one and five tenths percent and within the range percentages in tenth of percent steps such that any tenth of a percent may be a limit of a diminished range; potassium monoxide comprising the range from zero percent to one and five tenths percent and within the range percentages in tenth of percent steps such that any tenth of a percent may be a limit of a diminished range; with the sum of sodium monoxide plus potassium monoxide comprising the range from two tenths percent to two percent and within the range percentages in tenth of percent steps such that any tenth of a percent may be a limit of a diminished range; magnesium oxide comprising the range from zero percent to two percent and within the range percentages in tenth of percent steps such that any tenth of a percent may be a limit of a diminished range; calcium oxide comprising the range from zero percent to two percent and within the range percentages in tenth of percent steps such that any tenth of a percent may be a limit of a diminished range; strontium oxide comprising the range from zero percent to two percent and within the range percentages in tenth of percent steps such that any tenth of a percent may be a limit of a diminished range; barium oxide comprising the range from zero percent to three percent and within the range percentages in tenth of percent steps such that any tenth of a percent may be a limit of a diminished range; zinc oxide comprising the range from zero percent to two and five tenths percent and within the range percentages in tenth of percent steps such that any tenth of a percent may be a limit of a diminished range; aluminum oxide comprising the range from nineteen percent to twenty-three percent and within the range percentages in tenth of percent steps such that any tenth of a percent may be a limit of a diminished range; silicon dioxide comprising the range from fifty-two percent to seventy percent and within the range percentages in tenth of percent steps such that any tenth of a percent may be a limit of a diminished range; titanium dioxide comprising the range from one and five tenths percent to five and three tenths percent and within the range percentages in tenth of percent steps such that any tenth of a percent may be a limit of a diminished range; zirconium dioxide comprising the range from zero percent to two and four tenths percent and within the range percentages in tenth of percent steps such that any tenth of a percent may be a limit of a diminished range; tin dioxide comprising less than five tenths percent; with the sum of titanium dioxide plus zirconium dioxide plus tin dioxide comprising the range from two and five tenths percent to five and five tenths percent and within the range percentages in tenth of percent steps such that any tenth of a percent may be a limit of a diminished range; and phosphoric oxide comprising the range from zero percent to eight percent and within the range percentages in tenth of percent steps such that any tenth of a percent may be a limit of a diminished range; it being possible to establish the darkening by adding two hundredths to six tenths percent by weight of vanadium pentoxide.

A further feature of the invention resides broadly in the glass ceramic characterized by a high temperature/time load capacity with respect to changes in the thermal expansion and the compaction and compaction stress with a composition (in percent by weight, based on oxide) of: lithium oxide comprising the range from three and two tenths percent to four and five tenths percent and within the range percentages in tenth of percent steps such that any tenth of a percent may be a limit of a diminished range; sodium monoxide comprising the range from zero percent to one percent and within the range percentages in tenth of percent steps such that any tenth of a percent may be a limit of a diminished range; potassium monoxide comprising the range from zero percent to one percent and within the range percentages in tenth of percent steps such that any tenth of a percent may be a limit of a diminished range; with the sum of sodium monoxide plus potassium monoxide comprising the range from two tenths percent to one and five tenths percent and within the range percentages in tenth of percent steps such that any tenth of a percent may be a limit of a diminished range; magnesium oxide comprising the range from zero percent to one and five tenths percent and within the range percentages in tenth of percent steps such that any tenth of a percent may be a limit of a diminished range; calcium oxide comprising the range from zero percent to one percent and within the range percentages in tenth of percent steps such that any tenth of a percent may be a limit of a diminished range; strontium oxide comprising the range from zero percent to one and five tenths percent and within the range percentages in tenth of percent steps such that any tenth of a percent may be a limit of a diminished range; barium oxide comprising the range from zero percent to two and five tenths percent and within the range percentages in tenth of percent steps such that any tenth of a percent may be a limit of a diminished range; zinc oxide comprising the range from zero percent to two and five tenths percent and within the range percentages in tenth of percent steps such that any tenth of a percent may be a limit of a diminished range; aluminum oxide comprising the range from twenty percent to twenty-five percent and within the range percentages in tenth of percent steps such that any tenth of a percent may be a limit of a diminished range; silicon dioxide comprising the range from sixty percent to seventy-two percent and within the range percentages in tenth of percent steps such that any tenth of a percent may be a limit of a diminished range; titanium dioxide comprising the range from one and five tenths percent to five and three tenths percent and within the range percentages in tenth of percent steps such that any tenth of a percent may be a limit of a diminished range; zirconium dioxide comprising the range from zero percent to two and four tenths percent and within the range percentages in tenth of percent steps such that any tenth of a percent may be a limit of a diminished range; tin dioxide comprising less than six tenths percent; with the sum of titanium dioxide plus zirconium dioxide plus tin dioxide comprising the range from two and five tenths percent to five and five tenths percent and within the range percentages in tenth of percent steps such that any tenth of a percent may be a limit of a diminished range; and phosphoric oxide comprising the range from zero percent to three percent and within the range percentages in tenth of percent steps such that any tenth of a percent may be a limit of a diminished range; it being possible to establish the darkening by adding two hundredths to five tenths percent by weight of vanadium pentoxide.

Another feature of the invention resides broadly in the glass ceramic characterized by good chemical resistance and a composition (in percent by weight, based on oxide) of: lithium oxide comprising the range from three and two tenths percent to four and five tenths percent and within the range percentages in tenth of percent steps such that any tenth of a percent may be a limit of a diminished range; sodium monoxide comprising the range from zero percent to one percent and within the range percentages in tenth of percent steps such that any tenth of a percent may be a limit of a diminished range; potassium monoxide comprising the range from zero percent to one percent and within the range percentages in tenth of percent steps such that any tenth of a percent may be a limit of a diminished range; with the sum of sodium monoxide plus potassium monoxide comprising the range from two tenths percent to one and five tenths percent and within the range percentages in tenth of percent steps such that any tenth of a percent may be a limit of a diminished range; magnesium oxide comprising the range from zero percent to two percent and within the range percentages in tenth of percent steps such that any tenth of a percent may be a limit of a diminished range; calcium oxide comprising the range from zero percent to one percent and within the range percentages in tenth of percent steps such that any tenth of a percent may be a limit of a diminished range; strontium oxide comprising the range from zero percent to one and five tenths percent and within the range percentages in tenth of percent steps such that any tenth of a percent may be a limit of a diminished range; barium oxide comprising the range from zero percent to two percent and within the range percentages in tenth of percent steps such that any tenth of a percent may be a limit of a diminished range; zinc oxide comprising the range from zero percent to two and five tenths percent and within the range percentages in tenth of percent steps such that any tenth of a percent may be a limit of a diminished range; aluminum oxide comprising the range from nineteen percent to twenty-three percent and within the range percentages in tenth of percent steps such that any tenth of a percent may be a limit of a diminished range; silicon dioxide comprising the range from sixty-two percent to seventy-two percent and within the range percentages in tenth of percent steps such that any tenth of a percent may be a limit of a diminished range; titanium dioxide comprising the range from one and five tenths percent to five and three tenths percent and within the range percentages in tenth of percent steps such that any tenth of a percent may be a limit of a diminished range; zirconium dioxide comprising the range from zero percent to two and five tenths percent and within the range percentages in tenth of percent steps such that any tenth of a percent may be a limit of a diminished range; tin dioxide comprising less than six tenths percent; with the sum of titanium dioxide plus zirconium dioxide plus tin dioxide comprising the range from two and five tenths percent to five and five tenths percent and within the range percentages in tenth of percent steps such that any tenth of a percent may be a limit of a diminished range; and phosphoric oxide comprising the range from zero percent to two percent and within the range percentages in tenth of percent steps such that any tenth of a percent may be a limit of a diminished range; it being possible to establish the darkening by adding two hundredths to five tenths percent by weight of vanadium pentoxide.

Yet another feature of the invention resides broadly in the glass ceramic characterized by outstanding stability of the transmittance relative to temperature/time loading and a composition (in % by weight, based on oxide) of: lithium oxide comprising the range from three and two tenths percent to four and five tenths percent and within the range percentages in tenth of percent steps such that any tenth of a percent may be a limit of a diminished range; sodium monoxide comprising the range from zero percent to one percent and within the range percentages in tenth of percent steps such that any tenth of a percent may be a limit of a diminished range; potassium monoxide comprising the range from zero percent to one percent and within the range percentages in tenth of percent steps such that any tenth of a percent may be a limit of a diminished range; with the sum of sodium monoxide plus potassium monoxide comprising the range from two tenths percent to one and five tenths percent and within the range percentages in tenth of percent steps such that any tenth of a percent may be a limit of a diminished range; magnesium oxide comprising the range from zero percent to one and five tenths percent and within the range percentages in tenth of percent steps such that any tenth of a percent may be a limit of a diminished range; calcium oxide comprising the range from zero percent to one percent and within the range percentages in tenth of percent steps such that any tenth of a percent may be a limit of a diminished range; strontium oxide comprising the range from zero percent to one and five tenths percent and within the range percentages in tenth of percent steps such that any tenth of a percent may be a limit of a diminished range; barium oxide comprising the range from zero percent to two percent and within the range percentages in tenth of percent steps such that any tenth of a percent may be a limit of a diminished range; zinc oxide comprising the range from zero percent to two percent and within the range percentages in tenth of percent steps such that any tenth of a percent may be a limit of a diminished range; aluminum oxide comprising the range from twenty percent to twenty-three percent and within the range percentages in tenth of percent steps such that any tenth of a percent may be a limit of a diminished range; silicon dioxide comprising the range from sixty-two percent to seventy percent and within the range percentages in tenth of percent steps such that any tenth of a percent may be a limit of a diminished range; titanium dioxide comprising the range from one and five tenths percent to five percent and within the range percentages in tenth of percent steps such that any tenth of a percent may be a limit of a diminished range; zirconium dioxide comprising the range from zero percent to two and four tenths percent and within the range percentages in tenth of percent steps such that any tenth of a percent may be a limit of a diminished range; tin dioxide comprising less than four tenths percent; with the sum of titanium dioxide plus zirconium dioxide plus tin dioxide comprising the range from two and five tenths percent to five and five tenths percent and within the range percentages in tenth of percent steps such that any tenth of a percent may be a limit of a diminished range; and phosphoric oxide comprising the range from zero percent to three percent and within the range percentages in tenth of percent steps such that any tenth of a percent may be a limit of a diminished range; it being possible to establish the darkening by adding two hundredths to three tenths percent by weight of vanadium pentoxide.

Still another feature of the invention resides broadly in the glass ceramic characterized in that the glass ceramic is technically free of barium oxide.

A further feature of the invention resides broadly in the glass ceramic characterized in that the glass ceramic is transformed into a glass ceramic containing keatite solid solution by an additional thermal treatment.

Another feature of the invention resides broadly in the method for producing a transparent glass ceramic that has been darkened by adding vanadium oxide and contains high-quartz solid solutions as the predominant crystal phase, it being possible, except for unavoidable traces, to dispense with the chemical refining agents arsenic oxide and/or antimony oxide, characterized in that the darkened glass ceramic is adjusted to a light transmittance in the visible range of tau less than five percent and an infrared radiation transmittance at sixteen hundred nanometers of more than sixty-five percent for the four millimeters thick glass ceramic by a combination of the colored oxide vanadium oxide with at least one solid, liquid and/or gaseous reducing agent added to the glass melt and treatment of the glass melt at above one thousand seven hundred fifty degrees Celsius.

Yet another feature of the invention resides broadly in the method for producing a glass ceramic characterized in that the glass composition used gives rise in the uncolored state to a glass ceramic which has a light transmittance in the visible range of tau greater than eighty percent for a four millimeters thick glass ceramic.

Still another feature of the invention resides broadly in the method for producing glass ceramic characterized in that a light transmittance in the visible range of tau less than two and one-half percent and an infrared radiation transmittance at sixteen hundred nanometers of more than seventy percent for the four millimeters thick glass ceramic darkened by combination of the colored oxide vanadium oxide with at least one solid, liquid or gaseous reducing agent added to the glass melt is established.

A further feature of the invention resides broadly in the method for producing a glass ceramic characterized in that, in order to achieve a low bubble count for the glass ceramic, at least one alternative chemical refining agent, such as, for example, tin dioxide cerium dioxide, sulfate compounds or chloride compounds, is added to the glass melt and/or the glass melt is refined physically, for example by means of reduced pressure.

Another feature of the invention resides broadly in the method for producing a glass ceramic characterized in that a composition (in percent by weight, based on oxide): lithium oxide comprising the range from two and five tenths percent to five and five tenths percent and within the range percentages in tenth of percent steps such that any tenth of a percent may be a limit of a diminished range; sodium monoxide comprising the range from zero percent to three percent and within the range percentages in tenth of percent steps such that any tenth of a percent may be a limit of a diminished range; potassium monoxide comprising the range from zero percent to three percent and within the range percentages in tenth of percent steps such that any tenth of a percent may be a limit of a diminished range; with the sum of sodium monoxide plus potassium monoxide comprising the range from zero to four percent and within the range percentages in tenth of percent steps such that any tenth of a percent may be a limit of a diminished range; magnesium oxide comprising the range from zero percent to three percent and within the range percentages in tenth of percent steps such that any tenth of a percent may be a limit of a diminished range; calcium oxide comprising the range from zero percent to two and five tenths percent and within the range percentages in tenth of percent steps such that any tenth of a percent may be a limit of a diminished range; strontium oxide comprising the range from zero percent to two percent and within the range percentages in tenth of percent steps such that any tenth of a percent may be a limit of a diminished range; barium oxide comprising the range from zero percent to three and five tenths percent and within the range percentages in tenth of percent steps such that any tenth of a percent may be a limit of a diminished range; zinc oxide comprising the range from zero percent to three and five tenths percent and within the range percentages in tenth of percent steps such that any tenth of a percent may be a limit of a diminished range; aluminum oxide comprising the range from eighteen percent to twenty-seven percent and within the range percentages in tenth of percent steps such that any tenth of a percent may be a limit of a diminished range; silicon dioxide comprising the range from fifty-two percent to seventy-five percent and within the range percentages in tenth of percent steps such that any tenth of a percent may be a limit of a diminished range; titanium dioxide comprising the range from one and two tenths percent to five and five tenths percent and within the range percentages in tenth of percent steps such that any tenth of a percent may be a limit of a diminished range; zirconium dioxide comprising the range from zero percent to three percent and within the range percentages in tenth of percent steps such that any tenth of a percent may be a limit of a diminished range; tin dioxide comprising less than one percent; with the sum of titanium dioxide plus zirconium dioxide plus tin dioxide comprising the range from two percent to 6 percent and within the range percentages in tenth of percent steps such that any tenth of a percent may be a limit of a diminished range; and phosphoric oxide comprising the range from zero percent to eight percent and within the range percentages in tenth of percent steps such that any tenth of a percent may be a limit of a diminished range, is used; the darkening being established by adding two hundredths to six tenths percent by weight of vanadium pentoxide and optionally by adding further color-imparting components, such as chromium, manganese, iron, cobalt, copper, nickel, selenium or chlorine compounds for promoting the coloring and establishing of certain color locations.

Yet another feature of the invention resides broadly in the method for producing a glass ceramic characterized in that a titanium dioxide content of less than three percent by weight is established, preferably less than two and one-half percent by weight.

Still another feature of the invention resides in the method for producing a glass ceramic characterized in that the composition component tin dioxide, metals, carbon and/or oxidizable carbon compounds and/or metal compounds are used as reducing agents, the reducing agents preferably being added to the starting mixture of the glass melt.

A further feature of the invention resides broadly in the method for producing a glass ceramic characterized in that forming gases and/or other hydrogen-containing gases are used as reducing agents, the reducing agents preferably being introduced or passed into the glass melt.

Another feature of the invention resides broadly in the method for producing a glass ceramic characterized by high devitrification resistance with an upper devitrification limit below the processing temperature $V_A$, a composition (in percent by weight, based on oxide) of: lithium oxide comprising the range from three percent to four and five tenths percent and within the range percentages in tenth of percent steps such that any tenth of a percent may be a limit of a diminished range; sodium monoxide comprising the range from zero percent to one and five tenths percent and within the range percentages in tenth of percent steps such that any tenth of a percent may be a limit of a diminished range; potassium monoxide comprising the range from zero percent to one and five tenths percent and within the range percentages in tenth of percent steps such that any tenth of a percent may be a limit of a diminished range; with the sum of sodium monoxide plus potassium monoxide comprising the range from two tenths percent to two percent and within the range percentages in tenth of percent steps such that any tenth of a percent may be a limit of a diminished range; magnesium oxide comprising the range from zero percent to two percent and within the range percentages in tenth of percent steps such that any tenth of a percent may be a limit of a diminished range; calcium oxide comprising the range from zero percent to two percent and within the range percentages in tenth of percent steps such that any tenth of a percent may be a limit of a diminished range; strontium oxide comprising the range from zero percent to two percent and within the range percentages in tenth of percent steps such that any tenth of a percent may be a limit of a diminished range; barium oxide comprising the range from zero percent to three percent and within the range percentages in tenth of percent steps such that any tenth of a percent may be a limit of a diminished range; zinc oxide comprising the range from zero percent to two and five tenths percent and within the range percentages in tenth of percent steps such that any tenth of a percent may be a limit of a diminished range; aluminum oxide comprising the range from nineteen percent to twenty-three percent and within the range percentages in tenth of percent steps such that any tenth of a percent may be a limit of a diminished range; silicon dioxide comprising the range from fifty-two percent to seventy percent and within the range percentages in tenth of percent steps such that any tenth of a percent may be a limit of a diminished range; titanium dioxide comprising the range from one and five tenths percent to five and three tenths percent and within the range percentages in tenth of percent steps such that any tenth of a percent may be a limit of a diminished range; zirconium dioxide comprising the range from zero percent to two and four tenths percent and within the range percentages in tenth of percent steps such that any tenth of a percent may be a limit of a diminished range; tin dioxide comprising less than five tenths percent; with the sum of titanium dioxide plus zirconium dioxide plus tin dioxide comprising the range from two and five tenths percent to five and five tenths percent and within the range percentages in tenth of percent steps such that any tenth of a percent may be a limit of a diminished range; and phosphoric oxide comprising the range from zero percent to eight percent and within the range percentages in tenth of percent steps such that any tenth of a percent may be a limit of a diminished range; being used and the darkening being established by adding two hundredths to six tenths percent by weight of vanadium pentoxide.

Yet another feature of the invention resides broadly in the method for producing a glass ceramic characterized by a high temperature/time load capacity with respect to changes in the thermal expansion and the compaction and compaction stress, a composition (in percent by weight, based on oxide) of: lithium oxide comprising the range from three and two tenths percent to four and five tenths percent and within the range percentages in tenth of percent steps such that any tenth of a percent may be a limit of a diminished range; sodium monoxide comprising the range from zero percent to one percent and within the range percentages in tenth of percent steps such that any tenth of a percent may be a limit of a diminished range; potassium monoxide comprising the range from zero percent to one percent and within the range percentages in tenth of percent steps such that any tenth of a percent may be a limit of a diminished range; with the sum of sodium monoxide plus potassium monoxide comprising the range from two tenths percent to one and five tenths percent and within the range percentages in tenth of percent steps such that any tenth of a percent may be a limit of a diminished range; magnesium oxide comprising the range from zero percent to one and five tenths percent and within the range percentages in tenth of percent steps such that any tenth of a percent may be a limit of a diminished range; calcium oxide comprising the range from zero percent to one percent and within the range percentages in tenth of percent steps such that any tenth of a percent may be a limit of a diminished range; strontium oxide comprising the range from zero percent to one and five tenths percent and within the range percentages in tenth of percent steps such that any tenth of a percent may be a limit of a diminished range; barium oxide comprising the range from zero percent to two and five tenths percent and within the range percentages in tenth of percent steps such that any tenth of a percent may be a limit of a diminished range; zinc oxide comprising the range from zero percent to two and five tenths percent and within the range percentages in tenth of percent steps such that any tenth of a percent may be a limit of a diminished range; aluminum oxide comprising the range from twenty percent to twenty-five percent and within the range percentages in tenth of percent steps such that any tenth of a percent may be a limit of a diminished range; silicon dioxide comprising the range from sixty percent to seventy-two percent and within the range percentages in tenth of percent steps such that any tenth of a percent may be a limit of a diminished range; titanium dioxide comprising the range from one and five tenths percent to five and three tenths percent and within the range percentages in tenth of percent steps such that any tenth of a percent may be a limit of a diminished range; zirconium dioxide comprising the range from zero percent to two and four tenths percent and within the range percentages in tenth of percent steps such that any tenth of a percent may be a limit of a diminished range; tin dioxide comprising less than six tenths percent; with the sum of titanium dioxide plus zirconium dioxide plus tin dioxide comprising the range from two and five tenths percent to five and five tenths percent and within the range percentages in tenth of percent steps such that any tenth of a percent may be a limit of a diminished range; and phosphoric oxide comprising the range from zero percent to three percent and within the range percentages in tenth of percent steps such that any tenth of a percent may be a limit of a diminished range; being used and the darkening being established by adding two hundredths to five tenths percent by weight of vanadium pentoxide.

Still another feature of the invention resides broadly in the method for producing a glass ceramic characterized by good chemical resistance, a composition (in percent by weight, based on oxide) of: lithium oxide comprising the range from three and two tenths percent to four and five tenths percent and within the range percentages in tenth of percent steps such that any tenth of a percent may be a limit of a diminished range; sodium monoxide comprising the range from zero percent to one percent and within the range percentages in tenth of percent steps such that any tenth of a percent may be a limit of a diminished range; potassium monoxide comprising the range from zero percent to one percent and within the range percentages in tenth of percent steps such that any tenth of a percent may be a limit of a diminished range; with the sum of sodium monoxide plus potassium monoxide comprising the range from two tenths percent to one and five tenths percent and within the range percentages in tenth of percent steps such that any tenth of a percent may be a limit of a diminished range; magnesium oxide comprising the range from zero percent to two percent and within the range percentages in tenth of percent steps such that any tenth of a percent may be a limit of a diminished range; calcium oxide comprising the range from zero percent to one percent and within the range percentages in tenth of percent steps such that any tenth of a percent may be a limit of a diminished range; strontium oxide comprising the range from zero percent to one and five tenths percent and within the range percentages in tenth of percent steps such that any tenth of a percent may be a limit of a diminished range; barium oxide comprising the range from zero percent to two percent and within the range percentages in tenth of percent steps such that any tenth of a percent may be a limit of a diminished range; zinc oxide comprising the range from zero percent to two and five tenths percent and within the range percentages in tenth of percent steps such that any tenth of a percent may be a limit of a diminished range; aluminum oxide comprising the range from nineteen percent to twenty-three percent and within the range percentages in tenth of percent steps such that any tenth of a percent may be a limit of a diminished range; silicon dioxide comprising the range from sixty-two percent to seventy-two percent and within the range percentages in tenth of percent steps such that any tenth of a percent may be a limit of a diminished range; titanium dioxide comprising the range from one and five tenths percent to five and three tenths percent and within the range percentages in tenth of percent steps such that any tenth of a percent may be a limit of a diminished range; zirconium dioxide comprising the range from zero percent to two and five tenths percent and within the range percentages in tenth of percent steps such that any tenth of a percent may be a limit of a diminished range; tin dioxide comprising less than six tenths percent; with the sum of titanium dioxide plus zirconium dioxide plus tin dioxide comprising the range from two and five tenths percent to five and five tenths percent and within the range percentages in tenth of percent steps such that any tenth of a percent may be a limit of a diminished range; and phosphoric oxide comprising the range from zero percent to two percent and within the range percentages in tenth of percent steps such that any tenth of a percent may be a limit of a diminished range; being used and the darkening being established by adding two hundredths to five tenths percent by weight of vanadium pentoxide.

A further feature of the invention resides broadly in the method for producing a glass ceramic as claimed in at least one of the preceding claims, characterized by outstanding stability of the transmission relative to temperature/time loading, a composition (in percent by weight, based on oxide) of: lithium oxide comprising the range from three and two tenths percent to four and five tenths percent and within the range percentages in tenth of percent steps such that any tenth of a percent may be a limit of a diminished range; sodium monoxide comprising the range from zero percent to one percent and within the range percentages in tenth of percent steps such that any tenth of a percent may be a limit of a diminished range; potassium monoxide comprising the range from zero percent to one percent and within the range percentages in tenth of percent steps such that any tenth of a percent may be a limit of a diminished range; with the sum of sodium monoxide plus potassium monoxide comprising the range from two tenths percent to one and five tenths percent and within the range percentages in tenth of percent steps such that any tenth of a percent may be a limit of a diminished range; magnesium oxide comprising the range from zero percent to one and five tenths percent and within the range percentages in tenth of percent steps such that any tenth of a percent may be a limit of a diminished range; calcium oxide comprising the range from zero percent to one percent and within the range percentages in tenth of percent steps such that any tenth of a percent may be a limit of a diminished range; strontium oxide comprising the range from zero percent to one and five tenths percent and within the range percentages in tenth of percent steps such that any tenth of a percent may be a limit of a diminished range; barium oxide comprising the range from zero percent to two percent and within the range percentages in tenth of percent steps such that any tenth of a percent may be a limit of a diminished range; zinc oxide comprising the range from zero percent to two percent and within the range percentages in tenth of percent steps such that any tenth of a percent may be a limit of a diminished range; aluminum oxide comprising the range from twenty percent to twenty-three percent and within the range percentages in tenth of percent steps such that any tenth of a percent may be a limit of a diminished range; silicon dioxide comprising the range from sixty-two percent to seventy percent and within the range percentages in tenth of percent steps such that any tenth of a percent may be a limit of a diminished range; titanium dioxide comprising the range from one and five tenths percent to five percent and within the range percentages in tenth of percent steps such that any tenth of a percent may be a limit of a diminished range; zirconium dioxide comprising the range from zero percent to two and four tenths percent and within the range percentages in tenth of percent steps such that any tenth of a percent may be a limit of a diminished range; tin dioxide comprising less than four tenths percent; with the sum of titanium dioxide plus zirconium dioxide plus tin dioxide comprising the range from two and five tenths percent to five and five tenths percent and within the range percentages in tenth of percent steps such that any tenth of a percent may be a limit of a diminished range; and phosphoric oxide comprising the range from zero percent to three percent and within the range percentages in tenth of percent steps such that any tenth of a percent may be a limit of a diminished range; being used and the darkening being established by adding two hundredths to three tenths percent by weight of vanadium pentoxide.

One feature of the invention resides broadly in the method for producing a glass ceramic characterized in that, except for unavoidable traces, no barium oxide is used for producing the glass ceramic.

Another feature of the invention resides broadly in the method for producing a glass ceramic characterized in that the glass ceramic is transformed into a glass ceramic containing keatite solid solution by an additional thermal treatment.

Yet another feature of the invention resides broadly in the use of a glass ceramic as fireproof glass, a chimney inspection window, cooking utensils and a hob, and as substrate material for wafer stages or mirror supports for telescopes.

One feature of the present invention resides broadly in a transparent glass ceramic that can be darkened by adding vanadium oxide and contains high-quartz solid solutions as the predominant crystal phase, the glass ceramic, except for unavoidable traces, containing none of the chemical refining agents arsenic oxide and/or antimony oxide and the darkened glass ceramic having a light transmittance in the visible range of tau less than five percent and an infrared radiation transmittance at sixteen hundred nanometers of more than sixty-five percent for the four millimeters thick glass ceramic, which transmittance is established by a combination of the colored oxide vanadium oxide with at least one solid, liquid and/or gaseous reducing agent added to the glass melt.

A further feature of the invention resides broadly in the glass ceramic characterized by a composition (in percent by weight, based on oxide) of: lithium oxide comprising the range from two and five tenths percent to five and five tenths percent and within the range percentages in tenth of percent steps such that any tenth of a percent may be a limit of a diminished range; sodium monoxide comprising the range from zero percent to three percent and within the range percentages in tenth of percent steps such that any tenth of a percent may be a limit of a diminished range; potassium monoxide comprising the range from zero percent to three percent and within the range percentages in tenth of percent steps such that any tenth of a percent may be a limit of a diminished range; with the sum of sodium monoxide plus potassium monoxide comprising the range from zero to four percent and within the range percentages in tenth of percent steps such that any tenth of a percent may be a limit of a diminished range; magnesium oxide comprising the range from zero percent to three percent and within the range percentages in tenth of percent steps such that any tenth of a percent may be a limit of a diminished range; calcium oxide comprising the range from zero percent to two and five tenths percent and within the range percentages in tenth of percent steps such that any tenth of a percent may be a limit of a diminished range; strontium oxide comprising the range from zero percent to two percent and within the range percentages in tenth of percent steps such that any tenth of a percent may be a limit of a diminished range; barium oxide comprising the range from zero percent to three and five tenths percent and within the range percentages in tenth of percent steps such that any tenth of a percent may be a limit of a diminished range; zinc oxide comprising the range from zero percent to three and five tenths percent and within the range percentages in tenth of percent steps such that any tenth of a percent may be a limit of a diminished range; aluminum oxide comprising the range from eighteen percent to twenty-seven percent and within the range percentages in tenth of percent steps such that any tenth of a percent may be a limit of a diminished range; silicon dioxide comprising the range from fifty-two percent to seventy-five percent and within the range percentages in tenth of percent steps such that any tenth of a percent may be a limit of a diminished range; titanium dioxide comprising the range from one and two tenths percent to five and five tenths percent and within the range percentages in tenth of percent steps such that any tenth of a percent may be a limit of a diminished range; zirconium dioxide comprising the range from zero percent to three percent and within the range percentages in tenth of percent steps such that any tenth of a percent may be a limit of a diminished range; tin dioxide comprising less than one percent; with the sum of titanium dioxide plus zirconium dioxide plus tin dioxide comprising the range from two percent to 6 percent and within the range percentages in tenth of percent steps such that any tenth of a percent may be a limit of a diminished range; and phosphoric oxide comprising the range from zero percent to eight percent and within the range percentages in tenth of percent steps such that any tenth of a percent may be a limit of a diminished range; it being possible to establish the darkening by adding two hundredths to six tenths percent by weight of vanadium pentoxide and optionally by adding further color-imparting components, such as chromium, manganese, iron, cobalt, copper, nickel, selenium or chlorine compounds, for promoting the coloring and establishing certain color locations, while the transparent glass ceramic is free of vanadium pentoxide.

Another feature of the invention resides broadly in the glass ceramic characterized by a titanium dioxide content of less than three percent by weight, preferably less than two and one-half percent by weight, in order to combine the advantages of the possibility of darkening with vanadium oxide with a slight natural color of the transparent glass ceramic.

Still another feature of the invention resides broadly in the glass ceramic characterized in that the reducing agents are forming gases and/or other hydrogen-containing gases, the reducing agents preferably being introduced or passed into the glass melt.

Yet another feature of the invention resides broadly in a method for producing a transparent glass ceramic that can be darkened by adding vanadium oxide and contains high-quartz solid solutions as the predominant crystal phase, it being possible, except for unavoidable traces, to dispense with the chemical refining agents arsenic oxide and/or antimony oxide, and the darkened glass ceramic being adjusted to a light transmittance in the visible range of tau less than five percent and an infrared radiation transmittance at sixteen hundred nanometers of more than sixty-five percent for the four millimeters thick glass ceramic by a combination of the colored oxide vanadium oxide with at least one solid, liquid and/or gaseous reducing agent added to the glass melt.

Still another feature of the invention resides broadly in the method for producing a glass ceramic characterized in that a light transmittance in the visible range of tau greater than eighty percent of the transparent, uncolored four millimeters thick glass ceramic is established.

Another feature of the invention resides broadly in the method for producing a glass ceramic characterized in that, in order to achieve a low bubble count for the glass ceramic, at least one alternative chemical refining agent, such as, for example, tin dioxide, cerium dioxide, sulfate compounds or chloride compounds, is added to the glass melt and/or the glass melt is refined physically, for example by means of reduced pressure and/or by means of high temperature.

Yet another feature of the invention resides broadly in the method for producing a glass ceramic characterized in that a composition (in percent by weight, based on oxide): lithium oxide comprising the range from two and five tenths percent to five and five tenths percent and within the range percentages in tenth of percent steps such that any tenth of a percent may be a limit of a diminished range; sodium monoxide comprising the range from zero percent to three percent and within the range percentages in tenth of percent steps such that any tenth of a percent may be a limit of a diminished range; potassium monoxide comprising the range from zero percent to three percent and within the range percentages in tenth of percent steps such that any tenth of a percent may be a limit of a diminished range; with the sum of sodium monoxide plus potassium monoxide comprising the range from zero to four percent and within the range percentages in tenth of percent steps such that any tenth of a percent may be a limit of a diminished range; magnesium oxide comprising the range from zero percent to three percent and within the range percentages in tenth of percent steps such that any tenth of a percent may be a limit of a diminished range; calcium oxide comprising the range from zero percent to two and five tenths percent and within the range percentages in tenth of percent steps such that any tenth of a percent may be a limit of a diminished range; strontium oxide comprising the range from zero percent to two percent and within the range percentages in tenth of percent steps such that any tenth of a percent may be a limit of a diminished range; barium oxide comprising the range from zero percent to three and five tenths percent and within the range percentages in tenth of percent steps such that any tenth of a percent may be a limit of a diminished range; zinc oxide comprising the range from zero percent to three and five tenths percent and within the range percentages in tenth of percent steps such that any tenth of a percent may be a limit of a diminished range; aluminum oxide comprising the range from eighteen percent to twenty-seven percent and within the range percentages in tenth of percent steps such that any tenth of a percent may be a limit of a diminished range; silicon dioxide comprising the range from fifty-two percent to seventy-five percent and within the range percentages in tenth of percent steps such that any tenth of a percent may be a limit of a diminished range; titanium dioxide comprising the range from one and two tenths percent to five and five tenths percent and within the range percentages in tenth of percent steps such that any tenth of a percent may be a limit of a diminished range; zirconium dioxide comprising the range from zero percent to three percent and within the range percentages in tenth of percent steps such that any tenth of a percent may be a limit of a diminished range; tin dioxide comprising less than one percent; with the sum of titanium dioxide plus zirconium dioxide plus tin dioxide comprising the range from two percent to 6 percent and within the range percentages in tenth of percent steps such that any tenth of a percent may be a limit of a diminished range; and phosphoric oxide comprising the range from zero percent to eight percent and within the range percentages in tenth of percent steps such that any tenth of a percent may be a limit of a diminished range; is used, the darkening being established by adding two hundredths to six tenths percent by weight of vanadium pentoxide and optionally by adding further color-imparting components, such as chromium, manganese, iron, cobalt, copper, nickel, selenium, or chlorine compounds for promoting the coloring and establishing certain color locations, while no vanadium pentoxide is added to the transparent glass ceramic.

Still another feature of the invention resides broadly in the method for producing a glass ceramic characterized in that a titanium dioxide content of less than three percent by weight is established, preferably less than two and one-half percent by weight, in order to combine the advantages of the possibility of darkening with vanadium oxide with a slight natural color of the transparent glass ceramic.

By way of further explanation, reduction of vanadium oxide takes place during the ceramization process that transforms the glass into the glass ceramic, at a crystallization of about nine hundred degrees Celsius. The slightly green colored glass becomes darkened. It is assumed that both reduction states, that is ionic vanadium in the positive four valent state and ionic vanadium in the positive three valent state are generated from the ionic vanadium in the positive five valent state present in the glass.

It is believed that this may be expressed in the following equations (1) and (2):

$$x \text{ times } V^{5+} + Me^{n+} \text{ upon ceramization} \rightarrow x \text{ times } V^{4+} + Me^{(n+x)+} \quad (1)$$

with: $n=0$, a positive, or a negative integer, and $x=1, 2, 3$, etc.

That is, it is believed that the reaction of ionic vanadium in the positive five valent state with an ionic metal in the n positive valent state, upon ceramization, yields ionic vanadium in the positive four valent state and also an ionic metal in the positive n plus x valent state. In other words, the metal reduces vanadium from the five valent state to the four valent state.

$$y \text{ times } V^{5+} + Me^{n+} \text{ upon ceramization} \rightarrow y \text{ times } V^{3+} + Me^{(n+2 \cdot y)+} \quad (2)$$

with: $y=\frac{1}{2}, 1, 3/2$, etc., and $n=0$, a positive, or a negative integer.

That is, it is believed that according to equation (2) the reaction of ionic vanadium in the positive five valent state with an ionic metal in the positive n valent state, upon ceramization, yields ionic vanadium in the positive three valent state and also an ionic metal in the positive n plus x valent state. In other words, the metal reduces the vanadium from the five valent state to the three valent state.

For example, using tin as a reducing agent in equation (1):

$$2V^{5+} + Sn^{2+} \text{ upon ceramization} \rightarrow 2V^{4+} + Sn^{4+}$$

That is, the reaction of ionic vanadium in the positive five valent state with ionic tin in the positive two valent state, upon ceramization yields ionic vanadium in the positive four valent state and also ionic tin in the positive four valent state. In other words, the tin reduces the vanadium from the five valent state to the four valent state.

Using, for example, tin as a reducing agent in equation (2):

$$V^{5+} + Sn^{2+} \text{ upon ceramization} \rightarrow V^{3+} + Sn^{4+}$$

That is, the reaction of ionic vanadium in the positive five valent state with ionic tin in the positive two valent state, upon ceramization, yields ionic vanadium in the positive three valent state and also ionic tin in the positive four valent state. In other words, the tin reduces the vanadium from the five valent stet to the three valent state.

All the ranges given herein, such as percent ranges, temperature ranges, residence time or hold time ranges, and distances, are to be understood to include within the range fractions in at least a tenth, or smaller, of steps such that any tenth may be a limit of a diminished range.

Thus, with respect to ranges, such as, for example, percent ranges, these are to be understood to include, within the range of percentages, steps of percentages in at least a tenth of a percent, or smaller, such that any tenth of a percent may be a limit of a diminished range of percentages.

The components disclosed in the various publications, disclosed or incorporated by reference herein, may be used in the embodiments of the present invention, as well as equivalents thereof.

It will be appreciated that for a hob the cooking surface may be selected from the group consisting of: (a.) a cooking surface of a smooth-top kitchen ceramic cook top; (b.) a cooking surface of a smooth-top kitchen glass ceramic cook top, (c.) a cooking surface of a stove having a ceramic cook top cooking surface, and (d.) a cooking surface of a stove having a glass ceramic cook top cooking surface.

The invention has as objects transparent glass ceramics containing high-quartz solid solutions as the predominant crystal phase and methods for their production, and the glass ceramics should be capable of being darkened by adding vanadium oxide. The darkened glass ceramics should have a light transmittance tau of less than five percent in the visible range in combination with an infrared radiation transmittance of tau greater than sixty-five percent at sixteen hundred nanometers. Furthermore, the glass ceramics should have high resistance to devitrification and, for applications under high thermal load, should have a high temperature/time load capacity with respect to changes in their properties, such as, for example, thermal expansion, compaction, compaction stress and transmission, and should have good chemical resistance, so that they can cover a broad application spectrum in transparent or darkened form.

In one aspect, the invention relates to a transparent glass ceramic that can be darkened by adding vanadium oxide and contains high-quartz solid solutions as the predominant crystal phase and a method for its production and its use.

The following U.S. patent application relating to flat float glass is to be incorporated by reference as follows: U.S. patent application Ser. No. 09/828,277, entitled "Flat Float Glass," having inventors Dr. Friedrich SIEBERS, Dr. Peter NASS, Dr. Gerhard LAUTENSCHLAGER, and Dr. Otmar BECKER, filed. on Apr. 6, 2001 and is hereby incorporated by reference as if set forth in its entirety herein.

The following U.S. patent application relating to glass ceramics is to be incorporated by reference as follows: U.S. patent application Ser. No. 09/828,287, entitled, "A Building for Containing Human Occupants in an Adverse Arctic or Antarctic Environment and Structures for Containing and Protecting Human Occupants in an Adverse Environment," having inventors Dr. Sabine MELSON and Stefan HUBERT, filed on Apr. 6, 2001 and is hereby incorporated by reference as if set forth in its entirety herein.

The following U.S. patent application is to be incorporated by reference as follows: U.S. patent application Ser. No. 09/828,286, entitled, "Lamp with an Unpolished Surface and Radiant Source Lamps with a Transparent Cover for the Radiant Source," having inventors Dr. Sabine MELSON and Dr. Peter NASS, filed on Apr. 6, 2001 is hereby incorporated by reference as if set forth in its entirety herein.

The following U.S. patents relating to cooking stoves and components thereof are hereby incorporated by reference as if set forth in their entirety herein as follows: U.S. Pat. No. 6,021,774, having inventors Taplan et al., issued on Feb. 8, 2000; U.S. Pat. No. 6,148,812, having inventors Taplan et al., issued on Nov. 21, 2000; U.S. Pat. No. 6,002,112, having inventors NAβ et al., issued on Dec. 14, 1999; U.S. Pat. No. 6,111,229, having inventor Schultheis, issued on Aug. 29, 2000; U.S. Pat. No. 6,050,176, having inventors Schultheis et al., issued on Apr. 18, 2000; U.S. Pat. No. 6,492,622 having inventors Melson et al.; U.S. Pat. No. 6,492,624 having inventors Kosmas et al.; and U.S. Pat. No. 6,515,263, having inventors Mitra et al.

Some examples of stoves and ranges which may be utilized or adapted for use in at least one possible embodiment of the present invention may be found in the following U.S. Patents: U.S. Pat. No. 4,292,501 issued to Maitenaz on Sep. 29, 1981; U.S. Pat. No. 4,413,171 issued to Klammers on Nov. 1, 1983; U.S. Pat. No. 4,493,976 issued to Wilson on Jan. 15, 1985; U.S. Pat. No. 4,601,279 issued to Guerin on Jul. 22, 1986; U.S. Pat. No. 5,083,010 issued to Henry et al. on Jan. 21, 1992; U.S. Pat. No. 5,213,091 issued to Beach on May 25, 1993; U.S. Pat. No. 5,280,152 issued to Lee on Jan. 18, 1994; U.S. Pat. No. 5,290,997 issued to Lai et al. on Mar. 1, 1994; and U.S. Pat. No. 5,400,765 issued to Goldstein et al. on Mar. 28, 1995. All the patents cited herein are incorporated by reference as if fully set forth in their entirety herein.

The appended drawings in their entirety, including all dimensions, proportions and/or shapes in at least one embodiment of the invention, are accurate and are hereby included by reference into this specification.

Some examples of burners and related components which may be utilized or adapted for use in at least one possible embodiment of the present invention may be found in the following U.S. Patents: U.S. Pat. No. 4,758,710 issued to Crossley et al. on Jul. 19, 1988; U.S. Pat. No. 4,899,723 issued to Pajares on Feb. 13, 1990; U.S. Pat. No. 5,186,158 issued to Ferlin on Feb. 16, 1993; U.S. Pat. No. 5,323,759 issued to Hammel et al. on Jun. 28, 1994; U.S. Pat. No. 5,329,918 issued to DiBari on Jul. 19, 1994; and U.S. Pat. No. 5,397,234 issued to Stoops et al. Mar. 14, 1995. All the patents cited herein are incorporated by reference as if fully set forth in their entirety herein.

Some examples of related components for stoves and ranges which may be utilized or adapted for use in at least one possible embodiment of the present invention may be found in the following U.S. Pat. No. 5,220,155 issued to Cunningham on Jun. 15, 1993; U.S. Pat. No. 5,245,159 issued to Chang on Sep. 14, 1993; U.S. Pat No. 5,343,020 issued to Waigand et al. on Aug. 30, 1994; U.S. Pat. No. 5,377,660 issued to Bombardier on Jan. 3, 1995; U.S. Pat. No. 5,380,985 issued to Graham on Jan. 10, 1995; U.S. Pat. No. 5,400,766 issued to Dillon on Mar. 28, 1995; and U.S. Pat. No. 6,024,084 issued to Gerhardinger on Feb. 15, 2000. All the patents cited herein are incorporated by reference as if fully set forth in their entirety herein.

Some examples of cooking hobs and cook tops which may be utilized or adapted for use in at least one possible embodiment of the present invention may be found in the following U.S. Patents: U.S. Pat. No. 5,406,932 issued to Joseph et al. on Apr. 18, 1995; U.S. Pat. No. 5,422,460 issued to Bralia on Jun. 6, 1995; U.S. Pat. No. 5,424,512 issued to Turetta et al. on Jun. 13, 1995; U.S. Pat. No. 5,425,353 issued to Herbert on Jun. 20, 1995; U.S. Pat. No. 5,429,114 issued to Taplan et al. on Jul. 4, 1995; U.S. Pat. No. 5,448,036 issued to Husslein on Sep. 5, 1995; and U.S. Pat. No. 5,958,272 issued to Taplan et al. on Sep. 28, 1999. All the patents cited herein are incorporated by reference as if fully set forth in their entirety herein.

All, or substantially all, of the components and methods of the various embodiments may be used with at least one embodiment or all of the embodiments, if more than one embodiment is described herein.

Some examples of ceramic plates or hot plates which may be utilized or adapted for use in at least one possible embodiment of the present invention may be found in the following U.S. Patents: U.S. Pat. No. 3,596,650 issued to Cerola on Aug. 3, 1971; U.S. Pat. No. 3,870,861 issued to Werych on Mar. 11, 1975; U.S. Pat. No. 4,414,465 issued to Newton et al. on Nov. 8, 1983; U.S. Pat. No. 4,634,841 issued to Langrhey on Jan. 6, 1987; and U.S. Pat. No. 5,397,873 issued to Stoops et al. on Mar. 14, 1995. All the patents cited herein are incorporated by reference as if fully set forth in their entirety herein.

Some examples of ceramic materials which may be utilized or adapted for use in at least one possible embodiment of the present invention may be found in the following U.S. Patents: U.S. Pat. No. 5,407,740 issued to Jessen on Apr. 18, 1995; U.S. Pat. No. 5,420,399 issued to Sekhar on May 30, 1995; U.S. Pat. No. 5,422,319 issued to Stempin on Jun. 6, 1995; U.S. Pat. No. 5,449,649 issued to Li et al. on Sep. 12, 1995; U.S. Pat. No. 5,476,684 issued to Smith on Dec. 19, 1995; and U.S. Pat. No. 5,691,261 issued to Takahashi et al on Nov. 25, 1997. All the patents cited herein are incorporated by reference as if fully set forth in their entirety herein.

All of the patents, patent applications and publications recited herein, and in the Declaration attached hereto, are hereby incorporated by reference as if set forth in their entirety herein.

Some examples of float glass and/or glass ceramics that may be utilized or adapted for use in at least one possible embodiment of the present invention may be found in the following U.S. Patents: U.S. Pat. No. 6,143,417 issued to Nomura et al. on Nov. 7, 2000; U.S. Pat. No. 6,065,309 issued to Cooper et al. on May 23, 2000; U.S. Pat. No. 5,846,279 issued to Nomura et al. on Dec. 8, 1998; U.S. Pat. No. 5,723,172 issued to Sherman on Mar. 3, 1998; U.S. Pat. No. 5,665,424 issued to Sherman on Sep. 9, 1997; and U.S. Pat. No. 4,859,636 issued to Aratani et al. on Aug. 22, 1989. All the patents cited herein are incorporated by reference as if fully set forth in their entirety herein.

Some examples of flat glass production which may possibly be used or adapted for use in at least one possible embodiment of the present invention may be found in the following U.S. Patents: U.S. Pat. No. 3,218,143 issued to De Lajarte on Nov. 16, 1965; U.S. Pat. No. 3,930,826 issued to Schornhorst on Jan. 6, 1976; U.S. Pat. No. 3,938,979 issued to Plumat on Feb. 14, 1976; U.S. Pat. No. 4,209,315 issued to Spurling on Jun. 24, 1980; U.S. Pat. No. 4,214,886 issued to Shay et al. on Jul. 29, 1980; U.S. Pat. No. 4,801,321 issued to Pita et al. on Jan. 31, 1989; U.S. Pat. No. 4,929,266 issued to Cozac et al. on May 29, 1990; and U.S. Pat. No. 5,078,777 issued to Cozac et al. on Jan. 7, 1992. All the patents cited herein are incorporated by reference as if fully set forth in their entirety herein.

Some examples of glass melting, features of which may possibly be used or adapted for use in at least one possible embodiment of the present invention may be found in the following U.S. Patents: U.S. Pat. No. 3,224,855 issued to Plumat on Dec. 21, 1965; U.S. Pat. No. 3,606,825 issued to Johnson on Sep. 21, 1971; U.S. Pat. No. 3,627,504 issued to Johnson et al. on Dec. 14, 1971; U.S. Pat. No. 3,764,287 issued to Brocious on Oct. 9, 1973; U.S. Pat. No. 4,319,904 issued to Gullett on Mar. 16, 1982; and U.S. Pat. No. 5,006,144 issued to Knavish et al. on Apr. 9, 1991. All the patents cited herein are incorporated by reference as if fully set forth in their entirety herein.

Some examples of reducing agents for use in glass melts, features of which may possibly be used or adapted for use in at least one possible embodiment of the present invention, may be found in the following U.S. Patents: U.S. Pat. No. 4,075,024 issued to Armistead on Feb. 21, 1978; U.S. Pat. No. 4,084,974 issued to Beall et al. on Apr. 18, 1978; U.S.

Pat. No. 5,114,122 issued to Hnat on May 19, 1992; U.S. Pat. No. 5,401,287 issued to Pecoraro et al. on Mar. 28, 1995; U.S. Pat. No. 5,610,108 issued to Watzke et al. on Mar. 11, 1997; U.S. Pat. No. 6,230,521 issued to Lehman on May 15, 2001; and U.S. Pat. No. 6,403,509 issued to Cochran et al. on Jun. 11, 2002. All the patents cited herein are incorporated by reference as if fully set forth in their entirety herein.

All of the patents, patent applications or patent publications, which were cited in the European Patent Office action dated May 17, 2002 and/or cited elsewhere are hereby incorporated by reference as if set forth in their entirety herein as follows: Database WPI Section Ch, week 199925, Derwent Publications Ltd., London, GB; Class L01, AN 1999-296403, XP002155032 and Japanese published patent application No. JP 11 100230 A (Nippon Electric Glass Co), Apr. 13, 1999, abstract; Database WPI Section Ch, week 199925, Derwent Publications Ltd., London, GB; Class L01, AN 1999-296402, XP002155033 and Japanese published patent application No. JP 11 100229 A (Nippon Electric Glass Co), Apr. 13, 1999, abstract; U.S. Pat. No. 5,446,008 issued to Krolla et al. on Aug. 29, 1995; and European patent No. EP 0 578 022, corresponding to U.S. Pat. No. 5,256,602 issued to Danielson on Oct. 26, 1993.

Some examples relating to aluminosilicate glass compositions, features of which may possibly be incorporated in an embodiment of the present invention may be found in the following U.S. Patents: U.S. Pat. No. 4,530,909 issued to Makishima et al. on Jul. 23, 1985; U.S. Pat. No. 4,626,515 issued to Chyung et al. on Dec. 2, 1986; U.S. Pat. No. 4,846,866 issued to Chyung et al. on Jul. 11, 1989; and U.S. Pat. No. 6,060,168 issued to Kohli on May 9, 2000. All the patents cited herein are incorporated by reference as if fully set forth in their entirety herein.

Some examples relating to float glass processes, features of which may possibly be incorporated in an embodiment of the present invention may be found in U.S. Pat. No. 4,305,745 issued to Mouly on Dec. 15, 1981; U.S. Pat. No. 4,342,583 issued to Kapura et al. on Aug. 3, 1982; U.S. Pat. No. 4,357,156 issued to Seymour on Nov. 2, 1982; U.S. Pat. No. 4,402,722 issued to Edge on Sep. 6, 1983; U.S. Pat. No. 4,741,750 issued to Bricker on May 3, 1988; and U.S. Pat. No. 5,643,349 issued to Piper et al on Jul. 1, 1997. All the patents cited herein are incorporated by reference as if fully set forth in their entirety herein.

All of the patents, patent applications or patent publications, which were cited in the European Patent Office international search report dated Dec. 19, 2000 and/or cited elsewhere are hereby incorporated by reference as if set forth in their entirety herein as follows: Database WPI Section Ch, week 199925, Derwent Publications Ltd., London, GB; Class L01, AN 1999-296403, XP002155032 and Japanese published patent application No. JP 11 100230 A (Nippon Electric Glass Co), Apr. 13, 1999, abstract; Database WPI Section Ch, week 199925, Derwent Publications Ltd., London, GB; Class L01, AN 1999-296402, XP002155033 and Japanese published patent application No. JP 11 100229 A (Nippon Electric Glass Co), Apr. 13, 1999, abstract; U.S. Pat. No. 5,446,008 issued to Krolla et al. on Aug. 29, 1995; European patent No. EP 0 156 479 issued to The English Electric Company Limited on Apr. 12, 1989; U.S. Pat. No. 5,922,271 issued to Weinberg et al. on Jul. 13, 1999; German patent no. DE 37 03 342 A, corresponding to U.S. Pat. No. 4,835,121 issued to Shibuya et al. on May 30, 1989; and European patent No. EP 0 578 022, corresponding to U.S. Pat. No. 5,256,602 issued to Danielson on Oct. 26, 1993.

Some examples of vanadium oxides which may possibly be used or adapted for use in at least one possible embodiment of the present invention may be found in the following U.S. Patents: U.S. Pat. No. 4,393,09 issued to Greenberg on Jul. 12, 1983; U.S. Pat. No. 4,486,400 issued to Riley on Dec. 4, 1984; U.S. Pat. No. 4,619,822 issued to Hammou et al. on Oct. 28, 1986; U.S. Pat. No. 5,407,603 issued to Morrison on Apr. 18, 1995; U.S. Pat. No. 5,487,876 issued to Mallinson et al. on Jan. 30, 1996; and U.S. Pat. No. 6,042,805 issued to Lampe-Onnerud on Mar. 28, 2000. All the patents cited herein are incorporated by reference as if fully set forth in their entirety herein.

Some examples of wafer state substrates in which features of the present invention may possibly be used or adapted for used may be found in the following U.S. Patents: U.S. Pat. No. 5,280,156 issued to Niori et al. on Jan. 18, 1994; U.S. Pat. No. 5,834,106 issued to Kamiaka et al. on Nov. 10, 1998; U.S. Pat. No. 6,077,619 issued to Sullivan on Jun. 20, 2000; U.S. Pat. No. 6,166,432 issued to Ohno et al. on Dec. 26, 2000; U.S. Pat. No. 6,309,766 issued to Sullivan on Oct. 30, 2001; and U.S. Pat. No. 6,491,571 issued to Ohno et al. on Dec. 10, 2002. All the patents cited herein are incorporated by reference as if fully set forth in their entirety herein.

Some examples of fireproof glass, or glass ceramic, in which features of the present invention may possibly be used or adapted for use may be found in the following U.S. Patents: U.S. Pat. No. 3,984,252 issued to Kiefer on Oct. 5, 1976; U.S. Pat. No. 4,113,904 issued to Kiefer on Sep. 12, 1978; U.S. Pat. No. 4,172,921 issued to Kiefer on Oct. 30, 1979; U.S. Pat. No. 4,396,682 issued to Mohri et al. on Aug. 2, 1983; U.S. Pat. No. 5,990,023 issued to Siedel et al. on Nov. 23, 1999; and U.S. Pat. No. 5,656,558 issued to Brix et al. on Aug. 12, 1997. All the patents cited herein are incorporated by reference as if fully set forth in their entirety herein.

The corresponding foreign and international patent publication application, namely, International Application No. PCT/EP00/08248, filed on Aug. 24, 2000, having WIPO Publication No. WO 02/16279 A1 and inventors Friedrich SIEBERS, Peter NASS, and Erich RODEK, as well as their published equivalents, and other equivalents or corresponding applications, if any, in corresponding cases in the European Patent Office and elsewhere, and the references and documents cited in any of the documents cited herein, such as the patents, patent applications and publications, are hereby incorporated by reference as if set forth in their entirety herein.

Some examples of keatite and/or high quartz mixed crystal formation, features of which may possibly be used or adapted for use in at least one possible embodiment of the present invention may be found in the following U.S. Patents: U.S. Pat. No. 3,938,978 issued to Hummel on Feb. 17, 1976; U.S. Pat. No. 3,970,463 issued to Planchock et al. on Jul. 20, 1976; U.S. Pat. No. 4,011,091 issued to McCollister on Mar. 8, 1977; U.S. Pat. No. 4,100,001 issued to Franklin on Jul. 11, 1978; U.S. Pat. No. 4,391,914 issued to Beall et al. on Jul. 5, 1983; U.S. Pat. No. 4,861,734 issued to MacDowell on Aug. 29, 1989; U.S. Pat. No. 5,212,122 issued to Pannhorst et al. on May 18, 1993; and U.S. Pat. No. 6,043,171 issued to Siebers et al. on Mar. 28, 2000. All the patents cited herein are incorporated by reference as if fully set forth in their entirety herein.

Some examples of ceramicizing glass-ceramic or glass, features of which may possibly be incorporated in an embodiment of the present invention may be found in the following U.S. Patents: U.S. Pat. No. 4,824,463 issued to Neuhoff et al. on Apr. 25, 1989; and U.S. Pat. No. 4,851,022 issued to Gunthner on Jul. 25, 1989. All the patents cited herein are incorporated by reference as if fully set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

Some examples of crystallizable glass and glass-ceramics made therefrom, features of which may possibly be incorporated in an embodiment of the present invention may be found in the following U.S. Pat. No. 3,970,463 issued to Planchock et al. on Jul. 20, 1976; U.S. Pat. No. 4,011,091 issued to McCollister on Mar. 8, 1977; U.S. Pat. No. 4,100,001 issued to Franklin on Jul. 11, 1978; U.S. Pat. No. 4,126,476 issued to Grossman on Nov. 21, 1978; U.S. Pat. No. 4,391,914 issued to Beall et al. on Jul. 5, 1983; and U.S. Pat. No. 6,197,710 B1 issued to Ohara et al. on Mar. 6, 2001. All the patents cited herein are incorporated by reference as if fully set forth in their entirety herein.

The details in the patents, patent applications and publications may be considered to be incorporable, at applicant's option, into the claims during prosecution as further limitations in the claims to patentably distinguish any amended claims from any applied prior art.

Some examples of cookware in which features of the present invention may possibly be used or adapted for use may be found in the following U.S. Patents: U.S. Pat. No. 6,082,611 issued to Kim on Jul. 4, 2000; U.S. Pat. No. 6,267,830 issued to Groll on Jul. 31, 2001; U.S. Pat. No. 6,331,328 issued to Cheng on Jul. 14, 1999; U.S. Pat. No. 6,360,423 issued to Groll on Mar. 26, 2002; U.S. Pat. No. 6,360,654 issued to Cornfield on Mar. 26, 2002; and U.S. Pat. No. 6,419,107 issued to Cheng on Jul. 16, 2002. All the patents cited herein are incorporated by reference as if fully set forth in their entirety herein.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, the abstract is not intended to limit the claims in any manner and should not be interpreted as limiting the claims in any manner.

Some examples of ovenware, features of which may possibly be used or adapted for use in at least one possible embodiment of the present invention may be found in the following U.S. Patents: U.S. Pat. No. 4,563,561 issued to Crook on Jan. 7, 1986; U.S. Pat. No. 4,741,955 issued to Saito et al. on May 3, 1988; U.S. Pat. No. 5,141,985 issued to Asahi on Sep. 18, 1991; U.S. Pat. No. 5,308 issued to Strait, Jr. on May 24, 1994; and U.S. Pat. No. 5,521,361 issued to Strait, Jr. on May 28, 1996. All the patents cited herein are incorporated by reference as if fully set forth in their entirety herein.

Some examples of telescopic mirror supports, features of which may possibly be used or adapted for use in at least one embodiment of the present invention may be found in the following U.S. Pat. No. 3,754,812 issued to Mohn on Aug. 28, 1973; U.S. Pat. No. 4,466,700 issued to Christiansen et al. on Aug. 21, 1984; U.S. Pat. No. 4,447,130 issued to Christiansen on May 8, 1984; U.S. Pat. No. 4,913,953 issued to Minford et al. on Apr. 3, 1990; U.S. Pat. No. 5,741,445 issued to Pickering et al. on Sep. 10, 1997; U.S. Pat. No. 6,045,231 issued to Martineau on Apr. 4, 2000; and U.S. Pat. No. 6,193,928 issued to Scheydecker et al. on Feb. 27, 2001. All the patents cited herein are incorporated by reference as if fully set forth in their entirety herein.

It will be understood that the examples of patents, published patent applications, and other documents which are included in this application and which are referred to in paragraphs which state "Some examples of . . . which may possibly be used or adapted for use in at least one possible embodiment of the present invention . . . ," may possibly not be used or useable in any one or more embodiment of the invention.

One feature of the invention resides broadly in the electric stove wherein: said electric hob which is configured to maximize heat transmission through said electric hob body from said at least one electrical heat source to a vessel supported on said electric cooking surface, is thus configured to maximize transmission of infrared radiation through said electric hob body from said at least one electrical heat source to a vessel supported on said electric cooking surface, and said electric hob, which is darkened, is configured to minimize transmission of visible light through said electric hob body sufficiently to visually conceal said at least one electrical heat source from view of a user of said electric stove when said electric stove is not in use.

Another feature of the invention resides broadly in the electric stove wherein: said electric hob which is configured to maximize heat transmission through said electric hob body from said at least one electrical heat source to a vessel supported on said electric cooking surface, is thus configured to maximize transmission of infrared radiation through said electric hob from said at least one heat source to a vessel supported on said electric cooking surface to an infrared radiation transmission of more than sixty-five percent at an infrared wavelength of one thousand six hundred nanometers for a four millimeters thick glass ceramic of which said electric hob is made, and said electric hob which is darkened, is configured to minimize transmission of visible light through said electric hob to conceal said at least one electrical heat source from view of a user of said electric stove when said electric stove is not in use to a minimized light transmittance, tau, in the visible range to less than five percent for a four millimeters thick glass ceramic of which said electric hob is made.

Yet another feature of the invention resides broadly in the electric stove wherein: said electric glass ceramic hob comprises crystallized and ceramicized glass configured to permit maximized heat transmission through said electric hob body from said at least one electrical heat source to a vessel supported on said electric cooking surface to thus maximize transmission of infrared radiation through said electric hob body from said at least one heat source to a vessel supported on said electric cooking surface and configured to minimize transmission of visible light through said electric hob to visually conceal said at least one electrical heat source from view of a user of said electric stove when said electric stove is not in use.

A further feature of the invention resides in the electric stove wherein: said crystallized and ceramicized glass ceramic comprises high-quartz solid solutions as the predominant crystal phase of said crystallized and ceramicized glass ceramic to maximize heat transmission through said electric hob body from said at least one electrical heat source to a vessel supported on said electric cooking surface and thus to maximize transmission of infrared radiation through said electric hob from said at least one heat source to a vessel supported on said electric cooking surface and to minimize transmission of visible light through said electric hob to visually conceal said at least one electrical heat source from view of a user of said electric stove when said electric stove is not in use.

Another feature of the invention resides broadly in the electric stove wherein: said crystallized and ceramicized glass ceramic has a color-imparting state to darken said crystallized and ceramicized glass ceramic hob to thus maximize heat transmission through said electric hob body from said at least one electrical heat source to a vessel supported on said electric cooking surface and thus to maximize transmission of infrared radiation through said electric hob from said at least one heat source to a vessel supported on said electric cooking surface and to minimize transmission of visible light through said electric hob to visually conceal said at least one electrical heat source from view of a user of said electric stove when said electric stove is not in use.

Yet another feature of the invention resides broadly in the electric stove wherein: said crystallized and ceramicized glass ceramic comprises a glass substantially free of toxic agents to thus maximize heat transmission through said electric hob body from said at least one electrical heat source to a vessel supported on said electric cooking surface to thus maximize transmission of infrared radiation through said electric hob from said at least one heat source to a vessel supported on said electric cooking surface and to minimize transmission of visible light through said electric hob to visually conceal said at least one electrical heat source from view of a user of said electric stove when said electric stove is not in use.

Still another feature of the invention resides broadly in the electric stove wherein: said crystallized and ceramicized glass ceramic comprises a glass substantially free of arsenic and antimony to thus maximize heat transmission through said electric hob body from said at least one electrical heat source to a vessel supported on said electric cooking surface to thus maximize transmission of infrared radiation through said electric hob from said at least one heat source to a vessel supported on said electric cooking surface and to minimize transmission of visible light through said electric hob to visually conceal said at least one electrical heat source from view of a user of said electric stove when said electric stove is not in use.

A further feature of the invention resides broadly in the electric stove wherein: said at least one source comprises a halogen lamp; said electric hob which is configured to maximize heat transmission through said electric hob body from said halogen lamp to a vessel supported on said electric cooking surface, is thus configured to maximize transmission of infrared radiation through said electric hob from said halogen lamp to a vessel supported on said electric cooking surface to an infrared radiation transmission at an infrared wavelength of more than seventy percent at an infrared wavelength of one thousand six hundred nanometers for a four millimeters thick glass ceramic of which said electric hob is made, and said electric hob, which is darkened, is configured to minimize transmission of visible light through said electric hob to conceal said halogen lamp from view of a user of said electric stove when said electric stove is not in use to a minimized light transmittance, tau, in the visible range to less than two and five tenths percent for a four millimeters thick glass ceramic of which said electric hob is made.

Yet another feature of the invention resides broadly in the glass ceramic object wherein: said glass ceramic object comprises a crystallized and ceramicized glass ceramic, which crystallized and ceramicized glass ceramic comprises a glass substantially free of toxic agents, said glass has a light transmittance in the visible range, tau, of less than two and five tenths percent for a four millimeters thick glass ceramic of which said glass ceramic object is made, and has an infrared radiation transmittance at an infrared wavelength of one thousand six hundred nanometers of more than seventy percent for a four millimeters thick glass ceramic of which said glass ceramic object is made.

Still another feature of the invention resides broadly in the glass ceramic object wherein: said crystallized and ceramicized glass ceramic comprises a keatite solid solution.

Another feature of the invention resides broadly in the method of making a glass ceramic object which includes the steps of: providing apparatus configured to melt glass in the absence of added vanadium oxide; and using said apparatus to produce said melt of molten glass with said added vanadium oxide, and reducing said added vanadium oxide in said melt of molten glass at a temperature of about one thousand seven hundred fifty degrees Celsius with said at least one reducing agent to a state in which the reduced vanadium is configured to darken.

Yet another feature of the invention resides broadly in the method comprising the step of: adding vanadium oxide and at least one reducing agent to said melt of molten glass sufficient to reduce said added vanadium oxide present in said melt of molten glass and permitting production of a darkened crystallized and ceramicized glass ceramic, which darkened crystallized and ceramicized glass ceramic comprises high-quartz solid solutions as the predominant crystal phase, a glass substantially free of arsenic and antimony, having a light transmittance in the visible range, tau, of less than two and five tenths percent for a four millimeters thick glass ceramic of which said glass ceramic object is made, and having an infrared radiation transmittance at an infrared wavelength of one thousand six hundred nanometers of more than seventy percent for a four millimeters thick glass ceramic of which said glass ceramic object is made.

Still another feature of the invention resides broadly in the method comprising at least one of the following steps: heating the darkened crystallized and ceramicized glass ceramic to convert high-quartz solid solutions at least in part into a keatite solid solution; and ceramicizing the glass to convert vanadium from a non-color imparting state to a darkening, color imparting state.

Another feature of the invention resides broadly in the glass ceramic object wherein: said glass ceramic object comprises a glass substantially free of toxic agents.

Yet another feature of the invention resides broadly in the glass ceramic object wherein: said crystallized and ceramicized glass ceramic of said darkened glass ceramic object has a light transmittance in the visible range, tau, of less than two and five tenths percent for a four millimeters thick glass ceramic of which said glass ceramic object is made, and has an infrared radiation transmittance at an infrared wavelength of one thousand six hundred nanometers of more than seventy percent for a four millimeters thick glass ceramic of which said glass ceramic object is made.

Still another feature of the invention resides broadly in the glass ceramic object wherein: said crystallized and ceramicized glass ceramic comprises a keatite solid solution.

The invention as described hereinabove in the context of the preferred embodiments is not to be taken as limited to all of the provided details thereof, since modifications and variations thereof may be made without departing from the spirit and scope of the invention.

What is claimed is:

1. An electric stove to cook food, said electric stove comprising:

an electric stove body;

said electric stove body comprising a bottom base portion;

said electric stove body comprising an upper housing portion;

an electric cook top;

said electric cook top being mounted in or on said upper housing portion;

said electric cook top comprising an electric smooth-top cook top to cook food thereon;

said electric smooth-top cook top comprising an electric hob;

an arrangement to attach said electric hob to said electric stove body;

said electric hob comprising a layer which becomes an upper layer upon installation in a kitchen;

said electric hob comprising an electric cooking surface configured to cook food;

said electric cooking surface being disposed at or adjacent to said upper layer of said electric hob;

said electric cooking surface, at or adjacent to said upper layer of said electric hob, being configured to receive a bottom of a cooking vessel to cook food therein;

said electric cook top comprising at least one electrical heat source;

said at least one electrical heat source being configured to electrically heat said electric cooking surface to thereby cook food in a cooking vessel;

said at least one electrical heat source being disposed adjacent to said electric cooking surface;

said electric hob comprising a body;

said electric cooking surface being disposed adjacent to or comprising a part of said hob body;

said electric hob comprising an electric glass ceramic hob including a reduced vanadium coloring agent in the glass that has been reduced with at least one reducing agent at a temperature of at least about one thousand seven hundred fifty degrees Celsius, which glass is substantially free of the toxic agents arsenic oxide and antimony oxide, which electric glass ceramic hob is thus configured with said agent to maximize heat passing through said electric hob body from said at least one electrical heat source to a vessel supported on said electric cooking surface and also is configured to sufficiently darken said electric hob to a darkness sufficient to visually conceal said at least one electrical heat source from view of a user of said electric stove when said electric stove is not in use; and electric control apparatus being configured and disposed to control said electric hob;

said electric control apparatus being connected to control said at least one electrical heat source and thus is configured to control heat of said electrically heated cooking surface to cook food in a vessel.

2. The electric stove according to claim 1, wherein:

said electric hob which is configured to maximize heat transmission through said electric hob body from said at least one electrical heat source to a vessel supported on said electric cooking surface, is thus configured to maximize transmission of infrared radiation through said electric hob body from said at least one electrical heat source to a vessel supported on said electric cooking surface, and said electric hob, which is darkened, is configured to minimize transmission of visible light through said electric hob body sufficiently to visually conceal said at least one electrical heat source from view of a user of said electric stove when said electric stove is not in use.

3. The electric stove according to claim 2, wherein:

said electric hob which is configured to maximize heat transmission through said electric hob body from said at least one electrical heat source to a vessel supported on said electric cooking surface, is thus configured to maximize transmission of infrared radiation through said electric hob from said at least one heat source to a vessel supported on said electric cooking surface to an infrared radiation transmission of more than sixty-five percent at an infrared wavelength of one thousand six hundred nanometers for a four millimeters thick glass ceramic of which said electric hob is made, and said electric hob which is darkened, is configured to minimize transmission of visible light through said electric hob to conceal said at least one electrical heat source from view of a user of said electric stove when said electric stove is not in use to a minimized light transmittance, tau, in the visible range to less than five percent for a four millimeters thick glass ceramic of which said electric hob is made.

4. The electric stove according to claim 3, wherein:

said electric glass ceramic hob comprises crystallized and ceramicized glass configured to permit maximized heat transmission through said electric hob body from said at least one electrical heat source to a vessel supported on said electric cooking surface to thus maximize transmission of infrared radiation through said electric hob body from said at least one heat source to a vessel supported on said electric cooking surface and configured to minimize transmission of visible light through said electric hob to visually conceal said at least one electrical heat source from view of a user of said electric stove when said electric stove is not in use.

5. The electric stove according to claim 4, wherein:

said crystallized, and ceramicized glass ceramic comprises high-quartz solid solutions as the predominant crystal phase of said crystallized and ceramicized glass ceramic to maximize heat transmission through said electric hob body from said at least one electrical heat source to a vessel supported on said electric cooking surface and thus to maximize transmission of infrared radiation through said electric hob from said at least one heat source to a vessel supported on said electric cooking surface and to minimize transmission of visible light through said electric hob to visually conceal said at least one electrical heat source from view of a user of said electric stove when said electric stove is not in use.

6. The electric stove according to claim 5, wherein:

said crystallized and ceramicized glass ceramic has a color-imparting state to darken said crystallized and ceramicized glass ceramic hob to thus maximize heat transmission through said electric hob body from said at least one electrical heat source to a vessel supported on said electric cooking surface and thus to maximize transmission of infrared radiation through said electric hob from said at least one heat source to a vessel supported on said electric cooking surface and to minimize transmission of visible light through said electric hob to visually conceal said at least one electrical heat source from view of a user of said electric stove when said electric stove is not in use.

7. The electric stove according to claim 6, wherein:

said at least one source comprises a halogen lamp;

said electric hob which is configured to maximize heat transmission through said electric hob body from said halogen lamp to a vessel supported on said electric cooking surface, is thus configured to maximize transmission of infrared radiation through said electric hob from said halogen lamp to a vessel supported on said electric cooking surface to an infrared radiation transmission at an infrared wavelength of more than seventy percent at an infrared wavelength of one thousand six hundred nanometers for a four millimeters thick glass ceramic of which said electric hob is made, and said electric hob, which is darkened, is configured to minimize transmission of visible light through said electric hob to conceal said halogen lamp from view of a user of said electric stove when said electric stove is not in use to a minimized light transmittance, tau, in the visible range to less than two and five tenths percent for a four millimeters thick glass ceramic of which said electric hob is made.

8. A method of making a glass ceramic object, such as, in a darkened smooth-top cools top, a stove with a darkened smooth-top cook top, a darkened substrate material for wafer stages, a darkened telescopic mirror support, a darkened hob, and a darkened heatable plate for cooking and grilling, said glass ceramic object comprising a darkened glass ceramic object, said darkened glass ceramic object includes a reduced vanadium coloring agent which darkened glass ceramic abject is thus configured with said agent to maximize heat passing through said darkened glass ceramic object, and said darkened glass ceramic object is also configured to sufficiently darken said glass ceramic object to a darkness sufficient to obscure viewing through said glass ceramic object, which glass ceramic object comprises a crystallized and ceramicized glass ceramic, which crystallized and ceramicized glass ceramic comprises high-quartz solid solutions as the predominant crystal phase, a glass substantially free of arsenic and antimony, having a light transmittance in the visible range, tau, of less than five percent for a four millimeters thick glass ceramic of which said glass ceramic object is made, and having an infrared transmittance at an infrared wavelength of one thousand six hundred nanometers of more than sixty-five percent for a four millimeters thick glass ceramic of which said glass ceramic object is made;

said method comprising the steps of:

providing a melt of molten glass;

fining said melt of molten glass in the absence of added arsenic and antimony;

adding vanadium oxide and at least one reducing agent to said melt of molten glass sufficient to reduce said added vanadium oxide present in said melt of molten glass and permitting production of a darkened crystallized and ceramicized glass ceramic, which darkened crystallized and ceramicized glass ceramic comprises high-quartz solid solutions as the predominant crystal phase, a glass substantially free of arsenic and antimony, having a light transmittance in the visible range, tau, of less than five percent for a four millimeters thick glass ceramic of which said glass ceramic object is made, and having an infrared transmittance at an infrared wavelength of one thousand six hundred nanometers of more than sixty-five percent for a four millimeters thick glass ceramic of which said glass ceramic object is made;

reducing said added vanadium oxide in said melt of molten glass at a temperature of at least about one thousand seven hundred fifty degrees Celsius with said at least one reducing agent to a state in which the reduced vanadium is configured to darken; and ceramicizing said glass and producing said glass ceramic object.

9. The method of making a glass ceramic object according to claim 8, which includes the steps of:

providing apparatus configured to melt glass in the absence of added vanadium oxide; and using said apparatus to produce said melt of molten glass with said added vanadium oxide, and reducing said added vanadium oxide in said melt of molten glass at a temperature of about one thousand seven hundred fifty degrees Celsius with said at least one reducing agent to a state in which the reduced vanadium is configured to darken.

10. The method according to claim 9, comprising the step of:

adding vanadium oxide and at least one reducing agent to said melt of molten glass sufficient to reduce said added vanadium oxide present in said melt of molten glass and permitting production of a darkened crystallized and ceramicized glass ceramic, which darkened crystallized and ceramicized glass ceramic comprises high-quartz solid solutions as the predominant crystal phase, a glass substantially free of arsenic and antimony, having a light transmittance in the visible range, tau, of less than two and five tenths percent for a four millimeters thick glass ceramic of which said glass ceramic object is made, and having an infrared radiation transmittance at an infrared wavelength of one thousand six hundred nanometers of more than seventy percent for a four millimeters thick glass ceramic of which said glass ceramic object is made.

11. The method according to claim 10, comprising at least one of the following steps:

heating the darkened crystallized and ceramicized glass ceramic to convert high-quartz solid solutions at least in part into a keatite solid solution; and ceramicizing the glass to convert vanadium from a non-color imparting state to a darkening, color imparting state.

12. A glass ceramic object, such as, in a darkened smooth-top cook top, a stove with a darkened smooth-top cook top, a darkened substrate material for wafer stages, a darkened telescopic mirror support, a darkened hob, a darkened heatable plate for cooking and grilling, alternatively, a fire protection of a door or of a window for a building, a chimney inspection window, culinary ware, ovenware, direct oven-to-table cookware, and cookware; upon said glass ceramic object comprising a darkened glass ceramic object, said darkened glass ceramic object includes a reduced vanadium coloring agent that has been reduced with at least one reducing agent at a temperature of at least about one thousand seven hundred fifty degrees Celsius, which darkened glass ceramic object is thus configured with said agent to maximize heat passing through said darkened glass ceramic object, and said darkened glass ceramic object is also configured to sufficiently darken paid glass ceramic object to a darkness sufficient to obscure viewing through said glass ceramic object, which glass ceramic object comprises a crystallized and ceramicized glass ceramic, which crystallized and ceramicized glass ceramic comprises high-quartz solid solutions as the predominant crystal phase, a glass substantially free of arsenic and antimony, having a light transmittance in the visible range, tau, of less than five percent for a four millimeters thick glass ceramic of which said glass ceramic object is made, and having an infrared transmittance at an infrared wavelength of one thousand six hundred nanometers of more than sixty-five percent for a four millimeters thick glass ceramic of which said glass ceramic object is made; upon said glass ceramic object comprising a fire protection of a door or of a window for a building, a chimney inspection window, culinary ware, ovenware, direct oven-to-table cookware, and cookware, said glass ceramic object comprises a crystallized and ceramicized glass ceramic, which crystallized and ceramicized glass ceramic comprises high-quartz solid solutions as the predominant crystal phase, a glass substantially free of arsenic and antimony and containing less than three percent by weight of titanium dioxide, and having a light transmittance in the visible range, tau, of less than five percent for a four millimeters thick glass ceramic of which said glass ceramic object is made.

13. The glass ceramic object according to claim 12, wherein:
said glass ceramic object comprises a crystallized and ceramicized glass ceramic, which crystallized and ceramicized glass ceramic comprises a glass substantially free of toxic agents, said glass has a light transmittance in the visible range, tau, of less than two and five tenths percent for a four millimeters thick glass ceramic of which said glass ceramic object is made, and has an infrared radiation transmittance at an infrared wavelength of one thousand six hundred nanometers of more than seventy percent for a four millimeters thick glass ceramic of which said glass ceramic object is made.

14. The glass ceramic object according to claim 13, wherein:
said crystallized and ceramicized glass ceramic comprises a keatite solid solution.

15. The glass ceramic object according to claim 12, wherein:
said glass ceramic object comprises a glass substantially free of toxic agents.

16. The glass ceramic object according to claim 15, wherein: said crystallized and ceramicized glass ceramic of said darkened glass ceramic object has a light transmittance in the visible range, tau, of less than two and five tenths percent for a four millimeters thick glass ceramic of which said glass ceramic object is made, and has an infrared radiation transmittance at an infrared wavelength of one thousand six hundred nanometers of more than seventy percent for a four millimeters thick glass ceramic of which said glass ceramic object is made.

17. The glass ceramic object according to claim 16, wherein: said crystallized and ceramicized glass ceramic comprises a keatite solid solution.

18. A method of making a glass ceramic object, such as, in a darkened smooth-top cook top, a stove with a darkened smooth-top cook top, a darkened substrate material for wafer stages, a darkened telescopic mirror support, a darkened hob, and a darkened heatable plate for cooking and grilling, said glass ceramic object comprising a darkened glass ceramic object, said darkened glass ceramic object includes a reduced vanadium coloring agent which darkened glass ceramic object is thus configured with said agent to maximize heat passing through said darkened glass ceramic object, and said darkened glass ceramic object is also configured to sufficiently darken said glass ceramic object to a darkness sufficient to obscure viewing through said glass ceramic object, which glass ceramic object comprises a crystallized and ceramicized glass ceramic, which crystallized and ceramicized glass ceramic comprises high-quartz solid solutions as the predominant crystal phase, a glass substantially free of arsenic and antimony, having a light transmittance in the visible range, tau, of less than five percent for a four millimeters thick glass ceramic of which said glass ceramic object is made, and having an infrared transmittance at an infrared wavelength of one thousand six hundred nanometers of more than sixty-five percent for four millimeters thick glass ceramic of which said glass ceramic object is made;

said method comprising the steps of;
providing a melt of molten glass;
fining said melt of molten glass in the absence of added arsenic and antimony;
adding vanadium oxide and at least one reducing agent to said melt of molten glass sufficient to reduce said added vanadium oxide present in said melt of molten glass and permitting production of a darkened crystallized and ceramicized glass ceramic, which darkened crystallized and ceramicized glass ceramic comprises high-quartz solid solutions as the predominant crystal phase, a glass substantially free of arsenic and antimony, having a light transmittance in the visible range, tau, of less than five percent for a four millimeters thick glass ceramic of which said glass ceramic object is made, and having an infrared transmittance at an infrared wavelength of one thousand six hundred nanometers of more than sixty-five percent for a four millimeters thick glass ceramic of which said glass ceramic object is made;
reducing said added vanadium oxide in said melt of molten glass with said at least one reducing agent to a state in which the reduced vanadium is configured to darken;
the step of reducing said added vanadium oxide in said melt of molten glass comprises reducing said added vanadium oxide in said melt of molten glass at a temperature of at least one thousand seven hundred fifty degrees Celsius in order to minimize bubble count in the glass; and
ceramicizing said glass and producing said glass ceramic object.

19. The glass ceramic object made according to the method of claim 18.

20. A glass ceramic object, such as, in a darkened smooth-top cook top, a stove with a darkened smooth-top cook top, a darkened substrate material for wafer stages, a darkened telescopic mirror support, a darkened hob, a darkened heatable plate for cooking and grilling, said glass ceramic object comprising a darkened glass ceramic object, said darkened glass ceramic object includes a reduced vanadium coloring agent that has been reduced with at least one reducing agent at a temperature of at least one thousand seven hundred fifty degrees Celsius, which darkened glass ceramic object is thus configured with said agent to maximize heat passing through said darkened glass ceramic object, and said darkened glass ceramic object is also configured to sufficiently darken said glass ceramic object to a darkness sufficient to obscure viewing through said glass ceramic object, which glass ceramic object comprises a crystallized and ceramicized glass ceramic, which crystallized and ceramicized glass ceramic comprises high-quartz solid solutions as the predominant crystal phase, a glass substantially free of arsenic and antimony, having a light transmittance in the visible range, tau, of less than five percent for a four millimeters thick glass ceramic of which said glass ceramic object is made, and having an infrared transmittance at an infrared wavelength of one thousand six hundred nanometers of more than sixty-five percent for a four millimeters thick glass ceramic of which said glass ceramic object is made.

21. The glass ceramic object according to claim 20, wherein:

said glass ceramic object comprises a crystallized and ceramicized glass ceramic, which crystallized and ceramicized glass ceramic comprises a glass substantially free of toxic agents, said glass has a light transmittance in the visible range, tau, of less than two and five tenths percent for a four millimeters thick glass ceramic of which said glass ceramic object is made, and has an infrared radiation transmittance at an infrared wavelength of one thousand six hundred nanometers of more than seventy percent for a four millimeters thick glass ceramic of which said glass ceramic object is made.

22. The glass ceramic object according to claim 21, wherein:

said crystallized and ceramicized glass ceramic comprises a keatite solid solution.

\* \* \* \* \*

UNITED STATES PATENT AND TRADEMARK OFFICE
CERTIFICATE OF CORRECTION

PATENT NO. : 6,930,289 B2  
DATED : August 16, 2005  
INVENTOR(S) : Friedrich Siebers et al.

It is certified that error appears in the above-identified patent and that said Letters Patent is hereby corrected as shown below:

Title page,  
Item [56], References Cited, FOREIGN PATENT DOCUMENTS, the fourth reference should be -- DE -- and not "EP".

Column 20,  
Line 49, after "crucible" delete "-".

Column 68,  
Line 44, after "crystallized" delete ",".

Column 69,  
Line 27, after "smooth-top", delete "cools" and insert -- cook --.

Column 70,  
Line 65, after "darken", delete "paid" and insert -- said --.

Column 72,  
Line 17, after "of", delete ";" and insert -- : --.

Signed and Sealed this

Twenty-ninth Day of November, 2005

JON W. DUDAS  
*Director of the United States Patent and Trademark Office*